United States Patent
Boutcher et al.

(10) Patent No.: US 12,405,896 B2
(45) Date of Patent: Sep. 2, 2025

(54) PROCESSING INSTRUCTIONS TO INVALIDATE CACHED RESULTANT DATA IN A DATABASE SYSTEM

(71) Applicant: Ocient Holdings LLC, Chicago, IL (US)

(72) Inventors: David Charles Boutcher, Newcastle upon Tyne (GB); Rob Bestgen, Rochester, MN (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/619,912

(22) Filed: Mar. 28, 2024

(65) Prior Publication Data

US 2024/0362167 A1 Oct. 31, 2024

Related U.S. Application Data

(60) Provisional application No. 63/498,881, filed on Apr. 28, 2023.

(51) Int. Cl.
*G06F 16/00* (2019.01)
*G06F 12/0891* (2016.01)

(52) U.S. Cl.
CPC .................. *G06F 12/0891* (2013.01)

(58) Field of Classification Search
CPC ........... G06F 12/0891; G06F 16/24539; G06F 16/2379; G06F 2212/1044; G06F 16/9024; G06F 16/9574; G06F 3/0608; G06F 3/0673; G06F 12/0893; G06F 3/0658; G06F 12/0862; G06F 16/24552; G06F 12/0875

See application file for complete search history.

(56) References Cited

U.S. PATENT DOCUMENTS

| | | | |
|---|---|---|---|
| 5,548,770 A | 8/1996 | Bridges | |
| 6,230,200 B1 | 5/2001 | Forecast | |
| 6,633,772 B2 | 10/2003 | Ford | |
| 6,757,708 B1 * | 6/2004 | Craig | G06F 16/9574 719/311 |

(Continued)

OTHER PUBLICATIONS

A new high performance fabric for HPC, Michael Feldman, May 2016, Intersect360 Research.

(Continued)

*Primary Examiner* — Yicun Wu
(74) *Attorney, Agent, or Firm* — Garlick & Markison; Timothy W. Markison

(57) ABSTRACT

A database system is operable to cache first resultant data generated via executing a first query in cache memory resources during a first temporal period. An instruction to re-execute the first query is processed during the first temporal period by accessing the first resultant data in the cache memory resources. A cached resultant invalidation instruction indicating the first relational database table is received. The first resultant data from the cache memory resources is removed during a second temporal period based on processing the cached resultant invalidation instruction. A third instruction to re-execute the first query is processed after the second temporal period by re-executing the first query via access to the first relational database table in the first storage resources to re-generate corresponding first resultant data for the first query.

20 Claims, 48 Drawing Sheets

(56) References Cited

U.S. PATENT DOCUMENTS

| | | | |
|---|---|---|---|
| 7,499,907 | B2 | 3/2009 | Brown |
| 7,908,242 | B1 | 3/2011 | Achanta |
| 2001/0051949 | A1 | 12/2001 | Carey |
| 2002/0032676 | A1 | 3/2002 | Reiner |
| 2004/0162853 | A1 | 8/2004 | Brodersen |
| 2008/0133456 | A1 | 6/2008 | Richards |
| 2009/0063781 | A1* | 3/2009 | Ebersole ........... G06F 16/24552 711/141 |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | Mcwilliams |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2019/0325052 | A1* | 10/2019 | Bastawala ......... G06F 16/24539 |
| 2020/0401528 | A1* | 12/2020 | Sharma ................ G06F 3/0608 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti ...

* cited by examiner database system 10 computing device 18 computing device 18 computing device 18 node 37 node 37 node 37 node 37

FIG. 18 data for segment 1 (raw segment)

FIG. 19 divide segment by columns into data slabs

FIG. 20 sort data slabs based on key column(s)

query processing system 2502

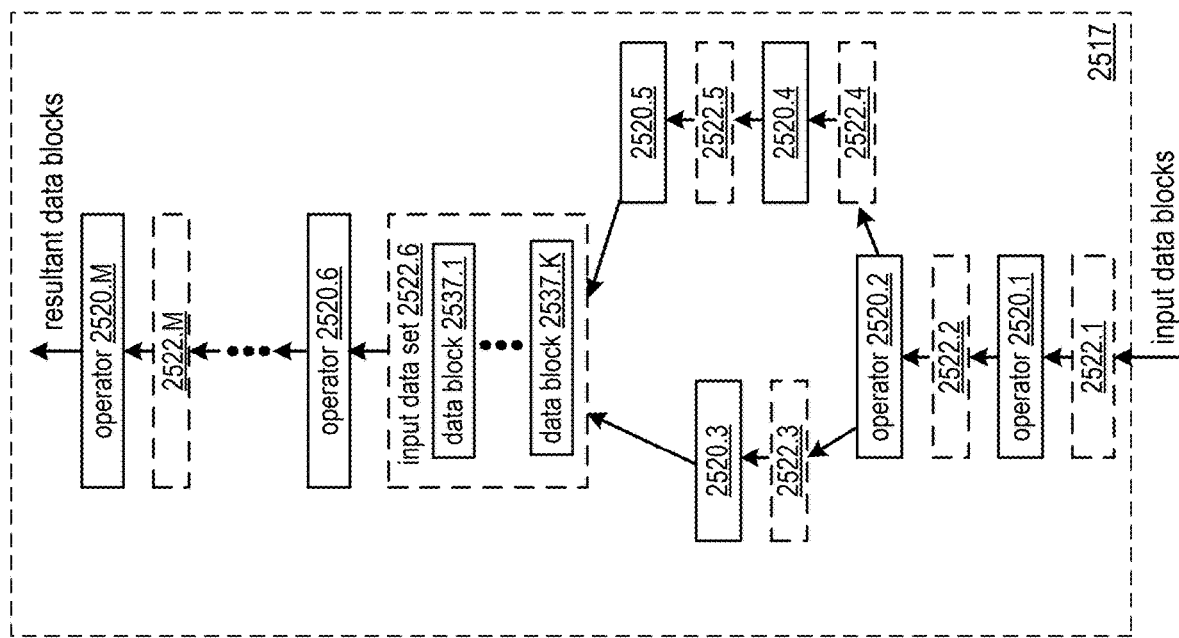

database system 10 query execution module 2504

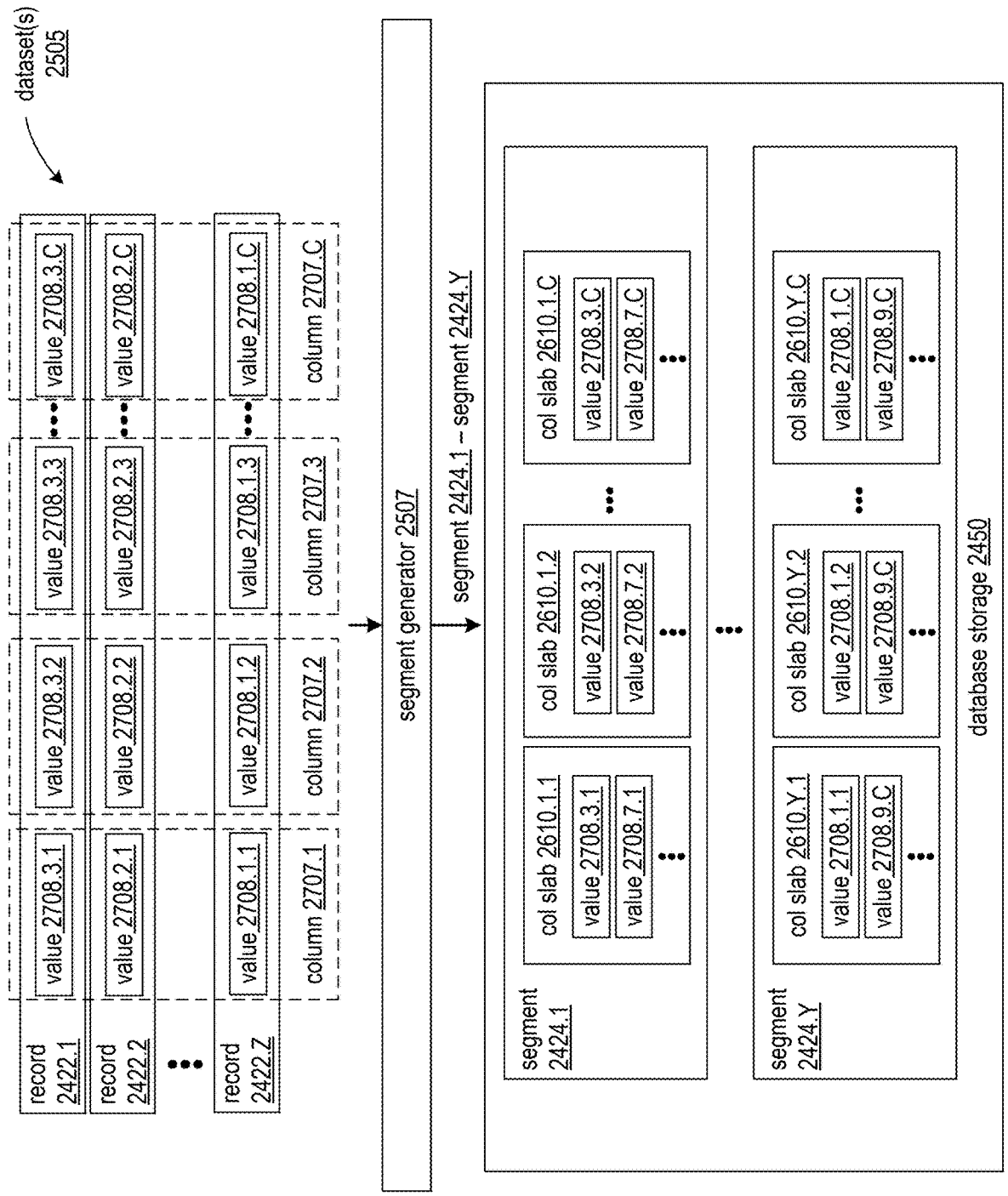

database system 10 query processing system 2510 query processing system 2510 database system 10 database system 10 query request 2915 database system 10 database system 10

1

PROCESSING INSTRUCTIONS TO INVALIDATE CACHED RESULTANT DATA IN A DATABASE SYSTEM

CROSS-REFERENCE TO RELATED APPLICATIONS

The present U.S. Utility Patent Application claims priority pursuant to 35 U.S.C. § 119(e) to U.S. Provisional Application No. 63/498,881, entitled "PROCESSING INSTRUCTIONS TO INVALIDATE CACHED RESULTANT DATA IN A DATABASE SYSTEM", filed Apr. 28, 2023, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with various embodiments;

FIG. 24H is a schematic block diagram of a query operator execution flow in accordance with various embodiments;

FIG. 24O is a schematic block diagram of a database system that implements a segment generator that generates segments from a plurality of records in accordance with various embodiments;

DETAILED DESCRIPTION OF THE INVENTION

Figure 1:
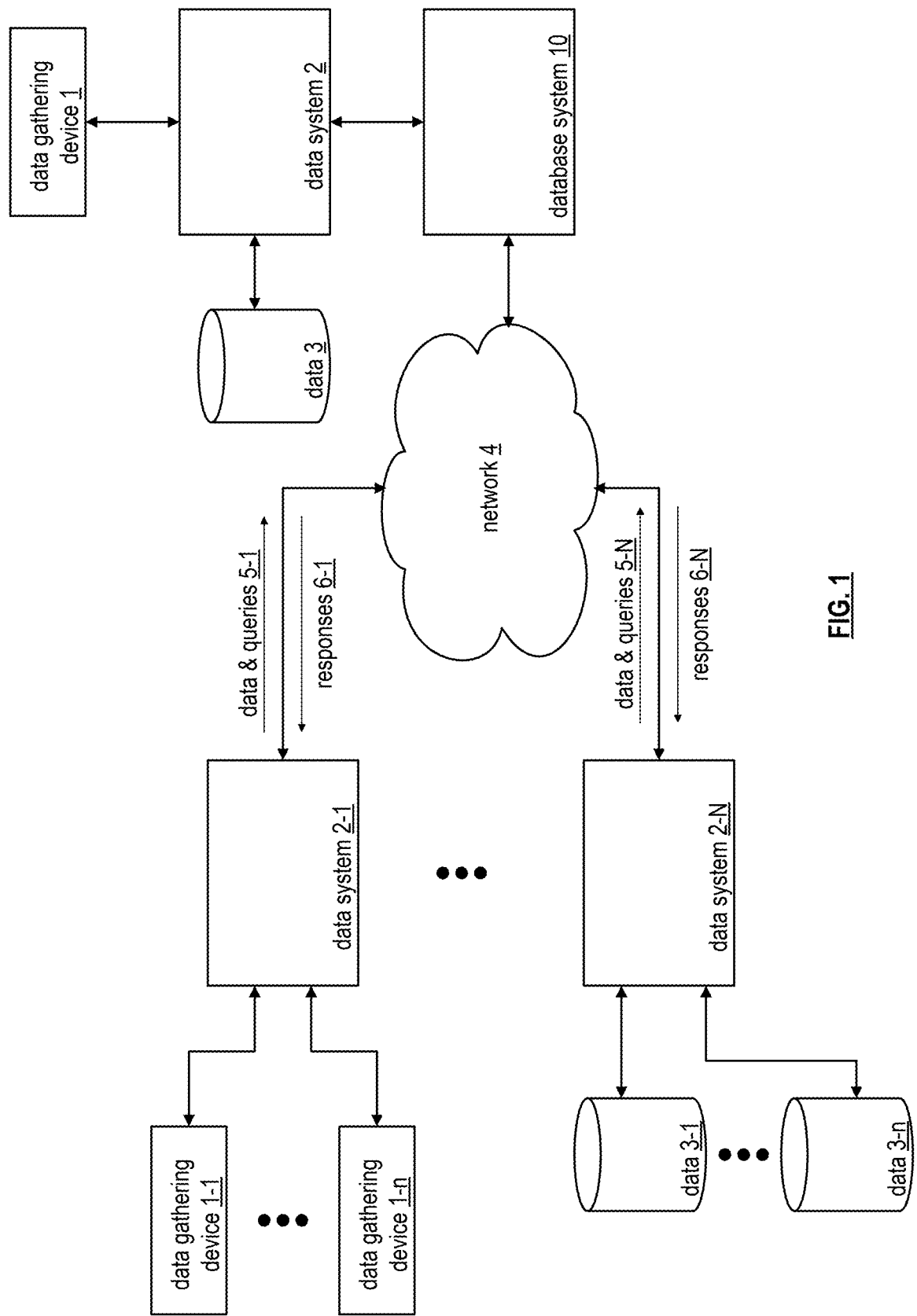
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
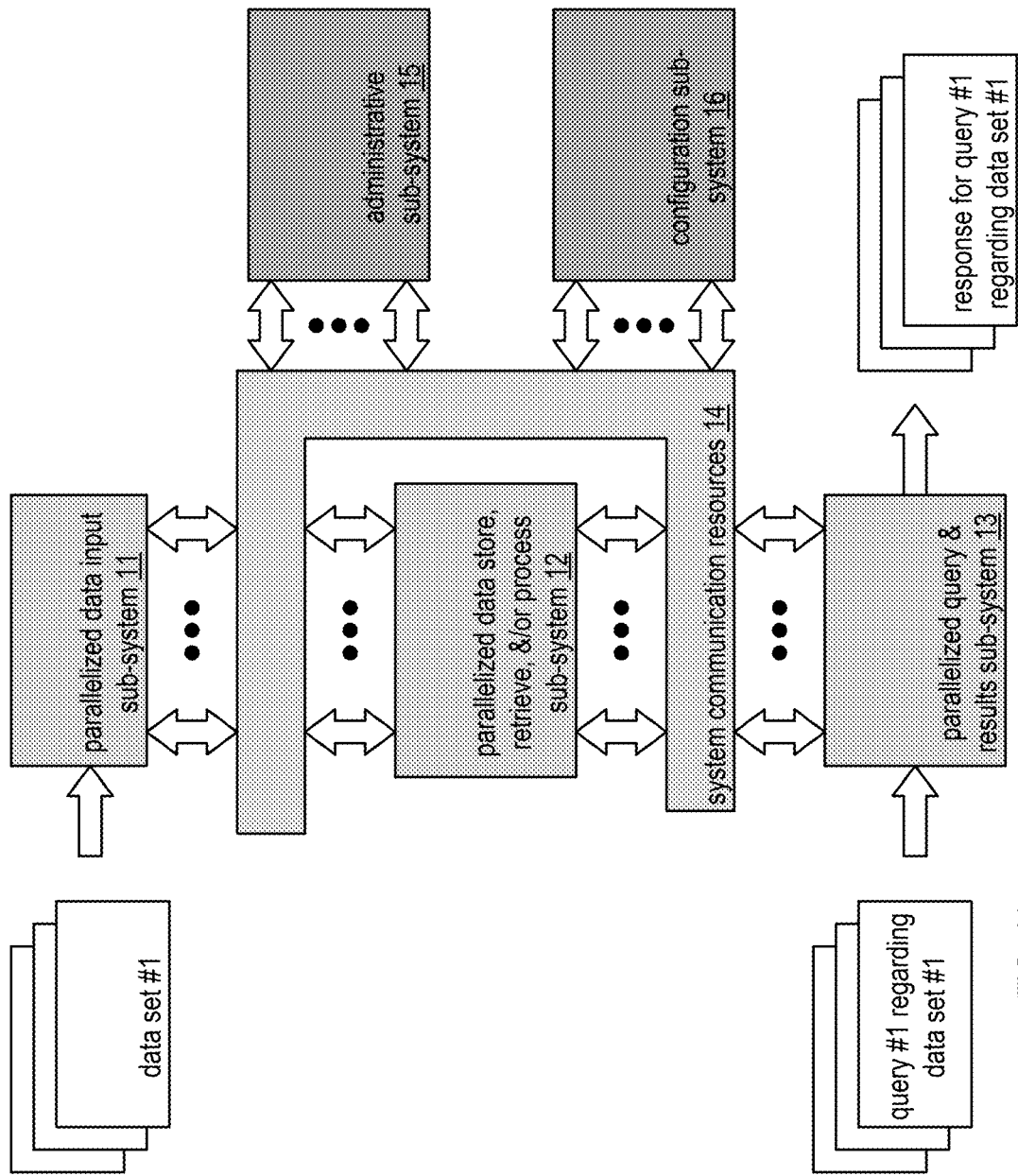
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
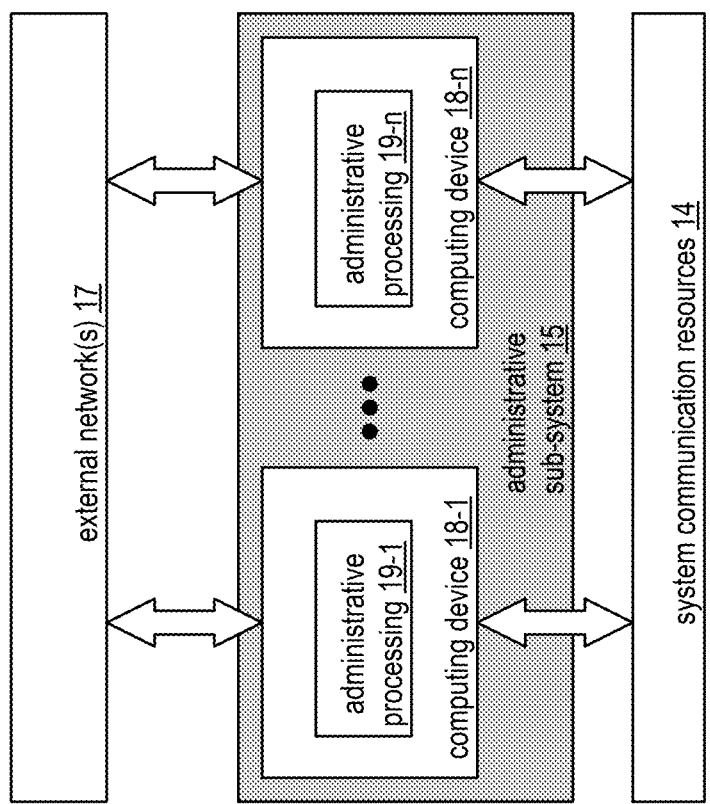
FIG. 2 is a schematic block diagram of an embodiment of an administrative sub-system in accordance with various embodiments.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
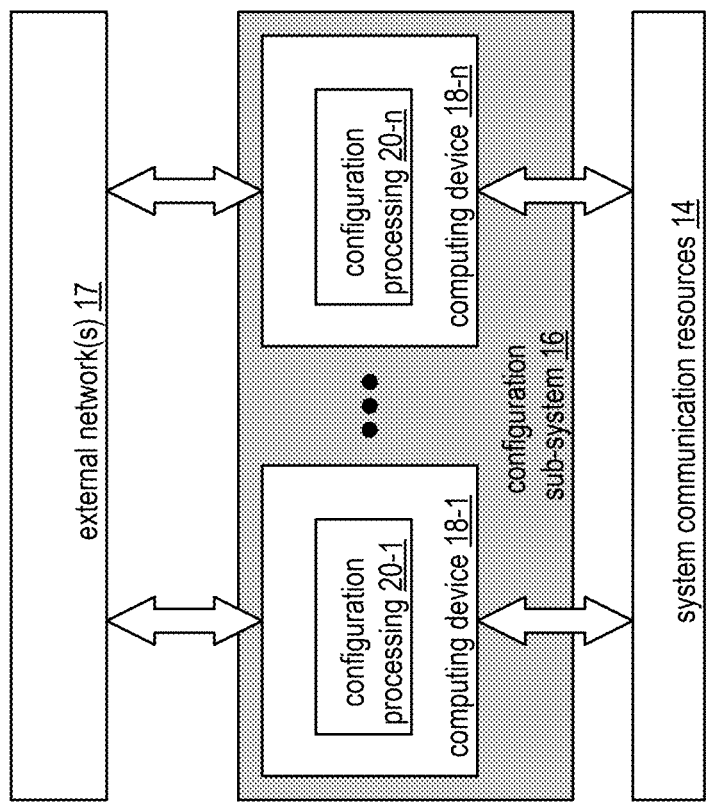
FIG. 3 is a schematic block diagram of an embodiment of a configuration sub-system in accordance with various embodiments.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
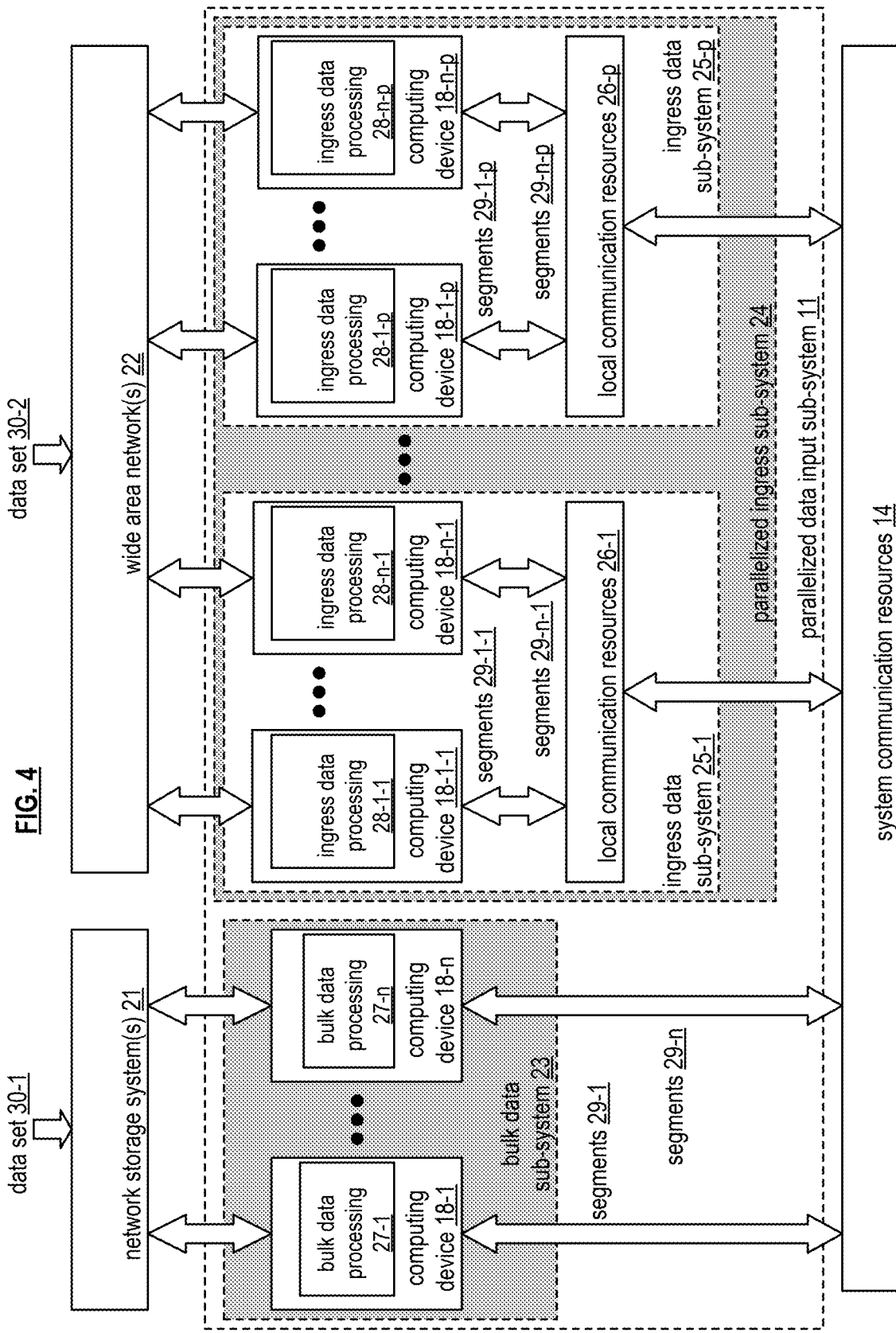
FIG. 4 is a schematic block diagram of an embodiment of a parallelized data input sub-system in accordance with various embodiments.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
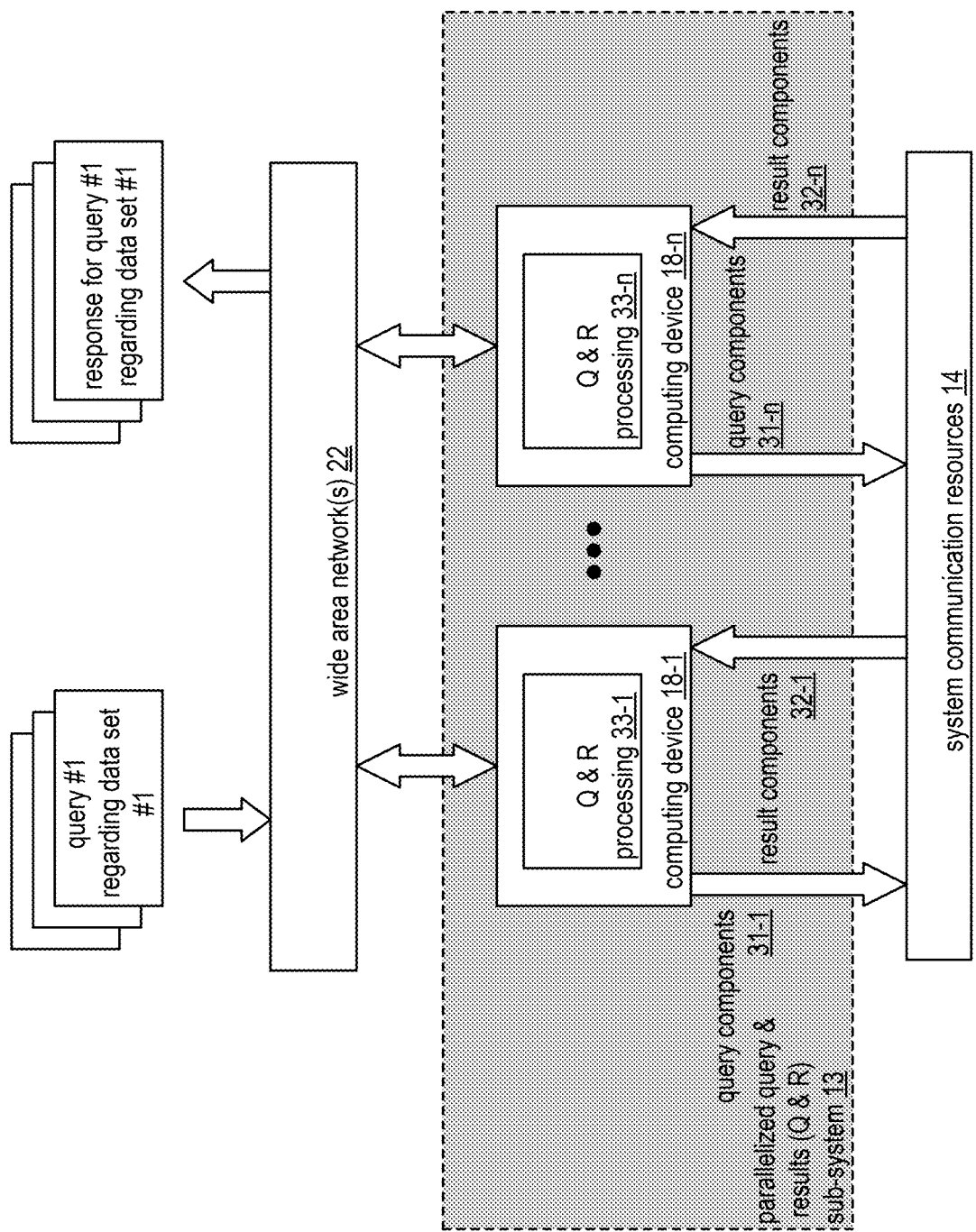
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
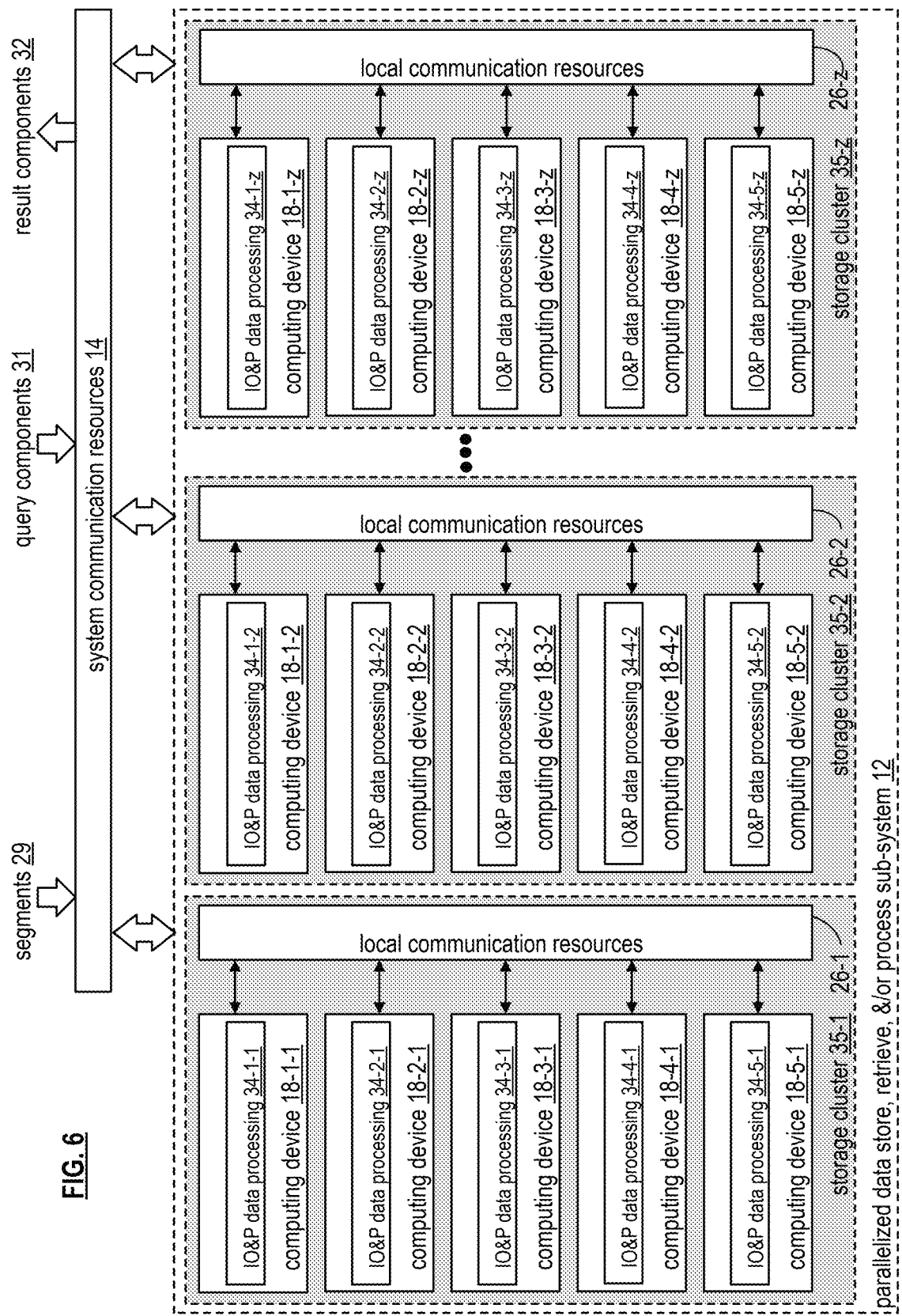
FIG. 6 is a schematic block diagram of an embodiment of a parallelized data store, retrieve, and/or process (IO& P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
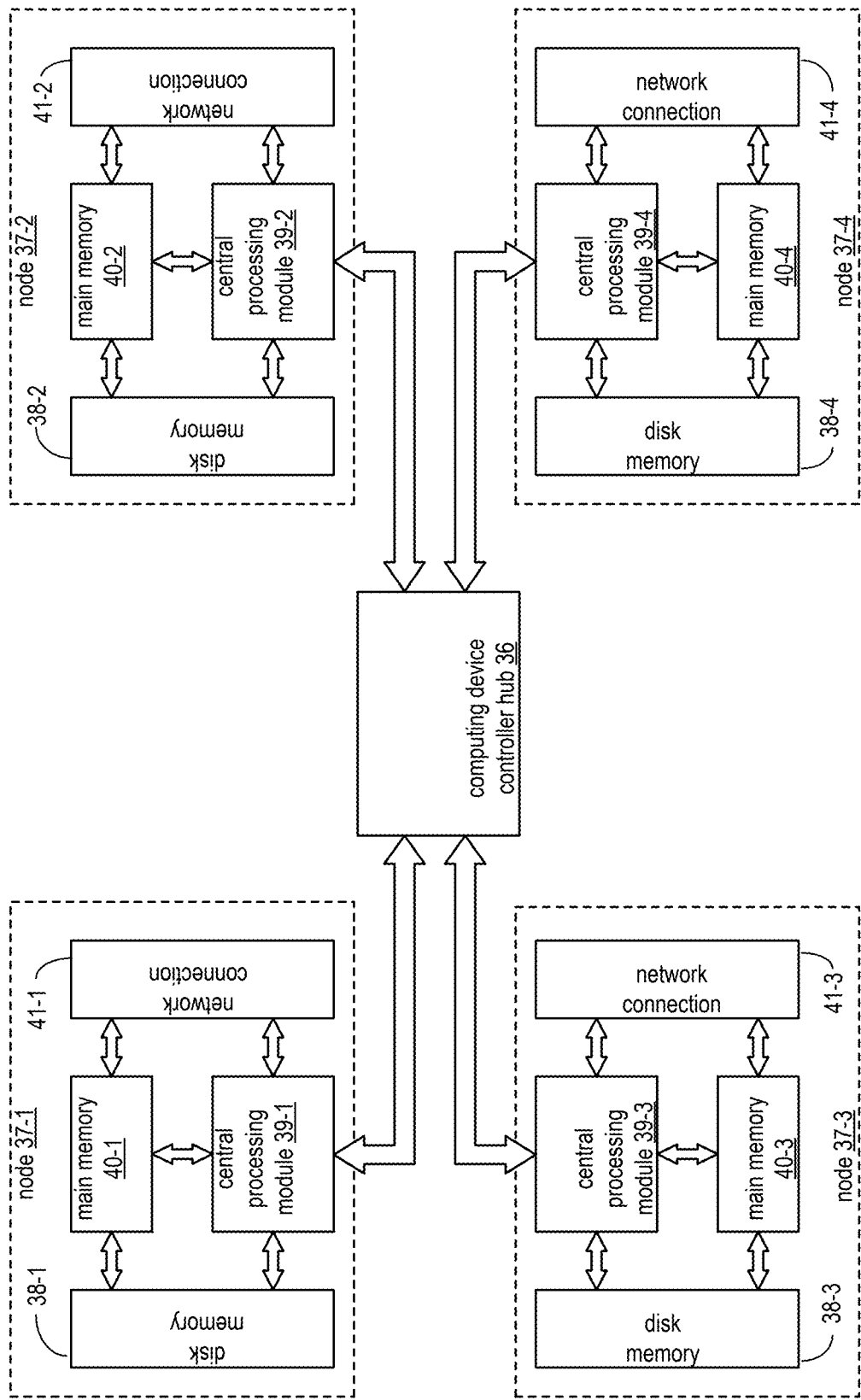
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
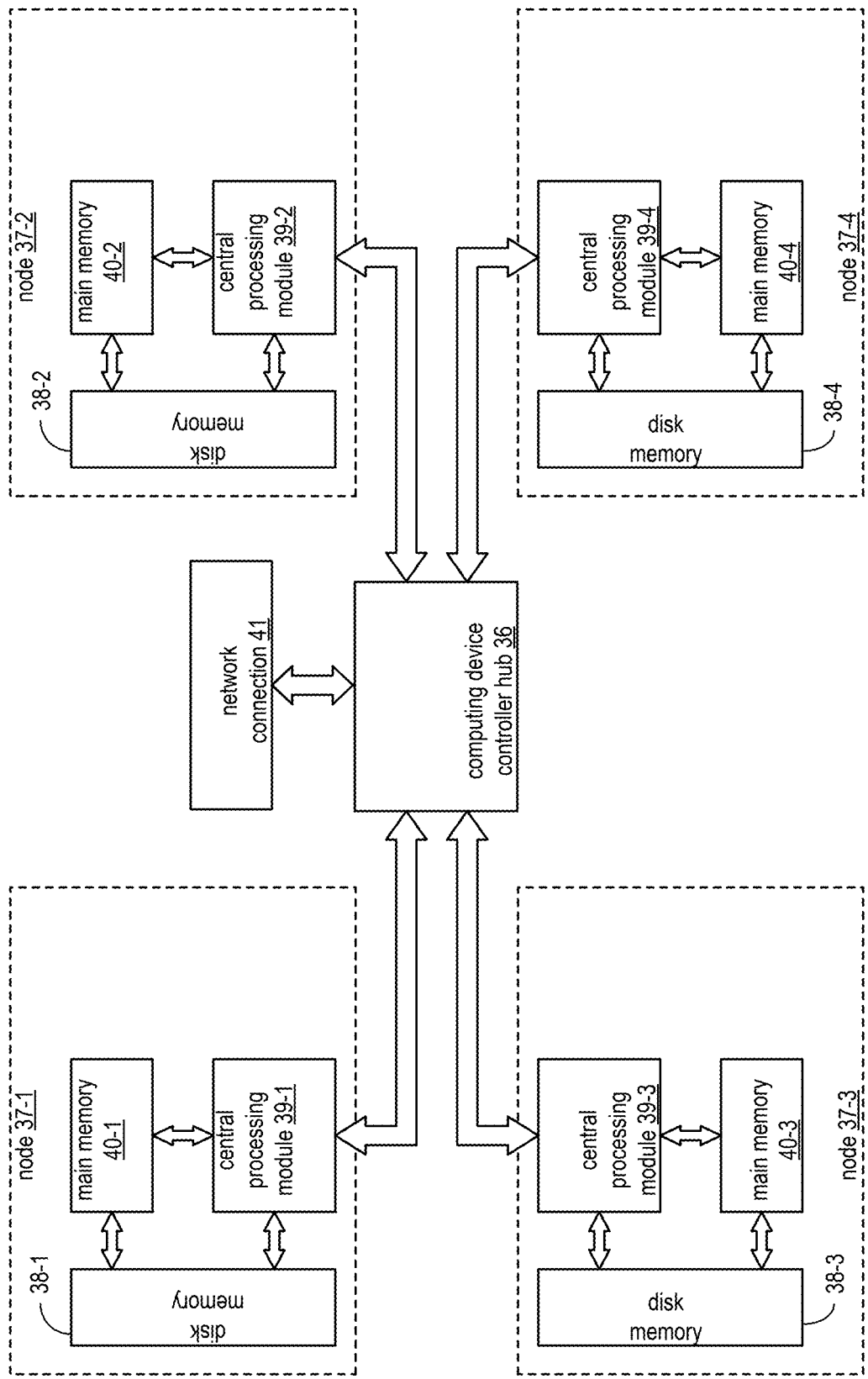
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
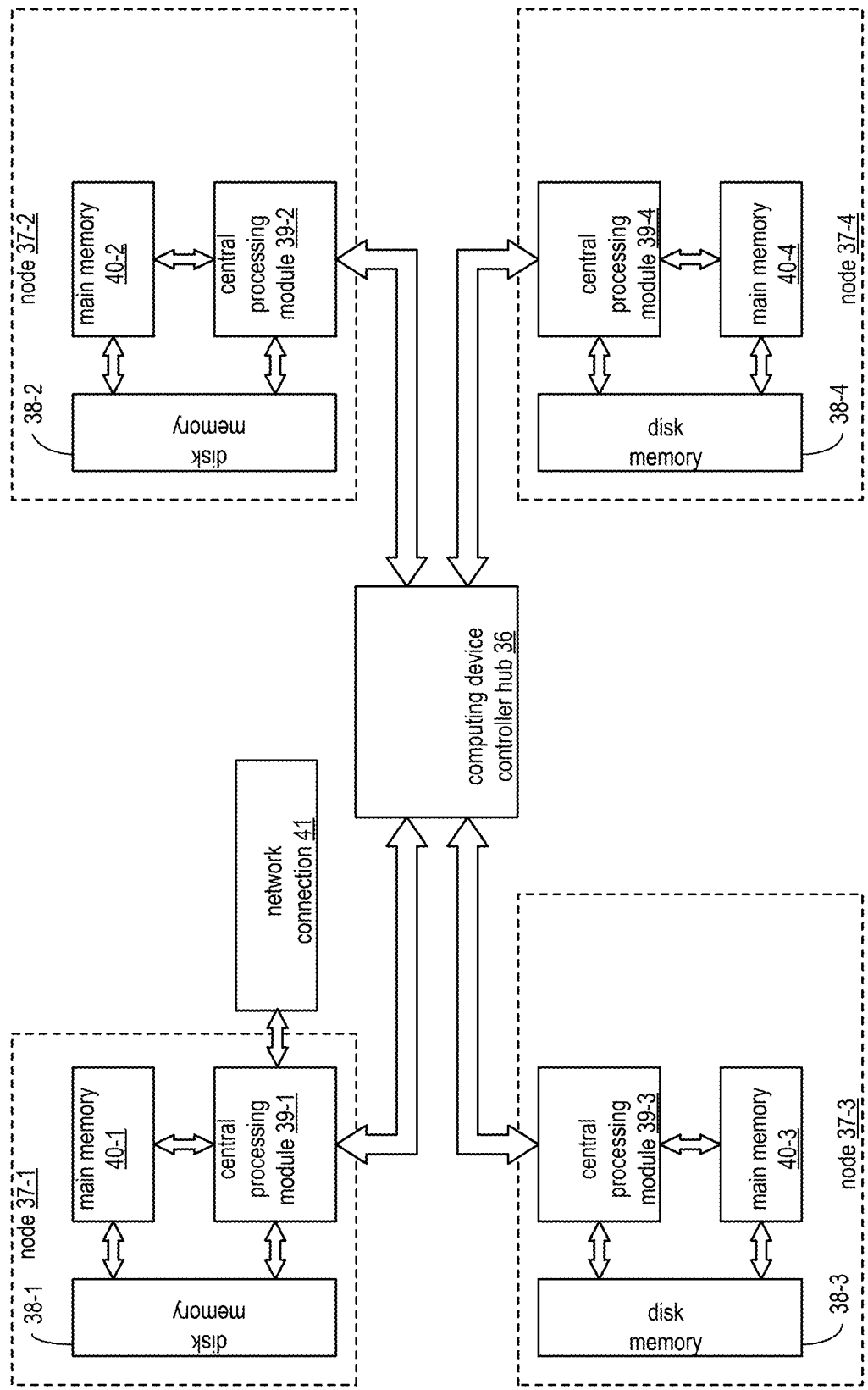
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
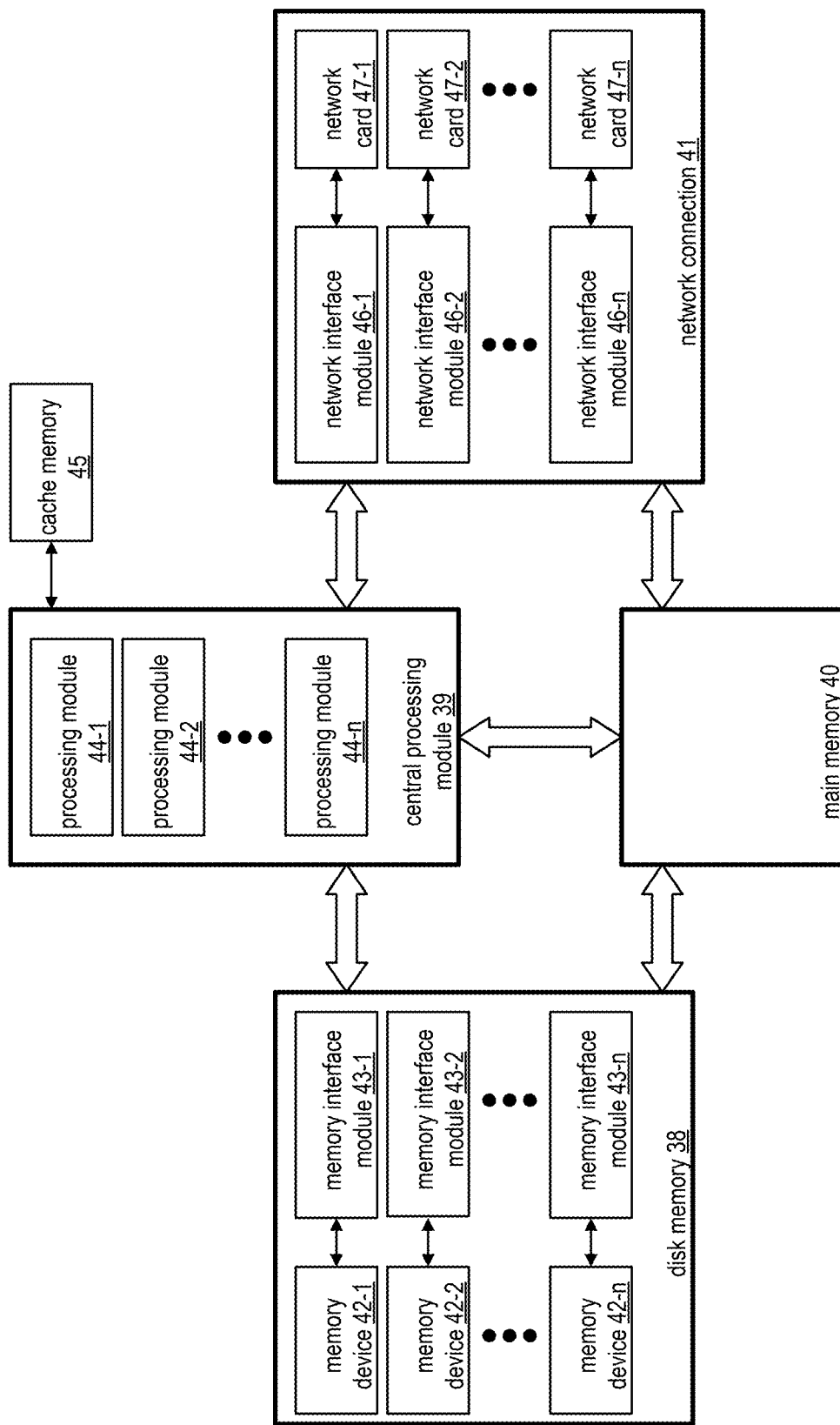
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
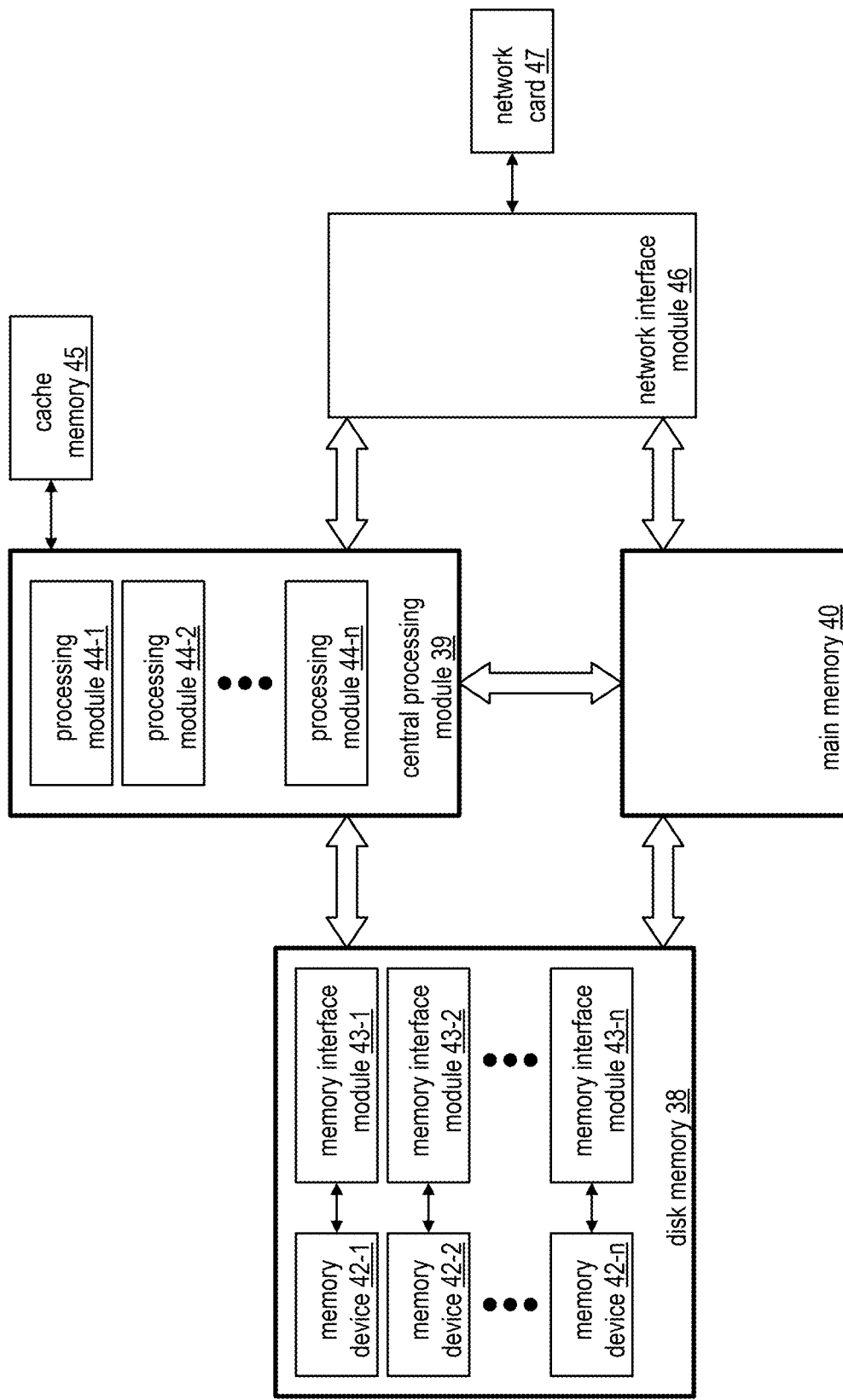
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
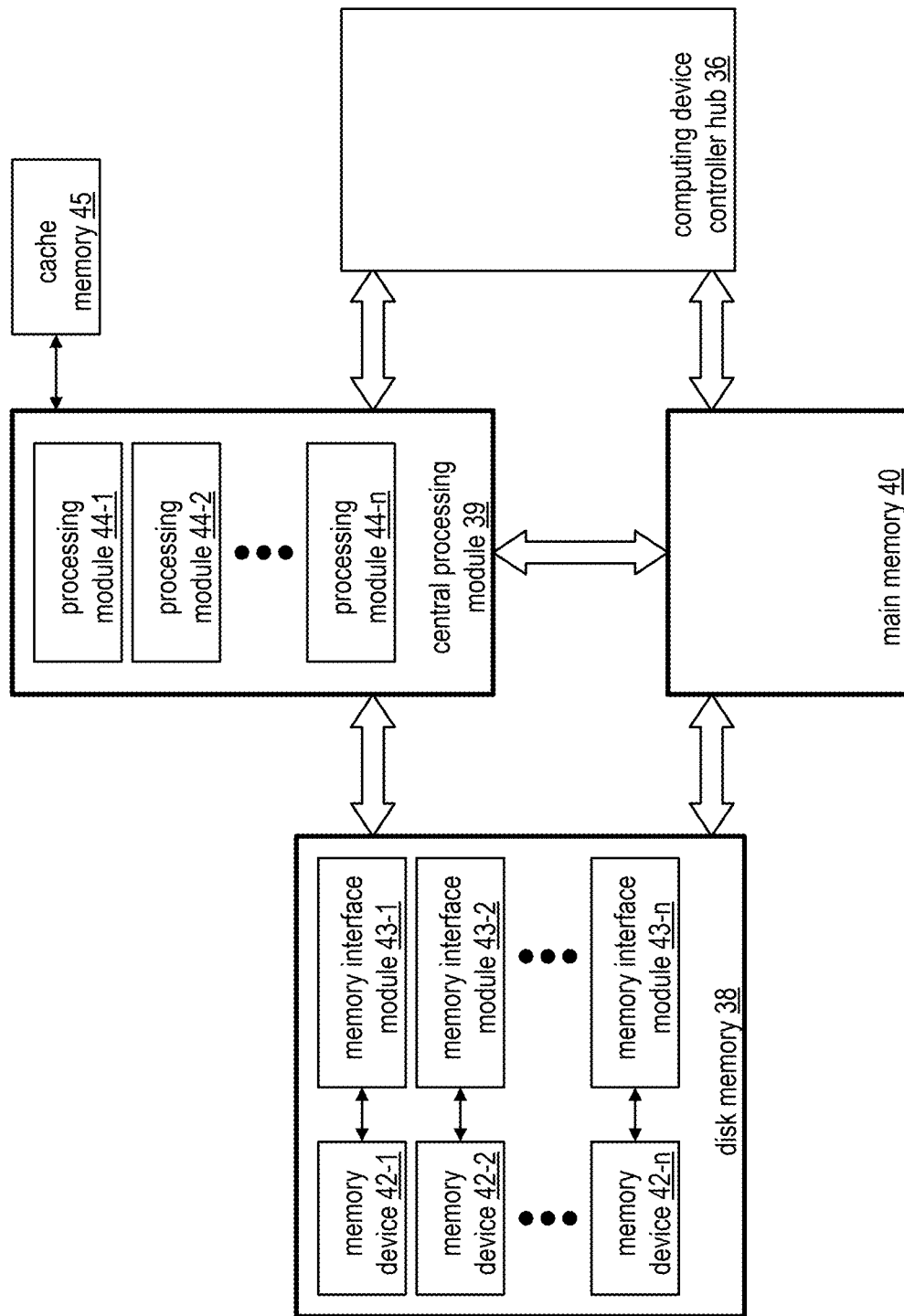
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
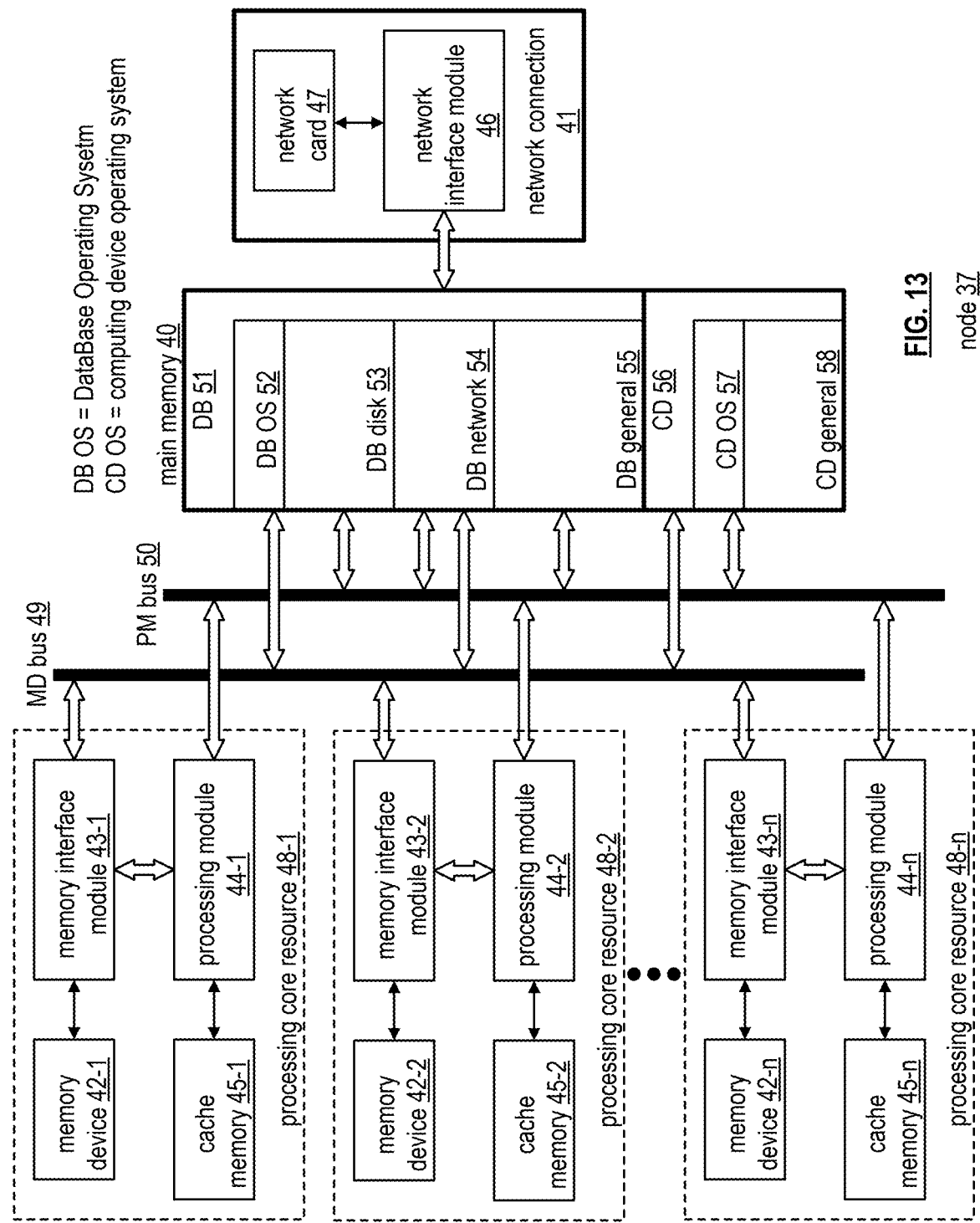
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
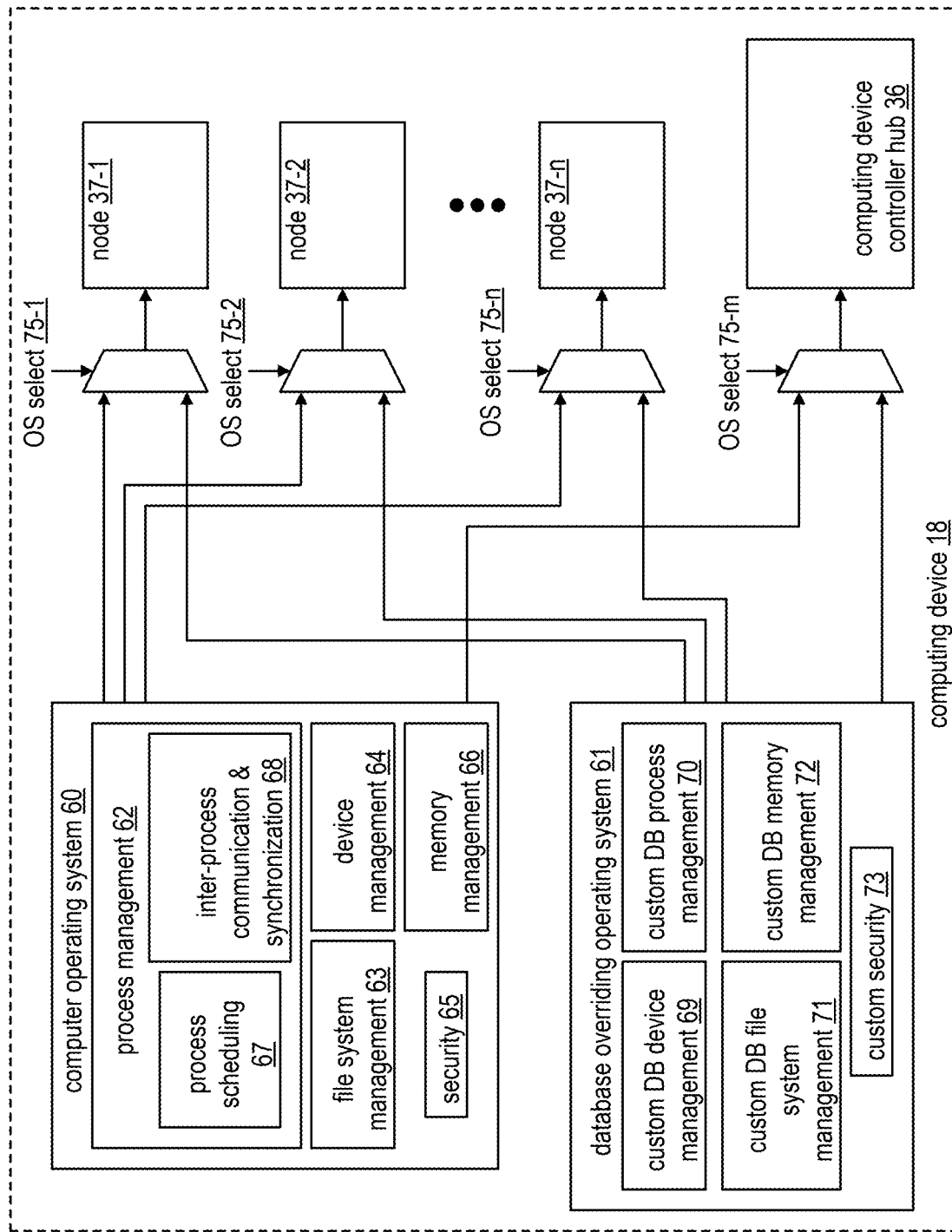
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
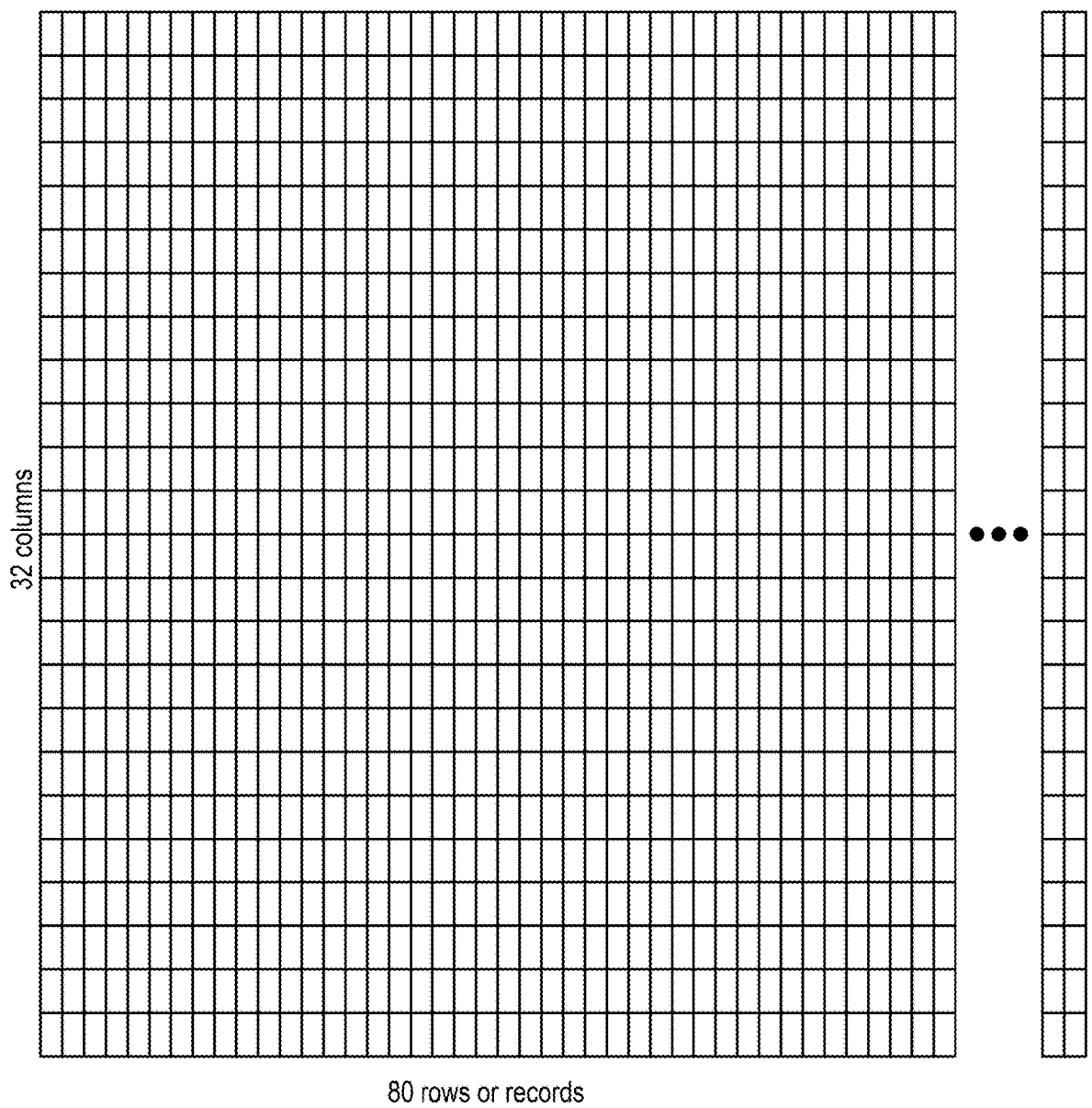

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
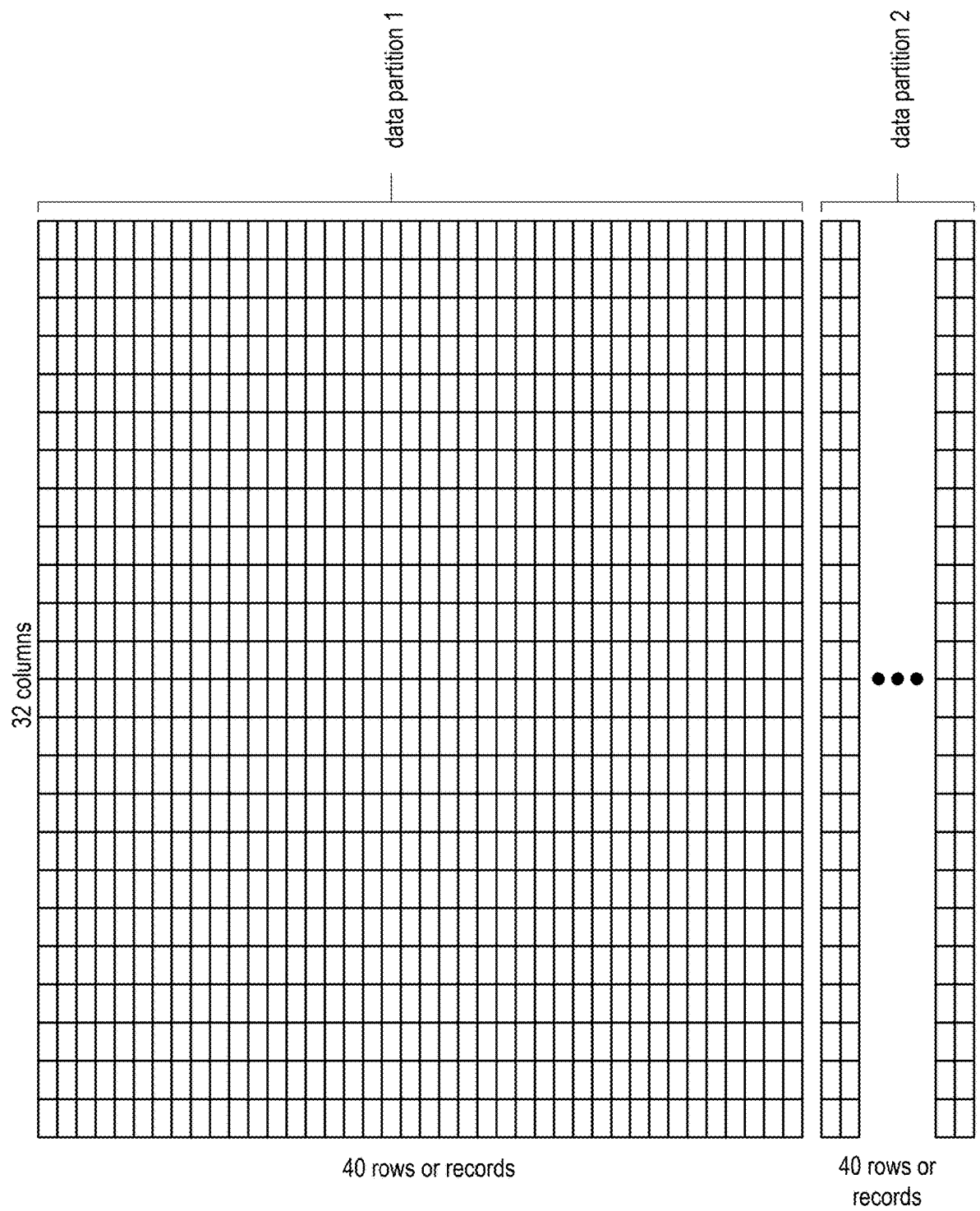

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
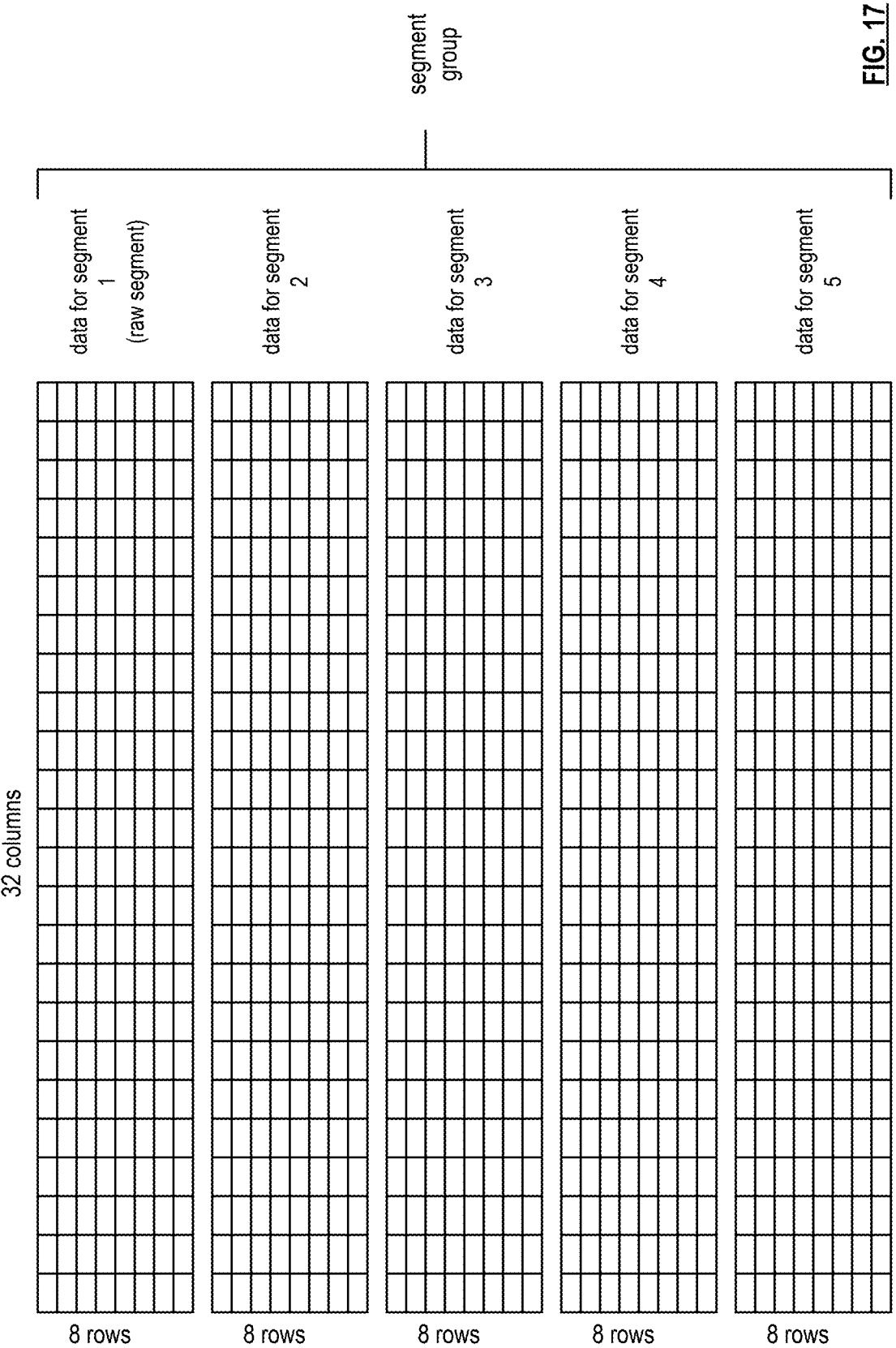

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
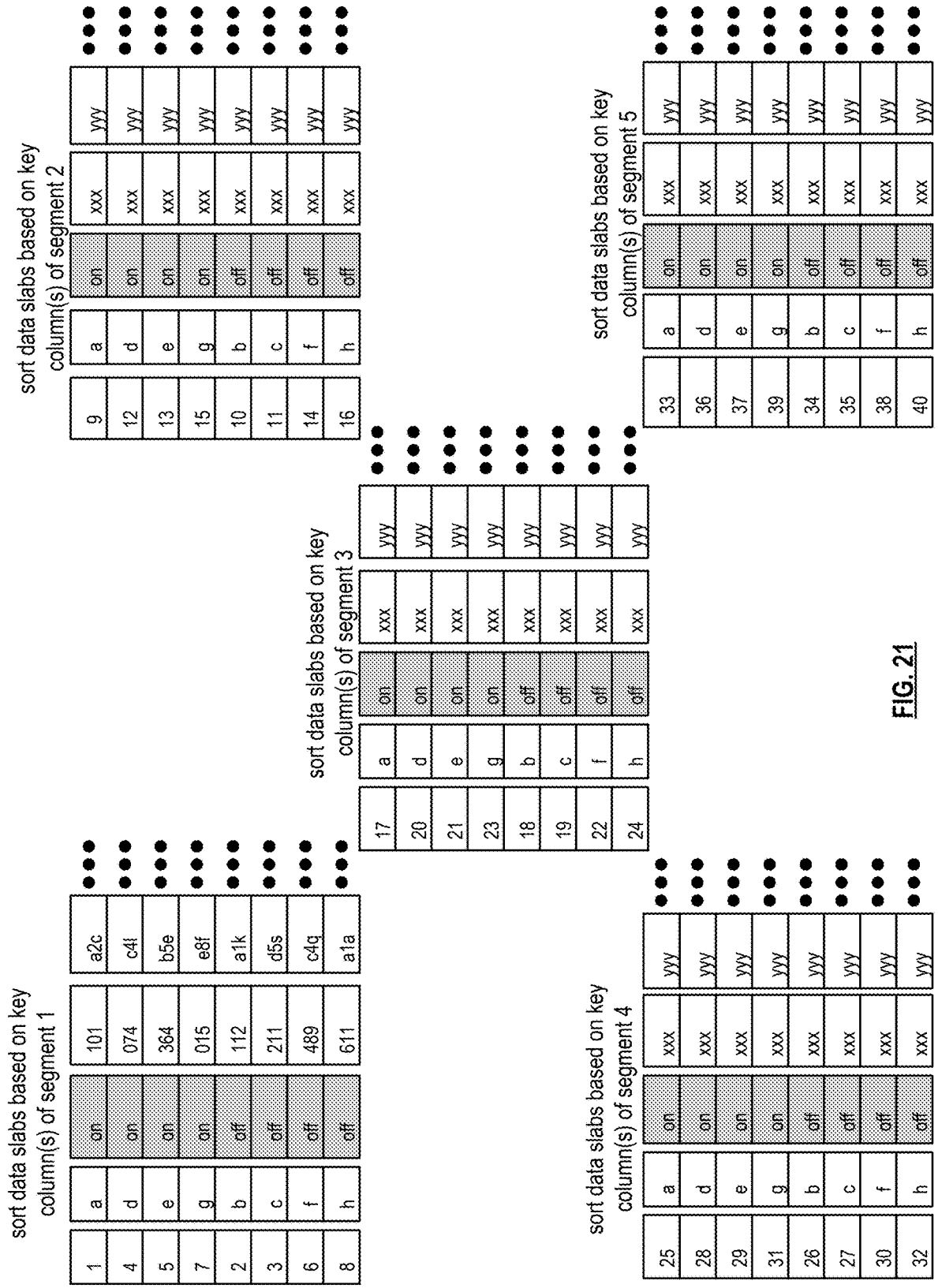

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
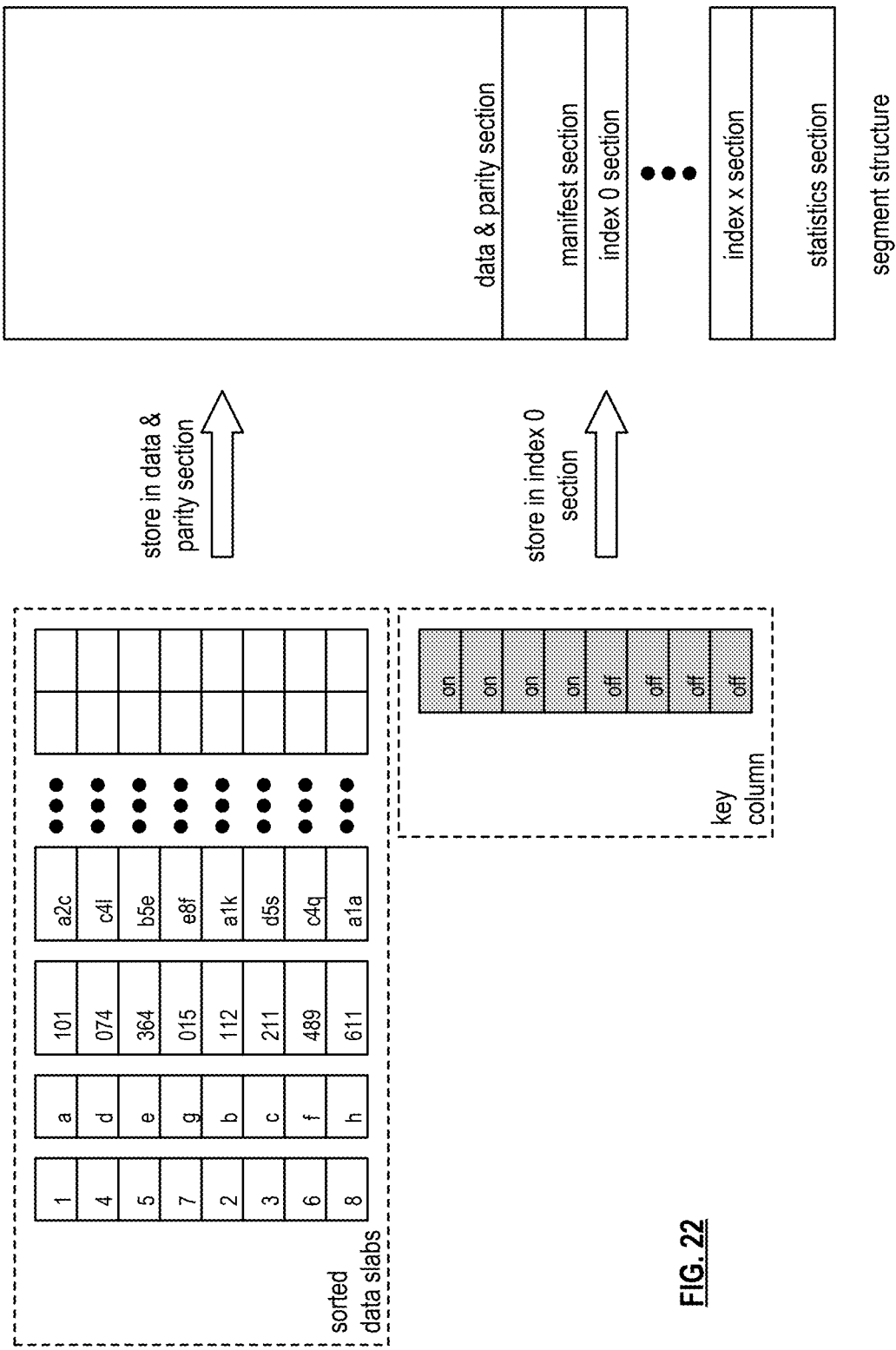

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
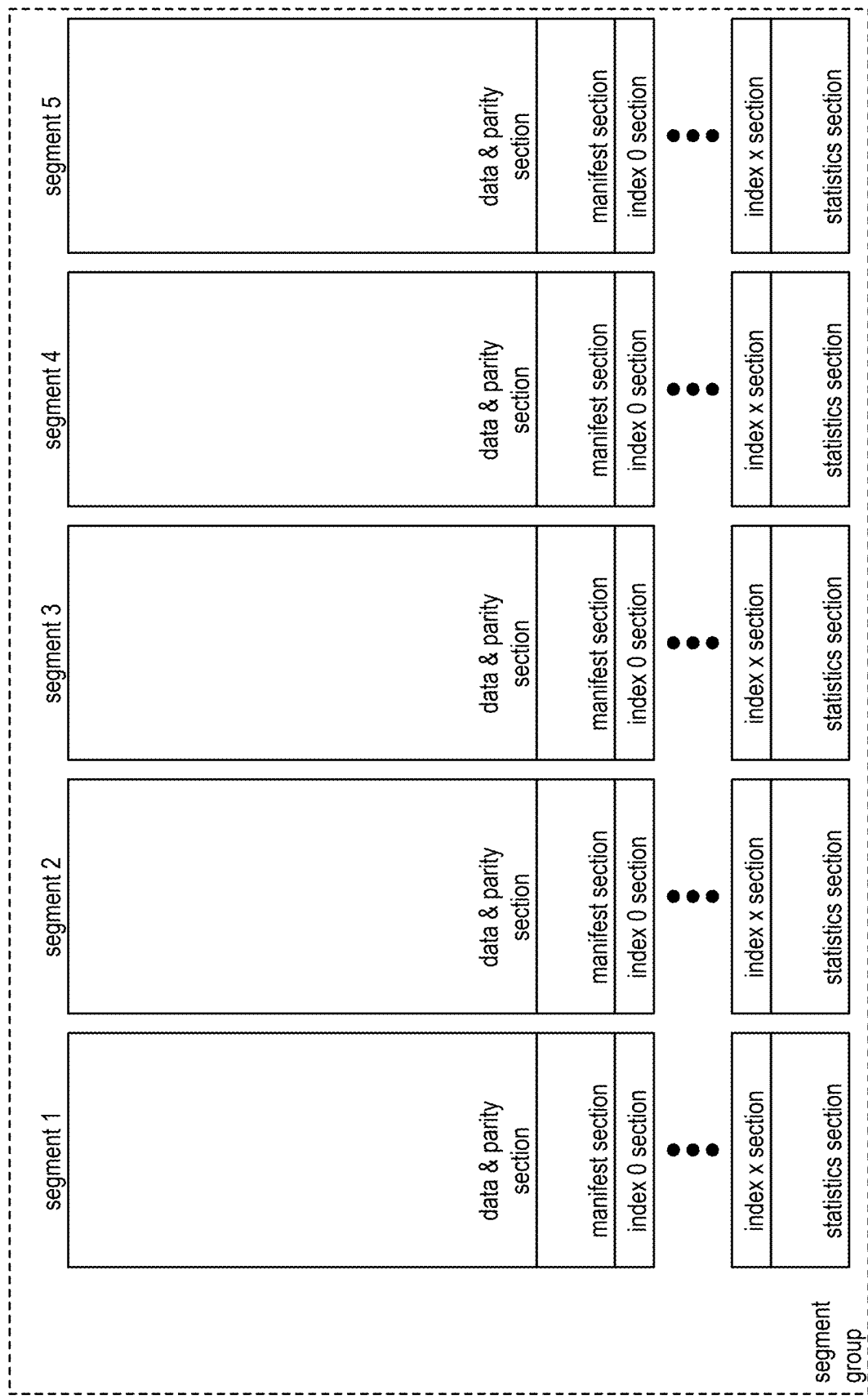

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
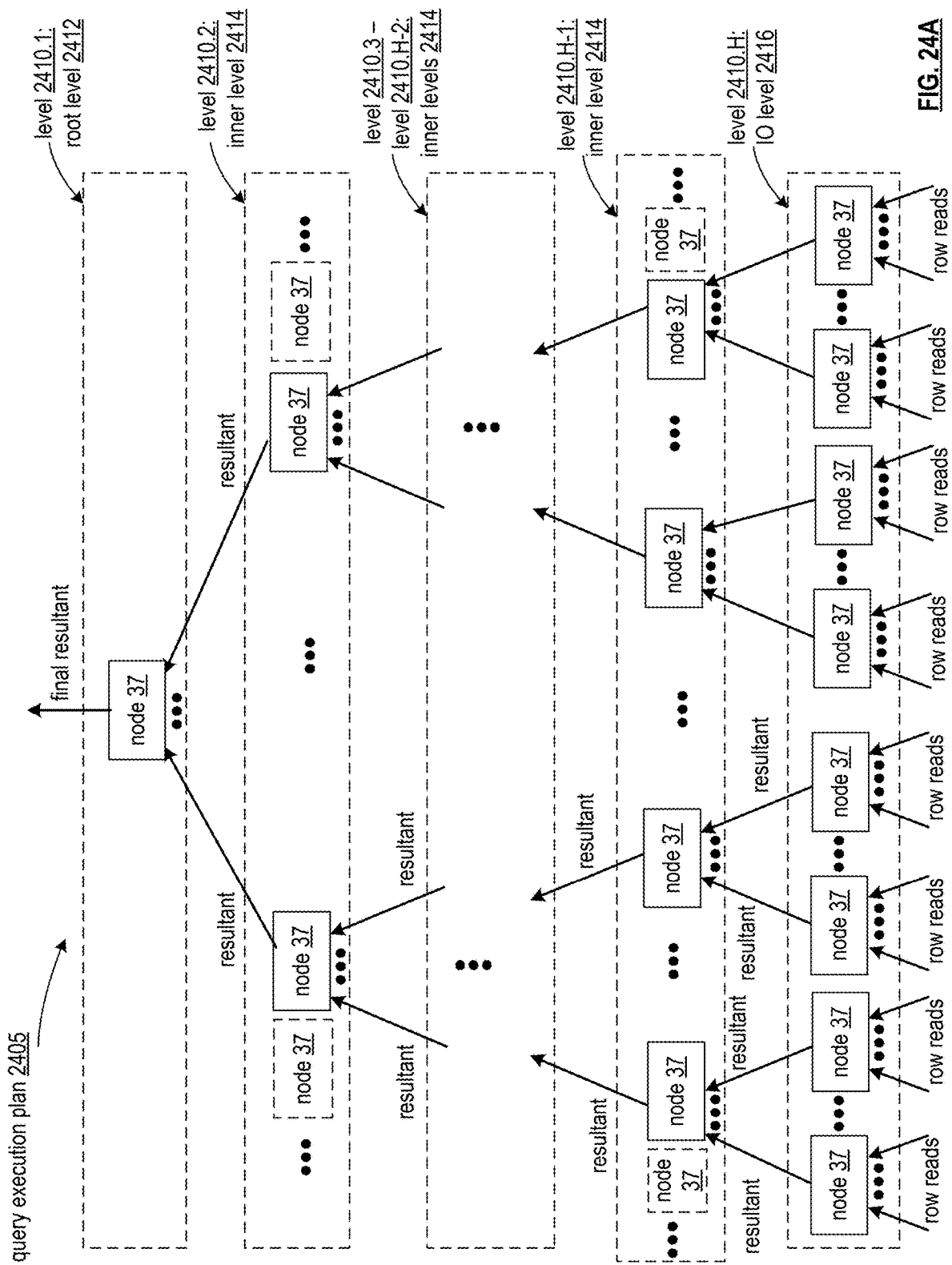
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata, such as system metadata applied across a plurality of nodes 37, for example, where at least one node 37 participates in some or all features and/or functionality of FIG. 24A based on receiving and storing the system metadata in local memory of the at least one node 37 as configuration data, such as configuration data, and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
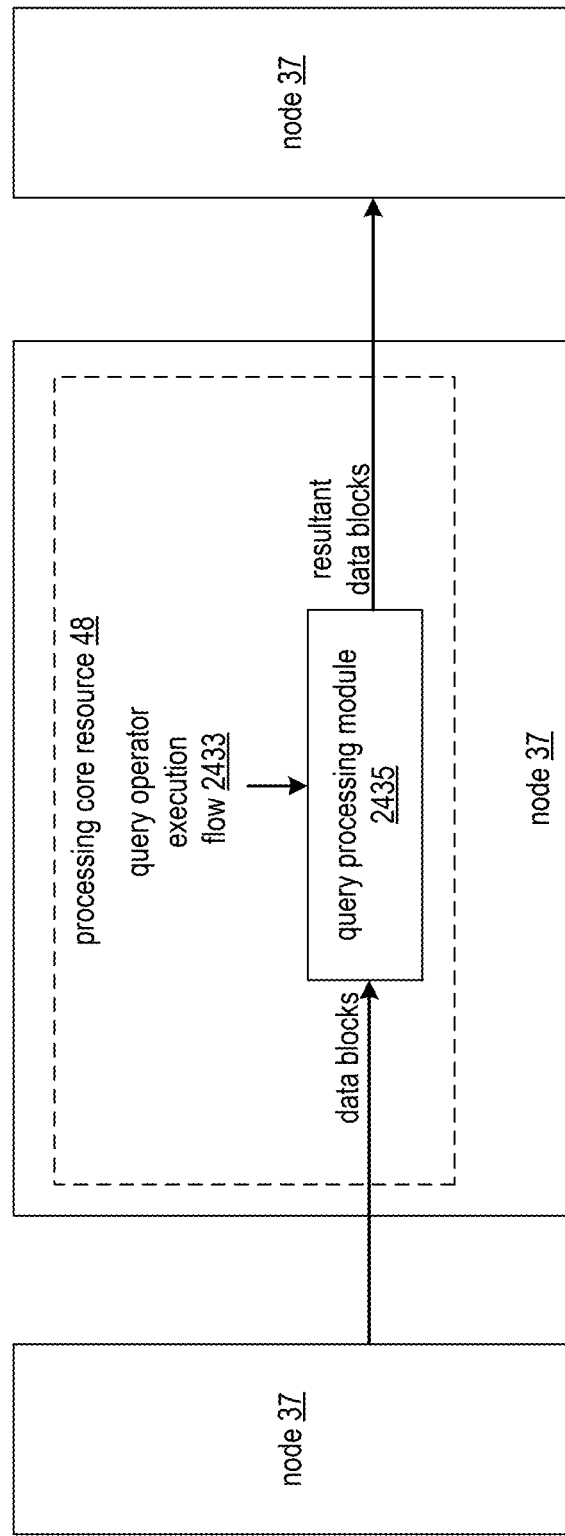
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata, such as system metadata, applied across a plurality of nodes 37 that includes the given node, for example, where the given node 37 participates in some or all features and/or functionality of FIG. 24B based on receiving and storing the system metadata in local memory of given node 37 as configuration data, and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
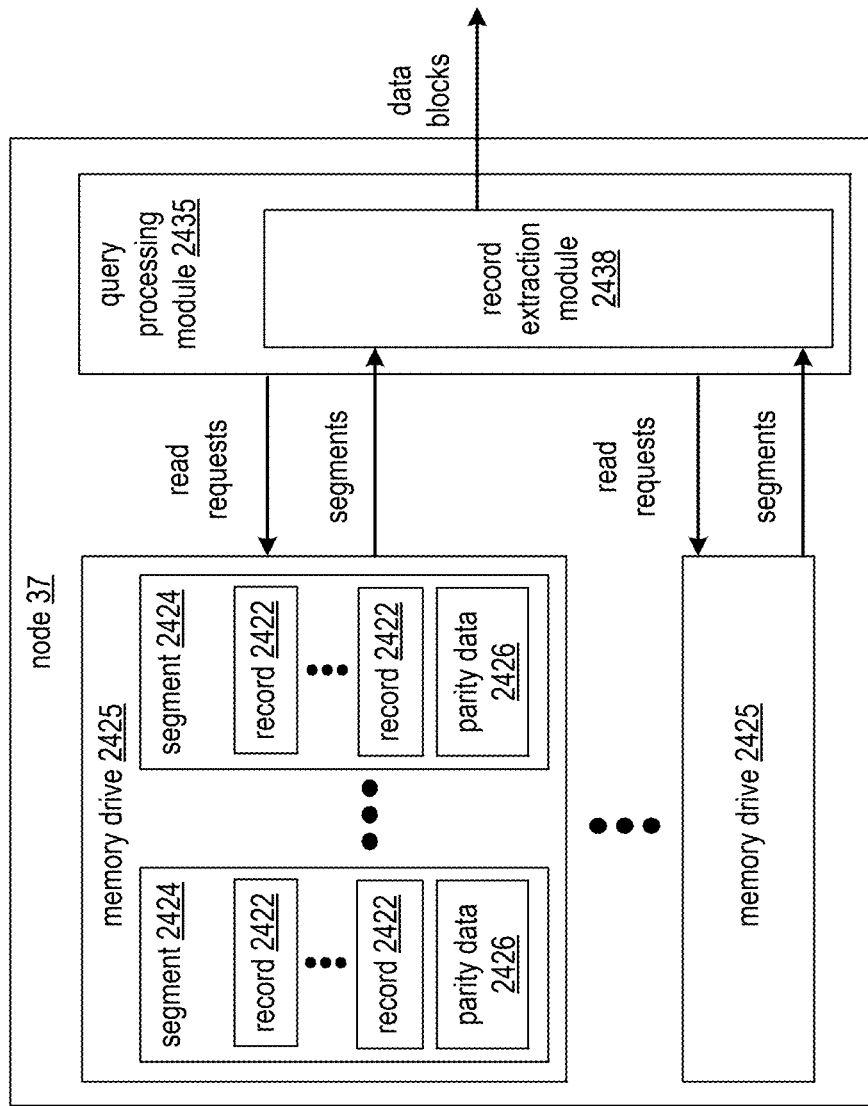

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata, such as system metadata, applied across a plurality of nodes 37 that includes the given node, for example, where the given node 37 participates in some or all features and/or functionality of FIG. 24C based on receiving and storing the system metadata in local memory of given node 37 as configuration data, and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
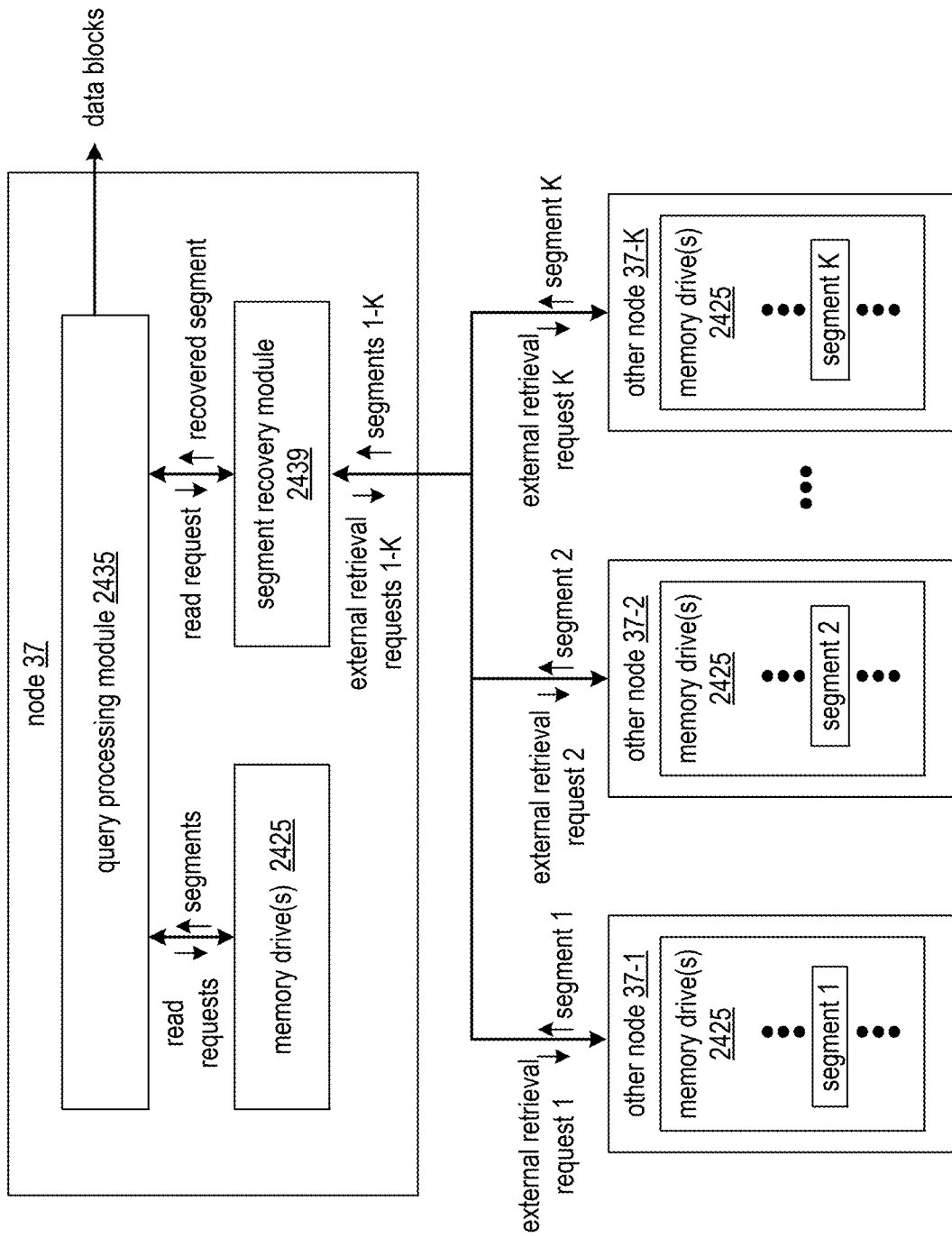

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata, such as system metadata, applied across a plurality of nodes 37 that includes the given node, for example, where the given node 37 participates in some or all features and/or functionality of FIG. 24D based on receiving and storing the system metadata in local memory of given node 37 as configuration data, and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24E:
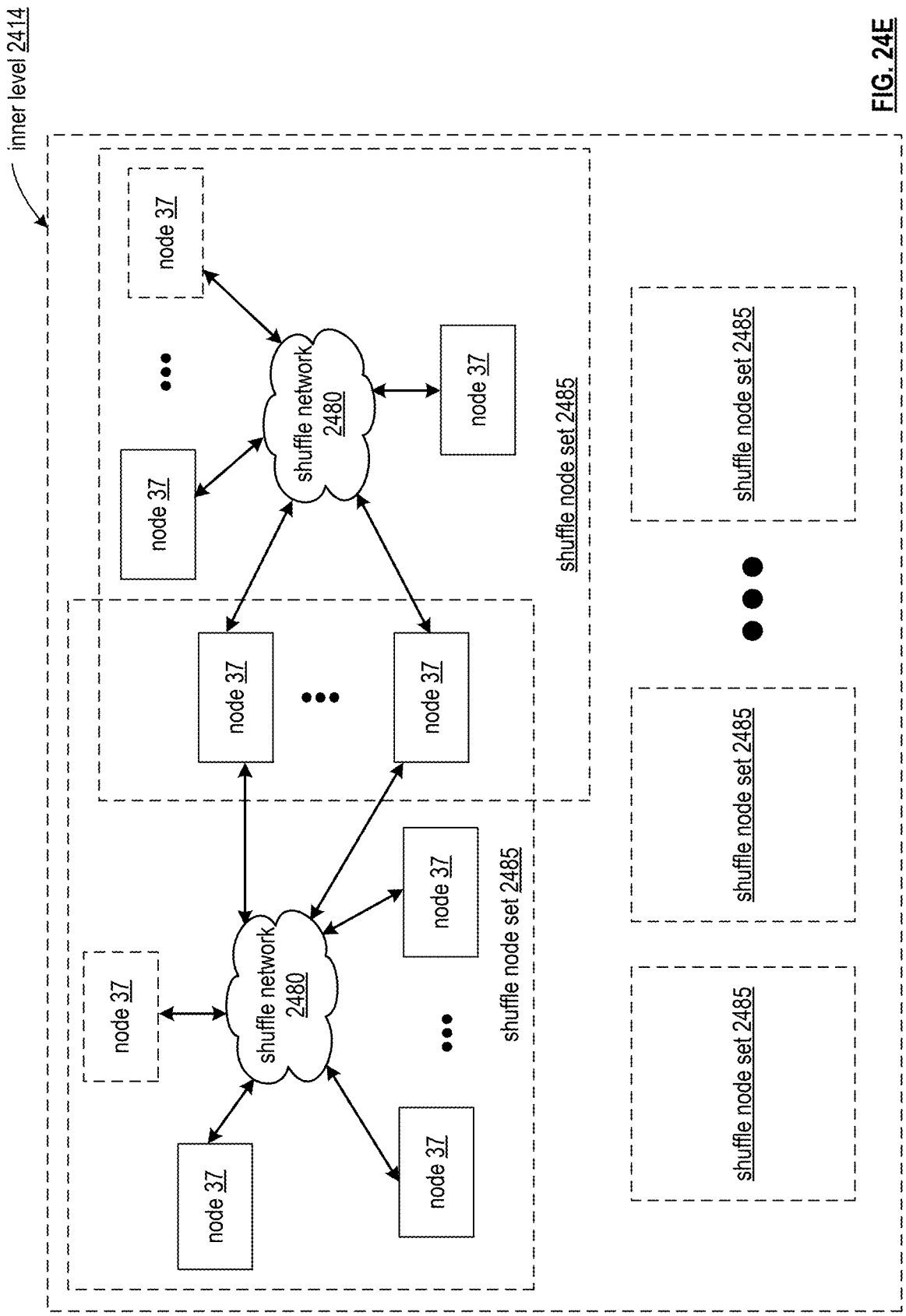
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata, such as system, applied across a plurality of nodes 37, for example, where at least one node 37 participates in some or all features and/or functionality of FIG. 24E based on receiving and storing the system metadata in local memory of the at least one node 37 as configuration data, and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
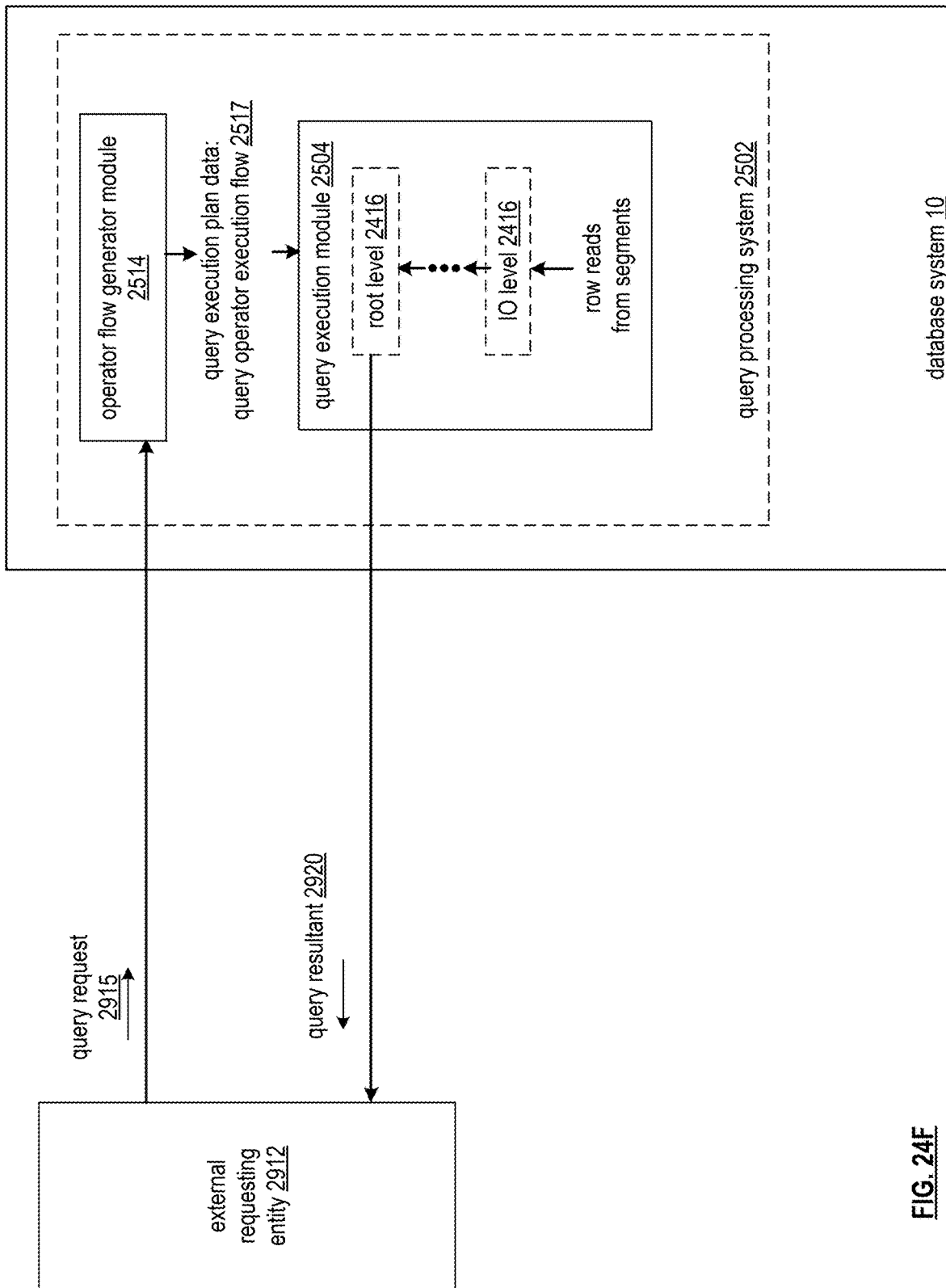
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2915. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2915 for execution via the database system 10, where the corresponding query resultant 2920 is transmitted back to the computing device, for example, for storage by the computing device and/or for display to the corresponding user via a display device.

Some or all features and/or functionality of FIG. 24F can be performed via at least one node 37 in conjunction with system metadata applied across a plurality of nodes 37, for example, where at least one node 37 participates in some or all features and/or functionality of FIG. 24F based on receiving and storing the system metadata in local memory of the at least one node 37 as configuration data, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
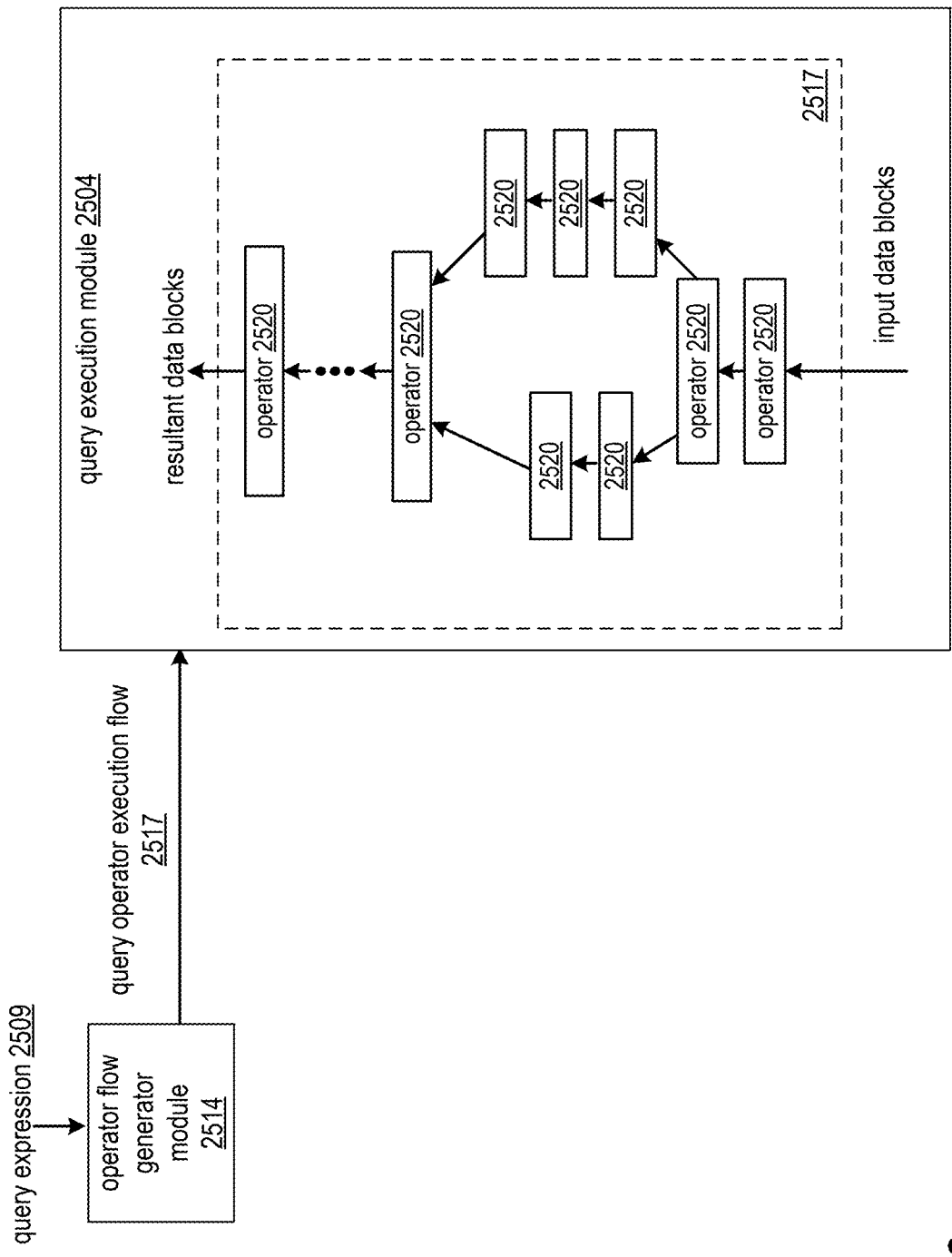
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata applied across a plurality of nodes 37, for example, where at least one node 37 participates in some or all features and/or functionality of FIG. 24G based on receiving and storing the system metadata in local memory of the at least one node 37 as configuration data and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in a same shuffle node set as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.$i$+1 of the common query operator execution flow 2433 of the one or more other nodes in a same shuffle node set based on being serially next in the sequential ordering.

In some cases, in addition to a particular node sending this output generated via a node's execution of a particular operator 2520.$i$ to one or more other nodes to be input data set 2522 the next operator 2520.$i$+1 in the common query operator execution flow 2433 of the one or more other nodes 37, the particular node also receives output generated via some or all of these one or more other nodes' execution of this particular operator 2520.$i$ in their own query operator execution flow 2433 upon their own corresponding input data set 2522 for this particular operator. The particular node adds this received output of execution of operator 2520.$i$ by the one or more other nodes to the be input data set 2522 of its own next operator 2520.$i$+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.$i$+1 corresponds to and/or is utilized to implement JOIN operator and/or a custom-join operator of the query operator execution flow 2517, and where the operator 2520.$i$+1 thus utilizes input received from many different nodes in the shuffle node set in accordance with their performing of all of the operators serially before operator 2520.$i$+1 to generate the input to operator 2520.$i$+1.

Some or all features and/or functionality of FIG. 24H can be performed via at least one node 37 in conjunction with system metadata applied across a plurality of nodes 37, for example, where at least one node 37 participates in some or all features and/or functionality of FIG. 24H based on receiving and storing the system metadata in local memory of the at least one node 37 as configuration data, and/or based on further accessing and/or executing this configuration data execute some or all operators of a query operator flow 2517 as part of its database functionality accordingly. Performance of some or all features and/or functionality of FIG. 24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
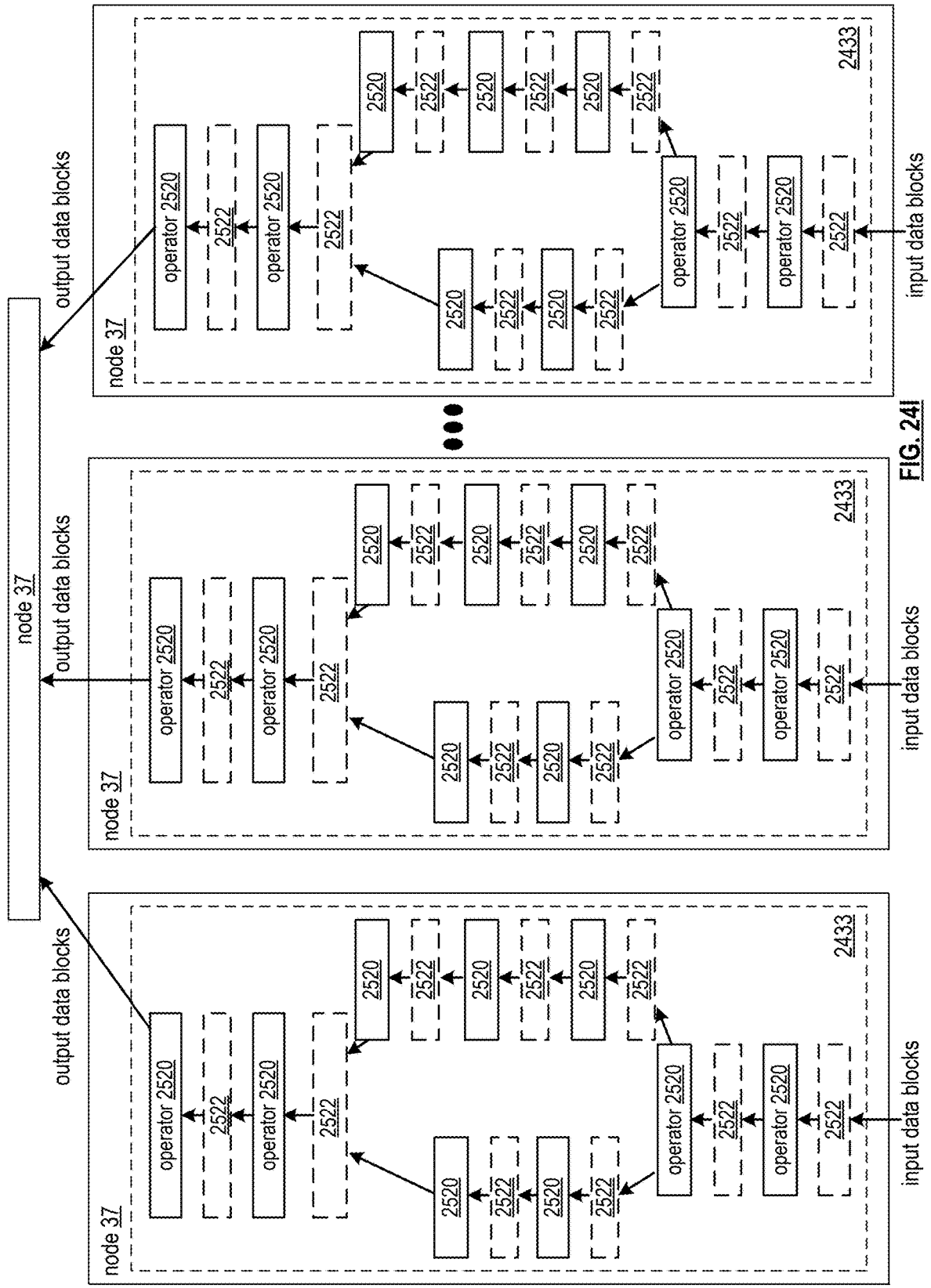
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata applied across a plurality of nodes 37, for example, where at least one node 37 participates in some or all features and/or functionality of FIG. 24I based on receiving and storing the system metadata in local memory of the at least one node 37 as configuration data and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
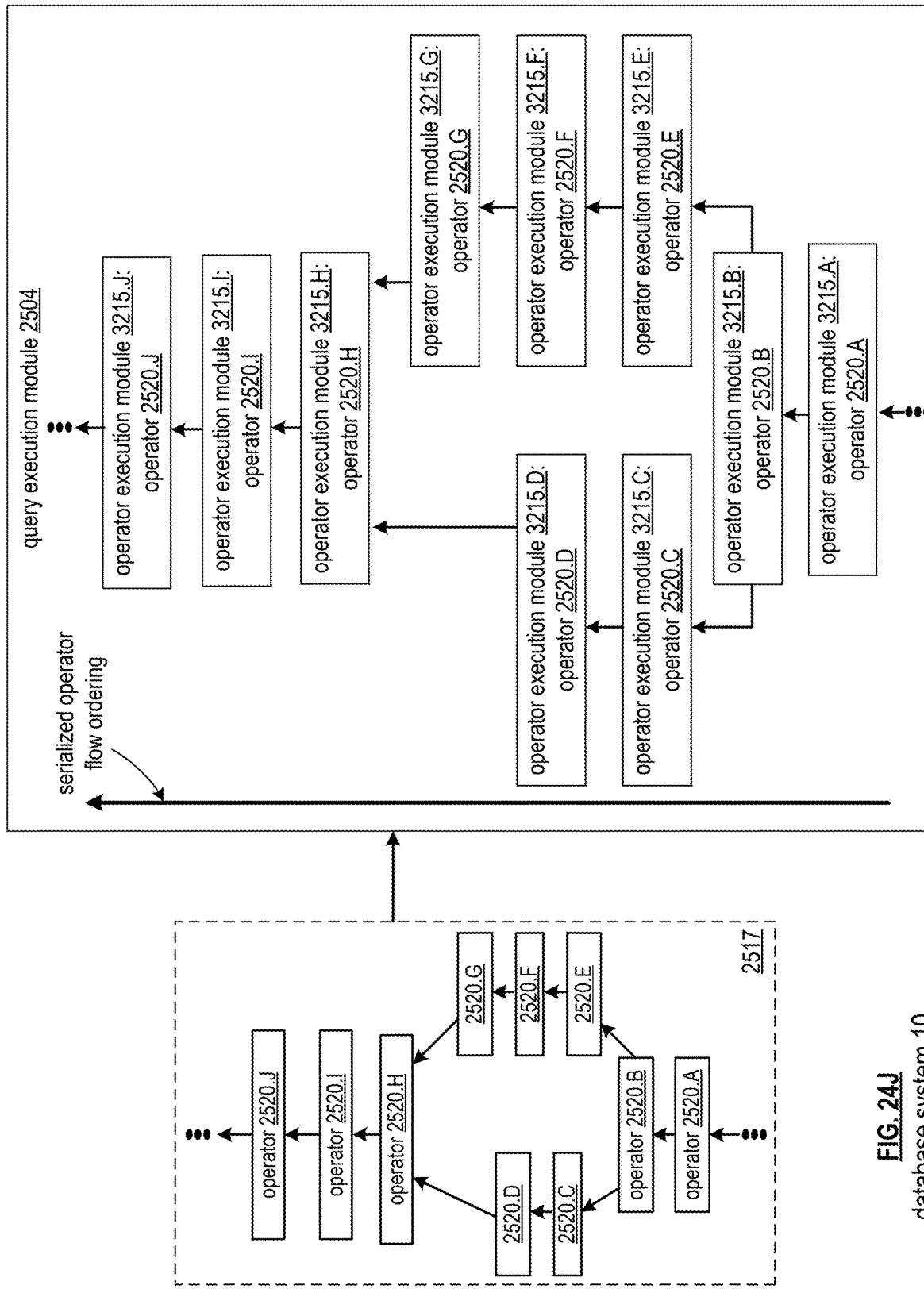
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
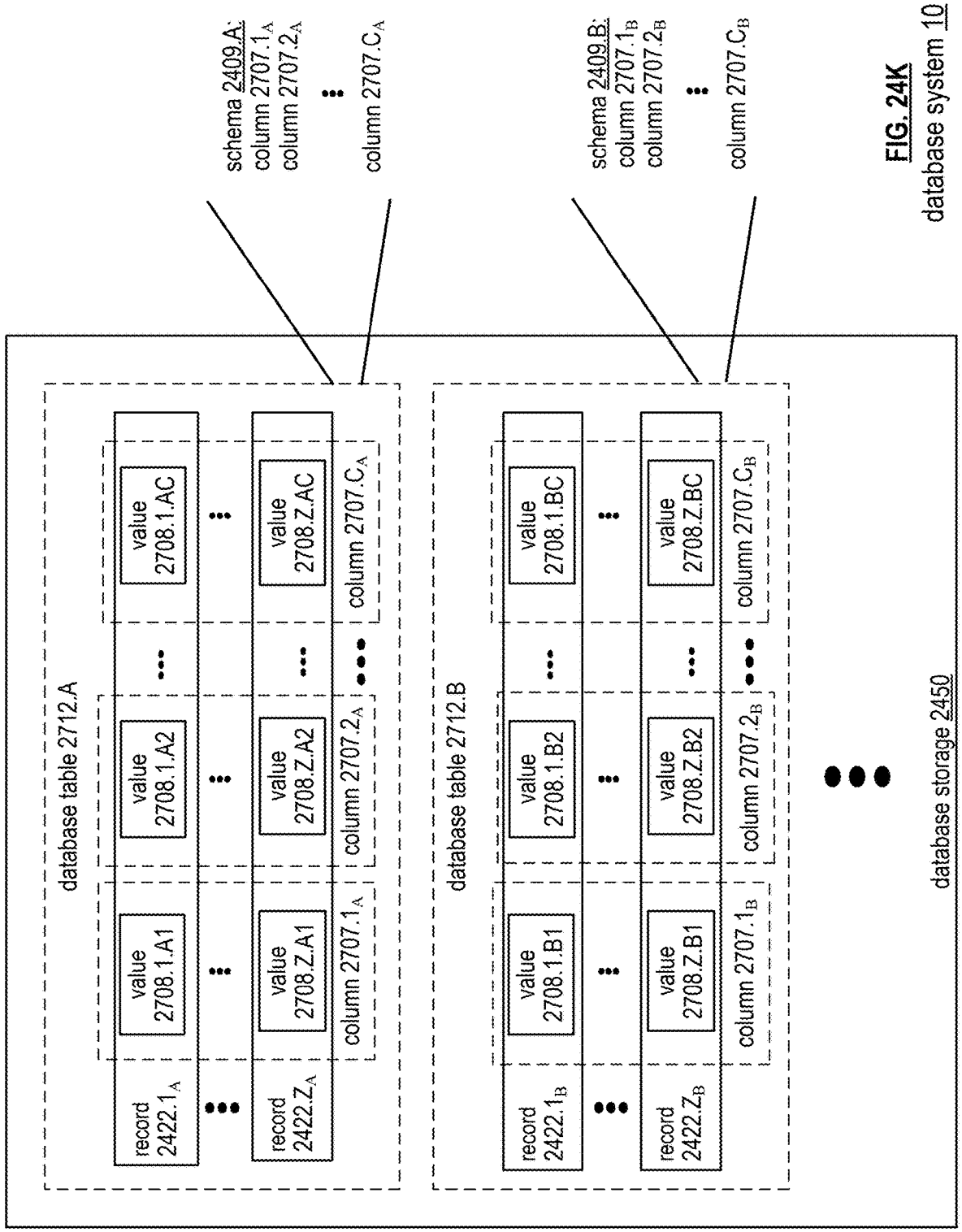
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system itself based on being generated as output of a query executed by query execution module 2504, such as a Create Table As Select (CTAS) query or Insert query.

A given database table 2712 can be accordance with a schema 2409 defining columns of the database table, where records 2422 correspond to rows having values 2708 for some or all of these columns. Different database tables can have different numbers of columns and/or different datatypes for values stored in different columns. For example, the set of columns 2707.1A-2707.CA of schema 2709.A for database table 2712.A can have a different number of columns than and/or can have different datatypes for some or all columns of the set of columns 2707.1B-2707.CB of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
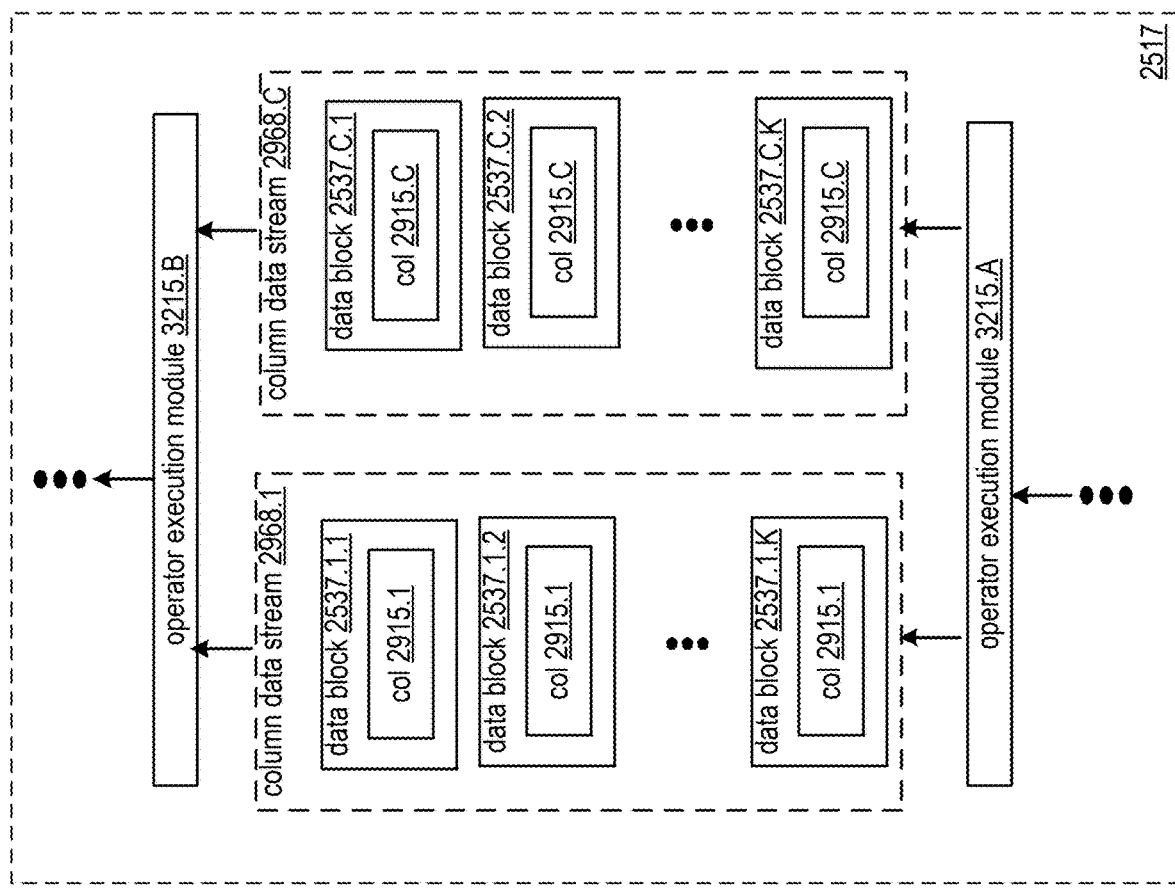
FIG. 24L is a schematic block diagram of a query execution module that implements a plurality of column data streams in accordance with various embodiments.
Figure 24M:
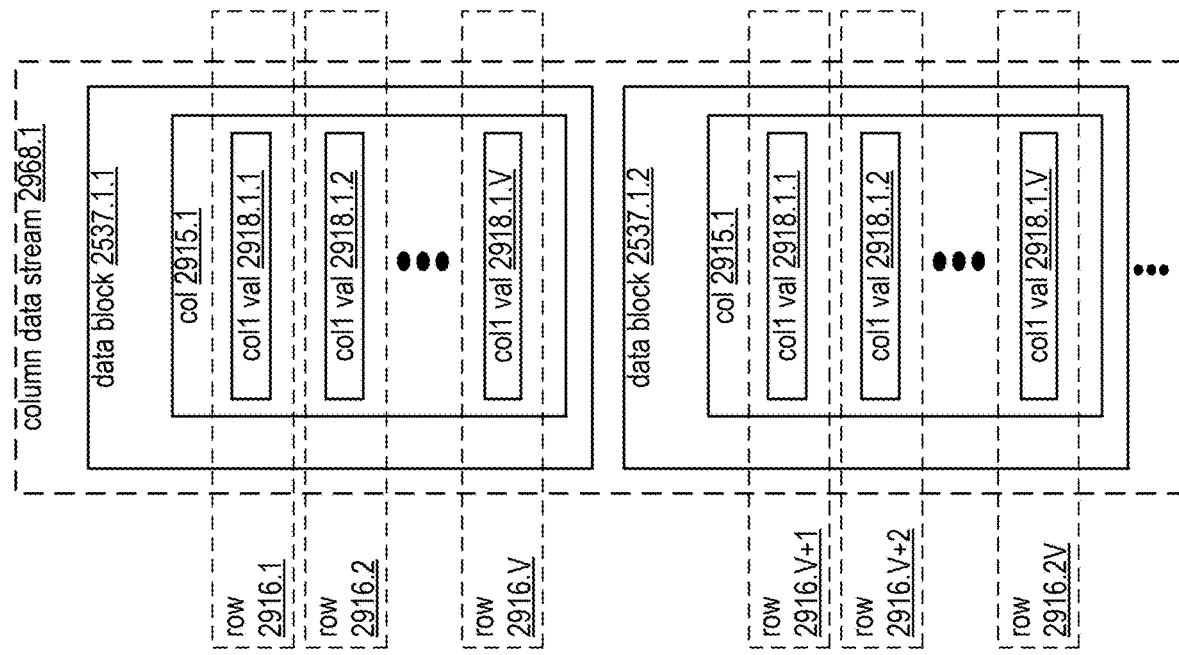
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24N:
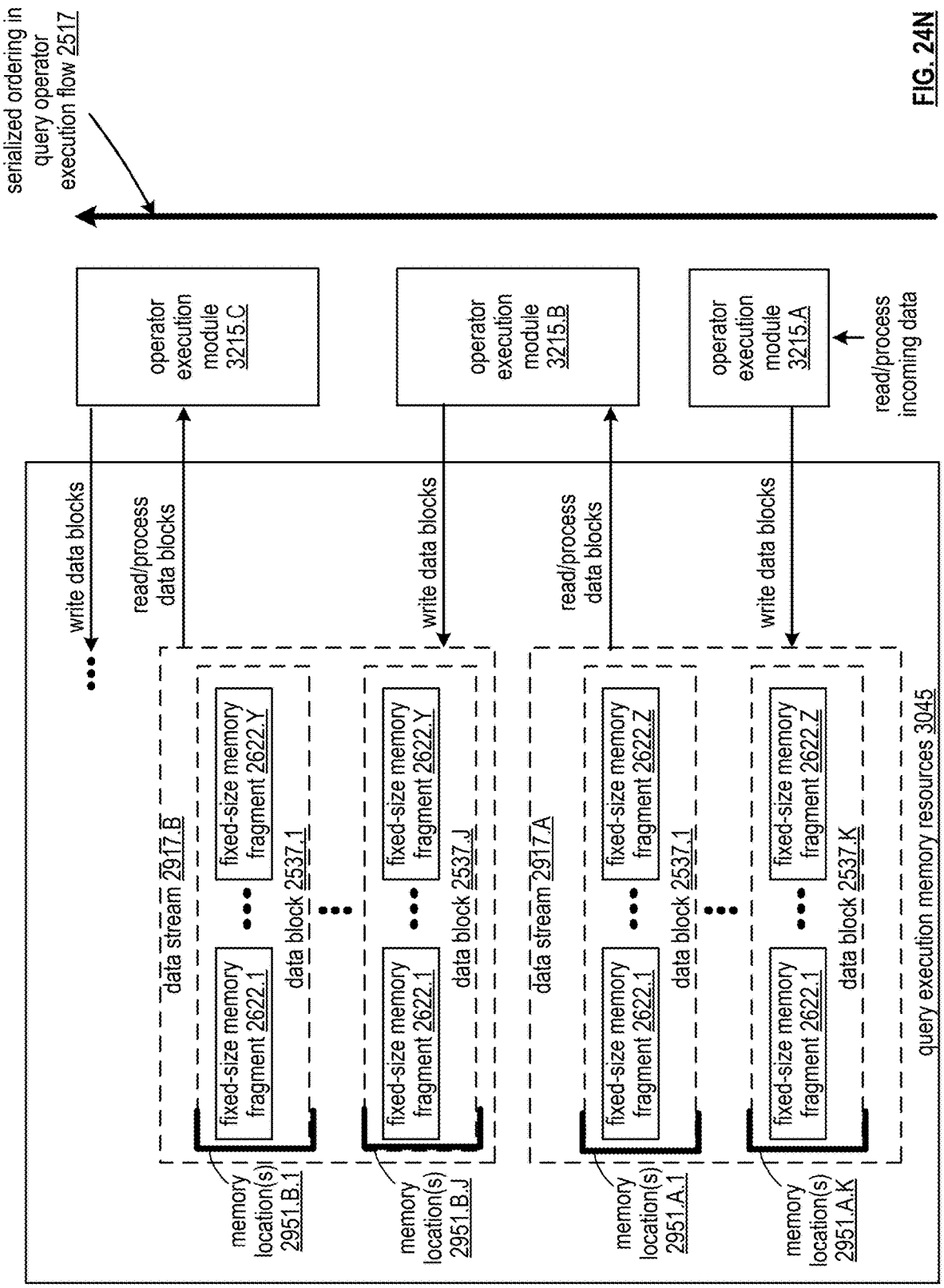
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

FIG. 24O illustrates an embodiment of a database system 10 that implements a segment generator 2507 to generate segments 2424. Some or all features and/or functionality of the database system 10 of FIG. 24O can implement any embodiment of the database system 10 described herein. Some or all features and/or functionality of segments 2424 of FIG. 24O can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

Figure 24P:
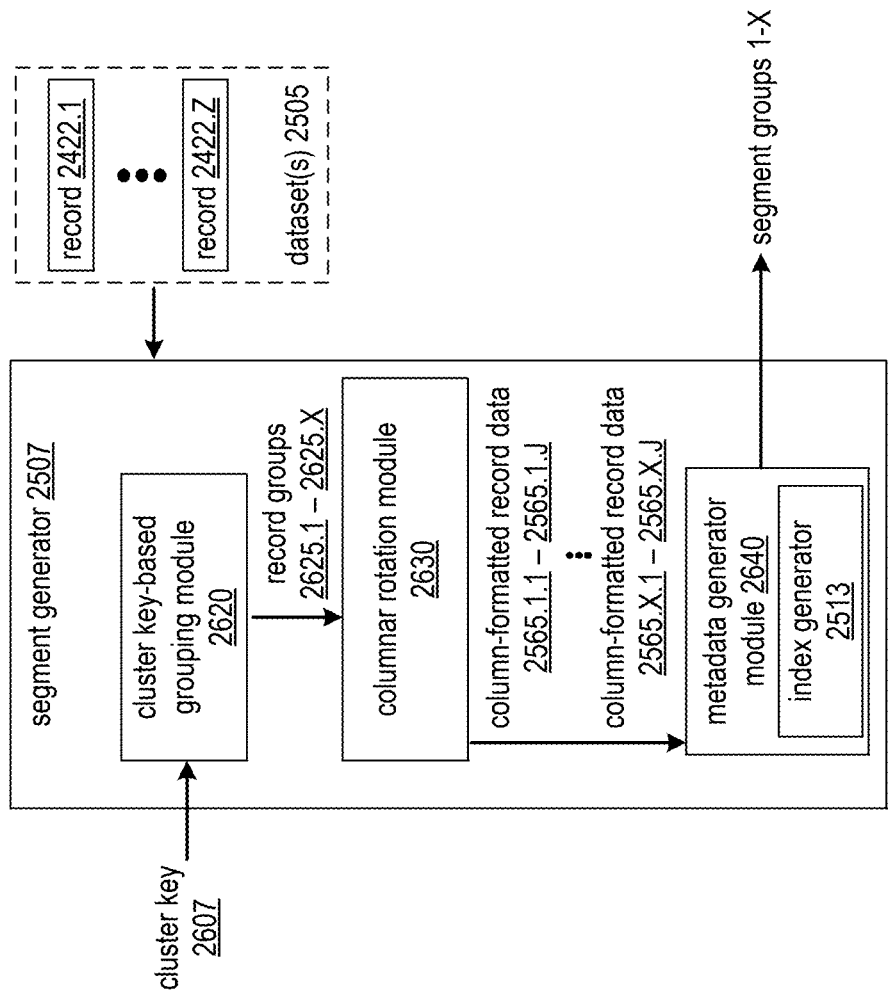
FIG. 24P is a schematic block diagram of a segment generator that implements a cluster key-based grouping module, a columnar rotation module, and a metadata generator module in accordance with various embodiments.

FIG. 24P illustrates an example embodiment of a segment generator 2507 of database system 10. Some or all features and/or functionality of the database system 10 of FIG. 24P can implement any embodiment of the database system 10 described herein. Some or all features and/or functionality of the segment generator 2507 of FIG. 24P can implement the segment generator 2507 of FIG. 24O and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator 2517 as disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility Patent Application for all purposes; and/or U.S. Utility application Ser. No. 16/985,930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility Patent Application for all purposes. For example, the database system 10 implements some or all features and/or functionality of record processing and storage system 2505 of U.S. Utility application Ser. No. 16/985,723, U.S. Utility application Ser. No. 16/985,957, and/or U.S. Utility application Ser. No. 16/985,930.

Figure 24Q:
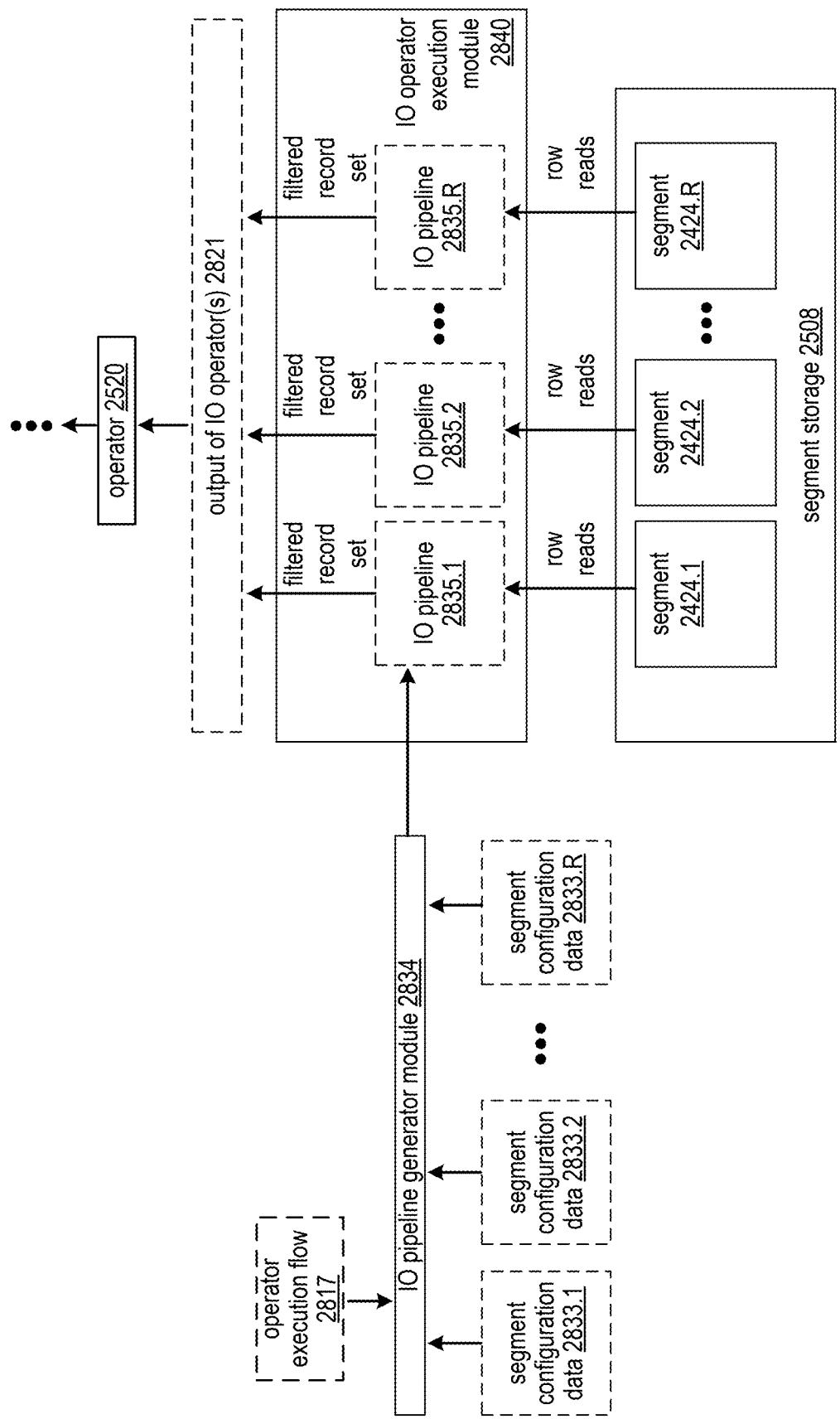
FIG. 24Q is a schematic block diagram of a query processing system that generates and executes a plurality of IO pipelines to generate filtered records sets from a plurality of segments in conjunction with executing a query in accordance with various embodiments.

FIG. 24Q illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24Q can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the columns slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24R:
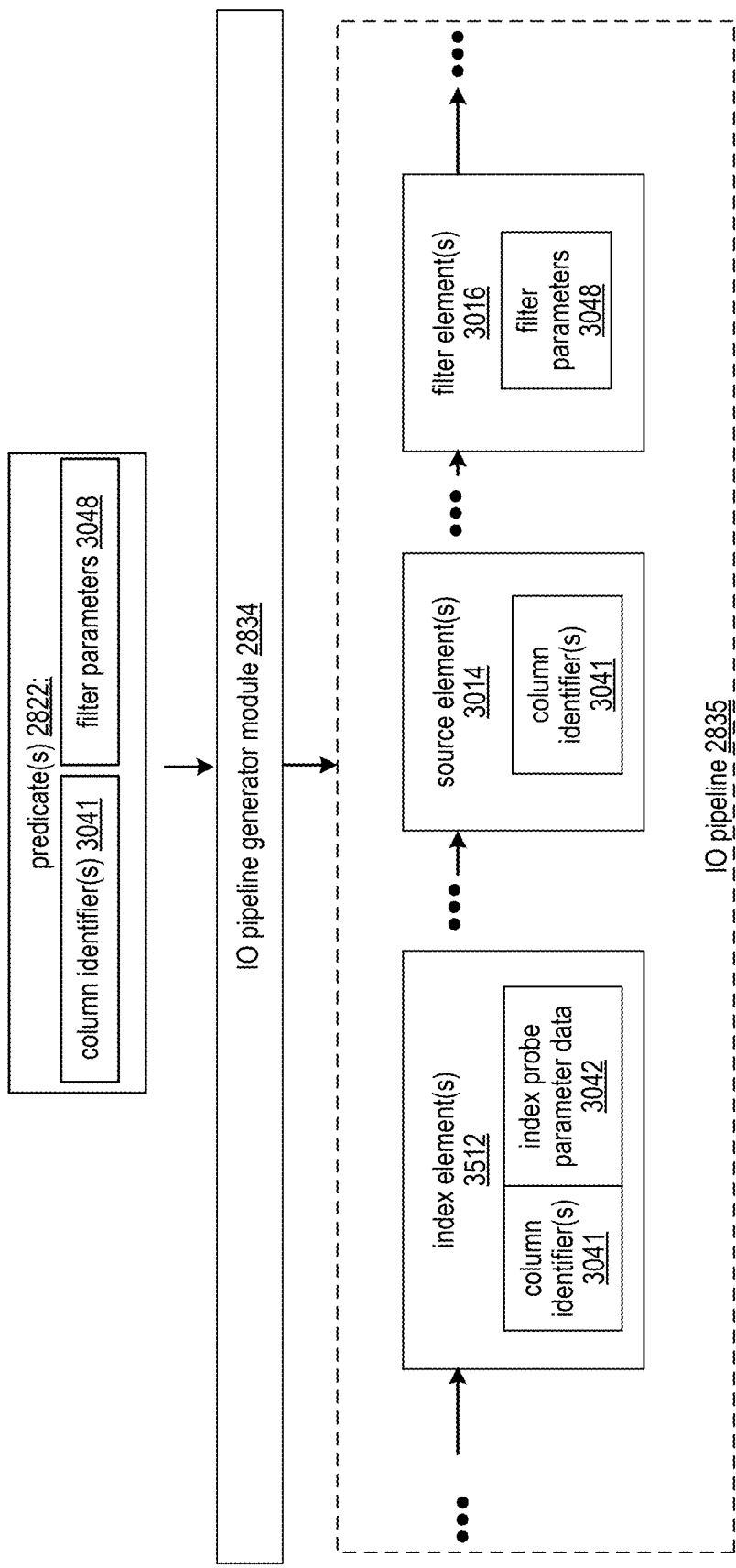
FIG. 24R is a schematic block diagram of a query processing system that generates an IO pipeline for accessing a corresponding segment based on predicates of a query in accordance with various embodiments.

FIG. 24R illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths. These elements can implement sourcing and/or filtering of rows based on query predicates 2822 applied one or more columns, identified by corresponding column identifiers 3041 and corresponding filter parameters 3048. Some or all features and/or functionality of the IO pipeline 2835 and/or IO pipeline generator module 2834 of FIG. 24R can implement the IO pipeline 2835 and/or IO pipeline generator module 2834 of FIG. 24Q, and/or any embodiment of IO pipeline 2835, of IO pipeline generator module 2834, or of any query execution via accessing segments described herein.

In some embodiments, the IO pipeline generator module 2834, IO pipeline 2835, and/or IO operator execution module 2840 implements some or all features and/or functionality of the IO pipeline generator module 2834, IO pipeline 2835, and/or IO operator execution module 2840 as disclosed by: U.S. Utility application Ser. No. 17/303,437, entitled "QUERY EXECUTION UTILIZING PROBABILISTIC INDEXING", filed May 28, 2021, which is hereby incorporated herein by reference in its entirety and made part of the present U.S. Utility Patent Application for all purposes. For example, the database system 10 can implement the indexing of segments 2424 and/or IO pipeline generation as execution for accessing segments 2424 during query execution via implementing some or all features and/or functionality as described in U.S. Utility application Ser. No. 17/303,437.

FIGS. 25A-25J illustrate embodiments of a database system 10 operable to cache query resultants 2920 generated via executions of query requests 2915 in cache memory resources 3112 for use in future query executions, and further operable to invalidate cached query resultants from use in future query executions (e.g. remove these resultants from cache memory resources) based on processing corresponding cached resultant invalidation instructions 2504. Some or all features and/or functionality of database system 10 of FIGS. 25A-25J can implement any embodiment of database system 10 described herein.

In some embodiments, database system 10 implements resultant caching which enables query results to be cached and returned if the same query is re-executed. This caching can include caching of the final query resultant and/or of one or more intermediate resultants (e.g. output of one or more operators 2520/one or more nodes 27, prior to the query being completed), where query resultant data for a query resultant 2915 that is cached optionally includes final query resultant and/or of one or more intermediate resultants. Corresponding query resultant data for a query resultant 2915 that is cached optionally includes a set of rows meeting filtering conditions of a query, one or more aggregated value generated via corresponding aggregations in query execution, and/or any other type of final query resultant/partial query resultant. In some embodiments, this resultant caching includes caching resultants for some time window (e.g. cache the resultant for a predetermined period of time, and then delete the resultant from the cache/otherwise make the resultant unavailable for use in query executions). This caching of query resultants can improve the technology of database systems based on reducing/eliminating the need to re-execute some or all queries (e.g. that are known/expected to be executed often, that are known/expected to be executed on static data and/or unchanging data for the time the resultant is cached, and/or that are known/expected to be particularly expensive to execute from a processing/memory consumption perspective).

Figure 25A:
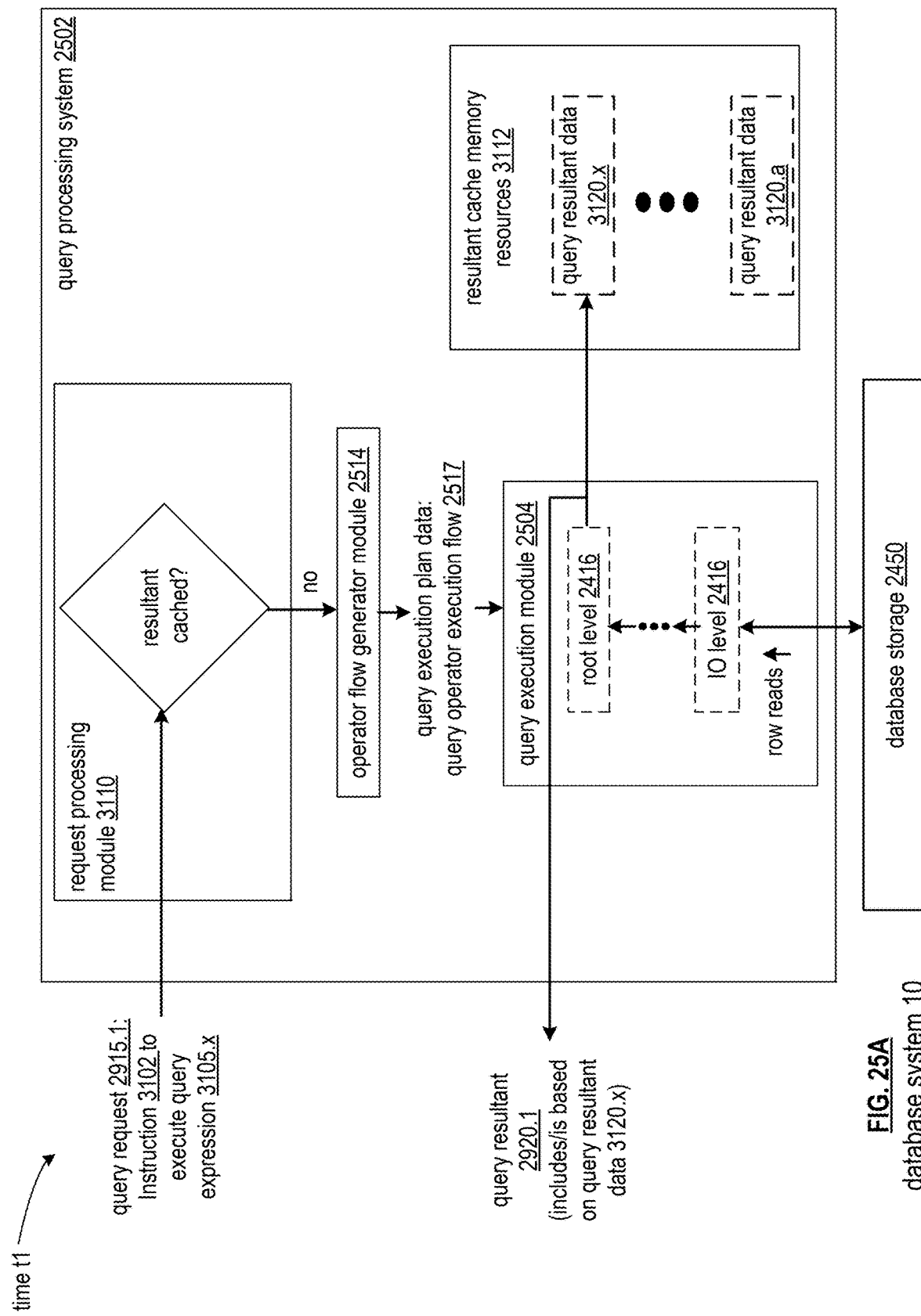
FIG. 25A is a schematic block diagram of a query processing system that executes an instruction to execute a query expression via execution of a corresponding query accordance with various embodiments.
Figure 25B:
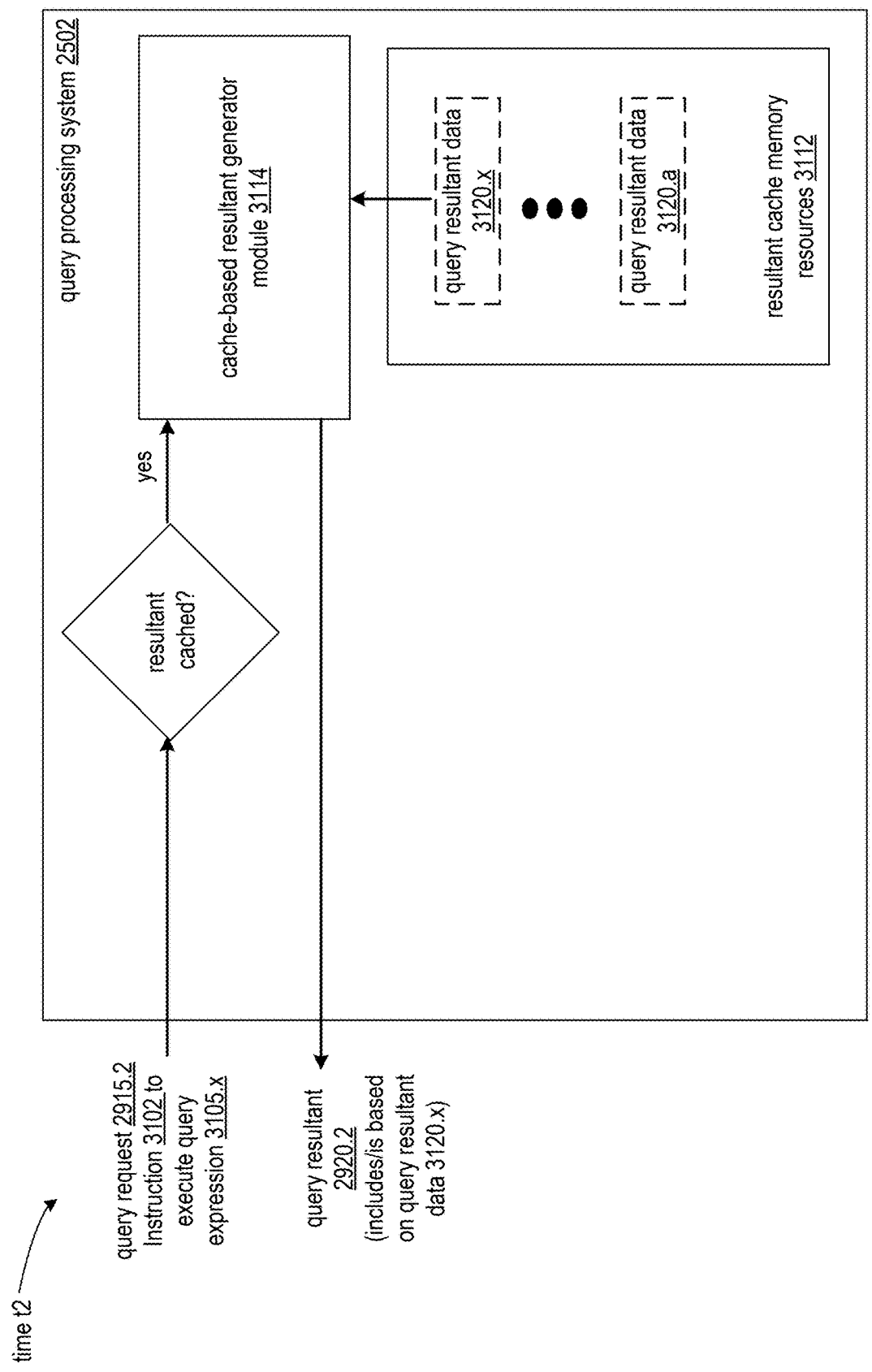
FIG. 25B is a schematic block diagram of a query processing system that executes an instruction to execute a query expression via accessing of cached query resultant data in accordance with various embodiments.
Figure 25C:
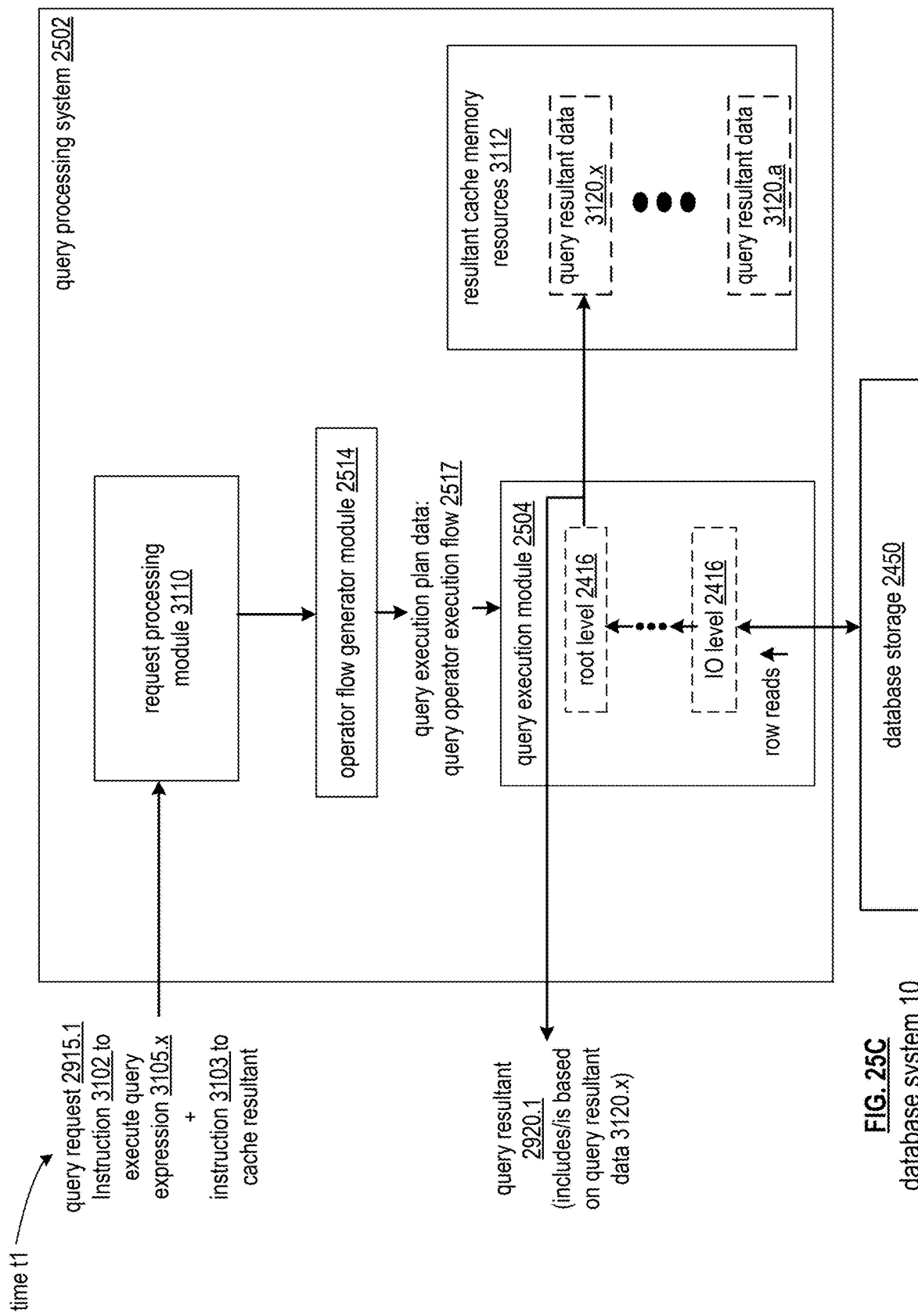
FIG. 25C is a schematic block diagram of a query processing system that executes an instruction to cache a resultant in conjunction with executing a corresponding query expression in accordance with various embodiments.

FIGS. 25A-25C illustrate embodiments of a database system 10 that implements such functionality of caching resultants. Some or all query resultants described herein can be cached and/or utilized in query execution via implementing some or all features and/or functionality of FIGS. 25A-25C.

As illustrated in FIG. 25A, at a first time t1, a given query request 2915.1 indicates a given query expression 3105.x for execution. For example, the query request 2915.1 and/or corresponding query expression 3105.x is received from external requesting entity 2912, is configured via user input, is generated automatically via an automated process, is accessed in memory resources, is determined based on being scheduled for execution, and/or is otherwise determined by a query processing module 2502 of database system 10. The query expression 3105.x can indicate a corresponding query for execution, for example, in accordance with SQL and/or another query language.

A request processing module 3110 can process the request and initiate execution of the corresponding query indicated by query expression 3105.x, for example, via generation of a query operator execution flow 2517 for corresponding execution via a query execution module 2504 via accessing database storage 2450, for example, via some or all functionality of performing query execution described herein. This can include accessing rows stored in one or more segments 2424, accessing and processing corresponding index data, or otherwise performing IO via some or all functionality described herein. This initiating of execution of the query can be based on determining that query resultant data 3120.x for this query expression 3105.x is not currently cached in resultant cache memory resources 3112 and/or is not currently available for use in executing subsequent queries.

In this example, other query resultant data 3120 is stored at time t1 for one or more other query expressions 3105, including another query resultant data 3120.a for a corresponding query expression 3105.a that is different from (e.g. syntactically different and/or further semantically different) from query expression 3105.x.

Query resultant data 3120.x for the given query resultant 2920.1 generated via execution of the query expression 3105.x indicated by query request 2915.1 (e.g. the final resultant, one or more intermediate resultants, other information regarding the query resultant 2920) can be stored in resultant cache memory resources 3112, for example, alternatively or in addition to being sent to a corresponding requesting entity as the query resultant 2920 (e.g. for display/storage/additional processing/other use by the database system 10, by the external requesting entity 2912 that requested the corresponding query be executed, and/or any other processing system/computing device to which the query resultant is determined to be routed for storage/display/processing/other use). The query resultant data 3120.x of the given query expression 3105.x can be cached in resultant cache memory resources 3112 based on an instruction to store the query resultant, for example as discussed in conjunction with FIG. 25C, and/or cached in resultant cache memory resources 3112 based on some other determination. The database system can be operable to cache all resultants generated via query executions (e.g. for same or different periods of time) and/or can be operable to only cache some resultants and not others (e.g. based on for which queries corresponding instructions are received, based on automatically determining which query resultants to cache, for example, based on known/expected frequency of re-execution, how often the corresponding data is updated, how expensive the query is to execute, etc.)

The resultant cache memory resources 3112 can be implemented via any memory resources of database system 10 (e.g. one or more memory devices/memory modules across one or more nodes, via system state data/system metadata mediated via a corresponding consensus protocol across a plurality of nodes, etc.). The resultant cache memory resources 3112 can be distinct from other storage resources (e.g. database storage 2450) utilized to store one or more corresponding datasets, such as relational database rows of one or more corresponding relational database tables that is accessed in query execution (e.g. corresponding segments stored via memory drives 2425 of nodes 37).

As illustrated in FIG. 25B, at a second time t2 that is after time t1, a second query request 2915.2 indicates the given query expression 3105.x for execution. For example, the query request 2915.2 and/or corresponding query expression 3105.x is received from a same or different external requesting entity 2912 that sent the query request 2915.1, is configured via user input, is generated automatically via an automated process, is accessed in memory resources, is determined based on being scheduled for execution, and/or is otherwise determined by a query processing module 2502 of database system 10.

The query expression 3105.x can indicate a corresponding query for execution, for example, in accordance with SQL and/or another query language. The query expression 3105.x of query request 2915.2 can indicate a same as the query expression 3105.x as query request 2915.1 based on query expression 3105.x of query request 2915.2 being syntactically equivalent with the query expression 3105.x of query request 2915.2. Alternatively or in addition, the query expression 3105.x of query request 2915.2 can indicate a same as the query expression 3105.x as query request 2915.1 based on query expression 3105.x of query request 2915.2 being semantically equivalent with the query expression 3105.x of query request 2915.2, even if syntactically different (e.g. the query processing module determines the expressions are syntactically equivalent). Alternatively or in addition, the query expression 3105.x of query request 2915.2 can indicate a same as the query expression 3105.x as query request 2915.1 based on query expression 3105.x of query request 2915.2 indicating generation of a same intermediate resultant (e.g. particular result set of rows, particular aggregation upon a particular result set of rows) as the query expression 3105.x of query request 2915.2, even if they ultimately generate different final resultants (e.g. the query processing module determines the expressions generate same intermediate resultants due to corresponding portions of the query expression being syntactically equivalent, where the cached query resultant data 3120.x is applied in generating the final resultant via query execution module 2504 rather than the final resultant being generated from scratch).

The request processing module 3110 can process the request and, rather than initiating execution of the corresponding query indicated by query expression 3105.x via generation of a query operator execution flow 2517 for corresponding execution via a query execution module 2504, can access and apply the corresponding query resultant data 3120.x cached from execution of the query expression 3105.x at time t1. This can include setting the query resultant 2920.2 as the query resultant data 3120.x, or can include further processing the query resultant data 3120.x (e.g. a corresponding intermediate resultant) via one or more corresponding operators 2520 of a corresponding operator execution flow 2517 to render the query resultant 2920.2.

FIG. 25C illustrates an example of a query processing system 2502 caching query resultant data 3120.x generated via executing a given query expression 3105.x in resultant cache memory resources 3112 based on processing an instruction 3103 to store the query resultant. In particular, the instruction 3103 to store the query resultant can be included in/indicated by a corresponding query request 2915.1. Such processing of instruction 3103 to render caching query resultant data 3120.x generated via executing a given query expression 3105.x in resultant cache memory resources 3112 can cause the caching query resultant data 3120.x generated via executing a given query expression 3105.x in resultant cache memory resources 3112 of FIG. 25A, for example, based on the query request 2915.1 of FIG. 25A including the instruction 3103.

Figure 25D:
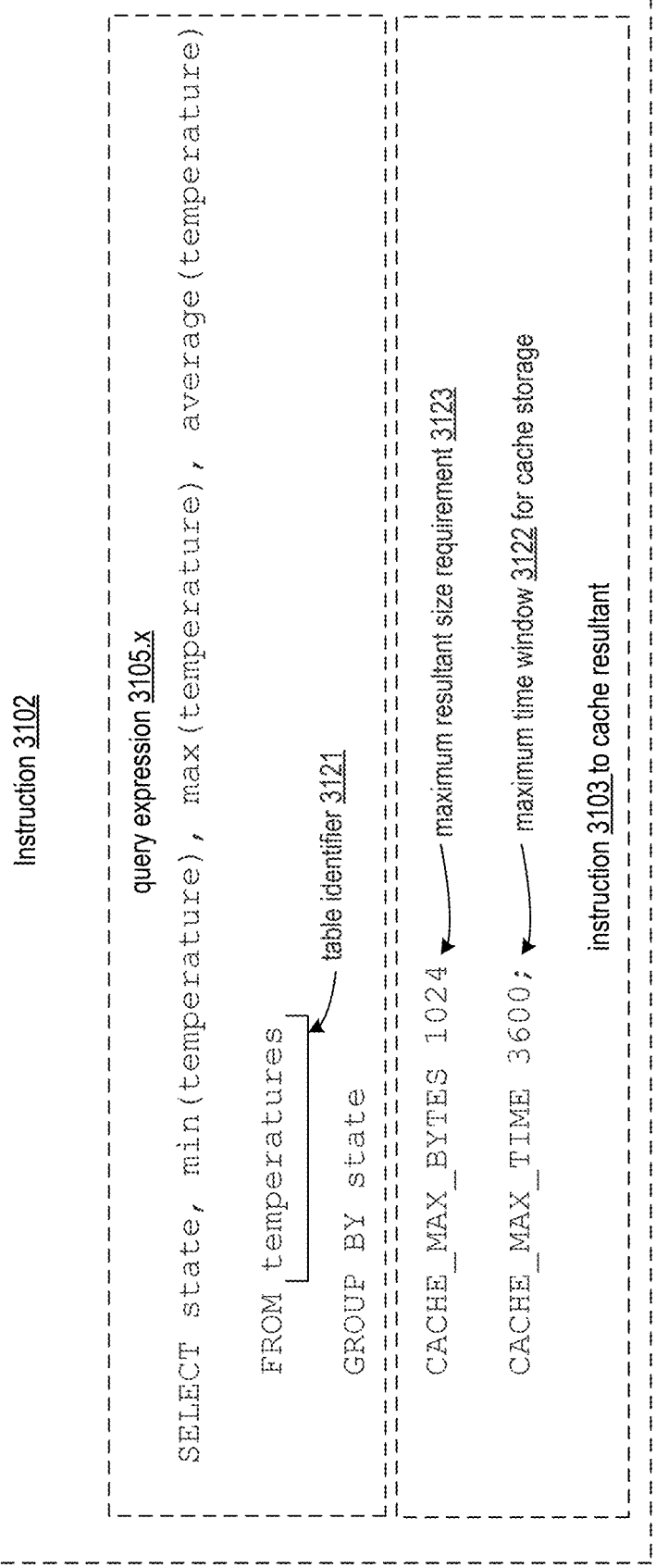
FIG. 25D illustrates an example embodiment of a query request that indicates an instruction to cache query resultant data in accordance with various embodiments.

FIG. 25D illustrates a particular example embodiment of a query request 2915 that indicates an example query expression 3105 as well as a corresponding instruction 3103 to cache corresponding query resultant data 2920 generated via execution of the query expression 3105.

In this example, query expression 3105 indicates calculation of the minimum, average, and maximum temperatures by state from a "temperatures" table of a dataset, denoted via a corresponding table identifier 3121. For example, this "temperatures" table is a relational database table 2712 stored via database storage 2450, for example, across one or more segments 2424 stored across one or more nodes 37.

In particular, in this example, min ( ) average ( ) and max ( ) can indicate calls to corresponding aggregation operators operable to compute minimum, average, and maximum, respectively, where a GROUP BY clause indicates grouping of each aggregation by state (e.g. a corresponding state column of the temperatures table indicating column values for state, where groups of rows for having each given column value of the state column are grouped and have the corresponding aggregations performed accordingly, rendering generation of a plurality of aggregation values (e.g. a plurality of minimums, maximums, and averages) based on each such aggregation being generated from temperature values (e.g. of a temperature column of the temperatures table) for only rows in a corresponding row group (e.g. having a corresponding column values of a plurality of column values of the state column).

This dataset may include a large number of temporal and geographic datapoints, and thus the calculation of the query is quite expensive, where caching of the resultant could be beneficial. In this example, it can be determined (e.g. by a user and/or automated system requesting the corresponding query) that this query only need be recalculated once per hour, for example, based on determining corresponding use case requirements stating/indicating that the respective values only need to be recalculated once per hour (e.g. while other data may be received and added the dataset during this time by database system 10, for example, in accordance with processing a continuous stream of temperature data, the data is sufficiently recent enough over the course of an hour, particularly with the trade-off of not having to re-execute the expensive query, to determine that usage of a cached resultant is appropriate, even if not reflecting the most recent data.

Thus, in this example a corresponding instruction 3103 to cache the resultant indicates that the results of the query expression 3105 may be cached for up to 3,600 seconds as long as the size of the corresponding resultant is less than 1024 bytes; Executing the same query within the 1 hour window c cause the results to be returned from the cache rather than being recalculated via re-processing all the corresponding data in the database.

In particular, a maximum time window 3122 for cache storage having a configured value (e.g. user configured value or automatically configured values) of 3600, optionally denoting 3600 seconds, and thus one hour. In this example, the maximum time window 3122 is specified as an integer value (e.g. configured via user input/configured automatically via an automated system) denoting a maximum number seconds, identified via a corresponding keyword of CACHE_MAX_TIME. In some embodiments, a default, non-zero amount of time for time is applied as maximum time window 3122 in the case where the instruction 3103 does not indicate a configured time window. In other embodiments, in the case where the instruction 3103 does not indicate a configured time window, the corresponding resultant is cached indefinitely (e.g. until a separate instruction indicating removal of the cached resultant is received/until another determination to remove the resultant from cache is applied) if such a time window is not specified. In other embodiments, the default for maximum time window 3122 is a value of zero in the case where the instruction 3103 does not indicate a configured time window, where the corresponding resultant is thus not cached for any amount of time if such a time window is not specified.

The corresponding instruction 3103 to cache the resultant can alternatively or additionally indicate a maximum resultant size requirement 3123 for storing the resultant (e.g. a configured max size where, if exceeded, the resultant is not stored in cache due to being too large). In this example, the maximum size requirement 3123 is specified as an integer value (e.g. configured via user input/configured automatically via an automated system) denoting a maximum number of byes, identified via a corresponding keyword of CACHE_MAX_BYTES. In some embodiments, a default, non-zero amount maximum number of bytes is applied as maximum resultant size requirement 3123 in the case where the instruction 3103 does not indicate a configured maximum number of bytes. In other embodiments, no maximum number of bytes is applied as maximum resultant size requirement 3123 in the case where the instruction 3103 does not indicate a configured maximum number of bytes, where the resultant is cached regardless of size. In other embodiments, the default for maximum size requirement 3123 is a value of zero in the case where the instruction 3103 does not indicate a configured time window, where the corresponding resultant is thus not cached regardless of size if such a size requirement is not specified.

The example of FIG. 25D illustrates the query request 2915 in accordance with SQL syntax and keywords. Other embodiments of query request 2915 can indicate query expression 3105 and/or corresponding instruction 3103 in accordance with SQL similarly, or can indicate query expression 3105 and/or corresponding instruction 3103 in accordance with any other query language. Other embodiments of query request 2915 can optionally employ logically equivalent/similar structuring in any query language and/or logical form. Instruction 3103 can indicate same or similar types information (e.g. indicating a configured maximum time window 3122 or a configured maximum resultant size requirement 3123) in conjunction with any syntax, any keywords, and/or any query language.

In some embodiments, there are cases where a user and/or automated system (e.g. of a corresponding requesting entity requesting the corresponding query for execution/re-execution as query request 2915 and/or associated with processing resources of database system 10) may want to explicitly invalidate the cache entries associated with a table. For example, the user and/or automated system may wish to invalidate the cache entries associated with a table when data is either added (inserted) or removed (truncated) from the table, without needing to wait for the entire CACHE_MAX_TIME window to expire.

FIGS. 29E-29J illustrate examples of database system 10 enabling such functionality via processing of cached resultant invalidation instructions 3104, where corresponding resultant cached data 3120 is removed from cache memory resources 3112 (e.g. deleted from memory, or otherwise flagged/invalidated from use in processing corresponding query expressions). Some or all features and/or functionality of the processing of cached resultant invalidation instructions 3104 of FIGS. 29E-29J can be implemented in conjunction with the adding and accessing of corresponding cached resultant data 3120 discussed in conjunction with FIGS. 29A-29D, and/or can be implemented in conjunction with any embodiment of database system 10 described herein.

Figure 25E:
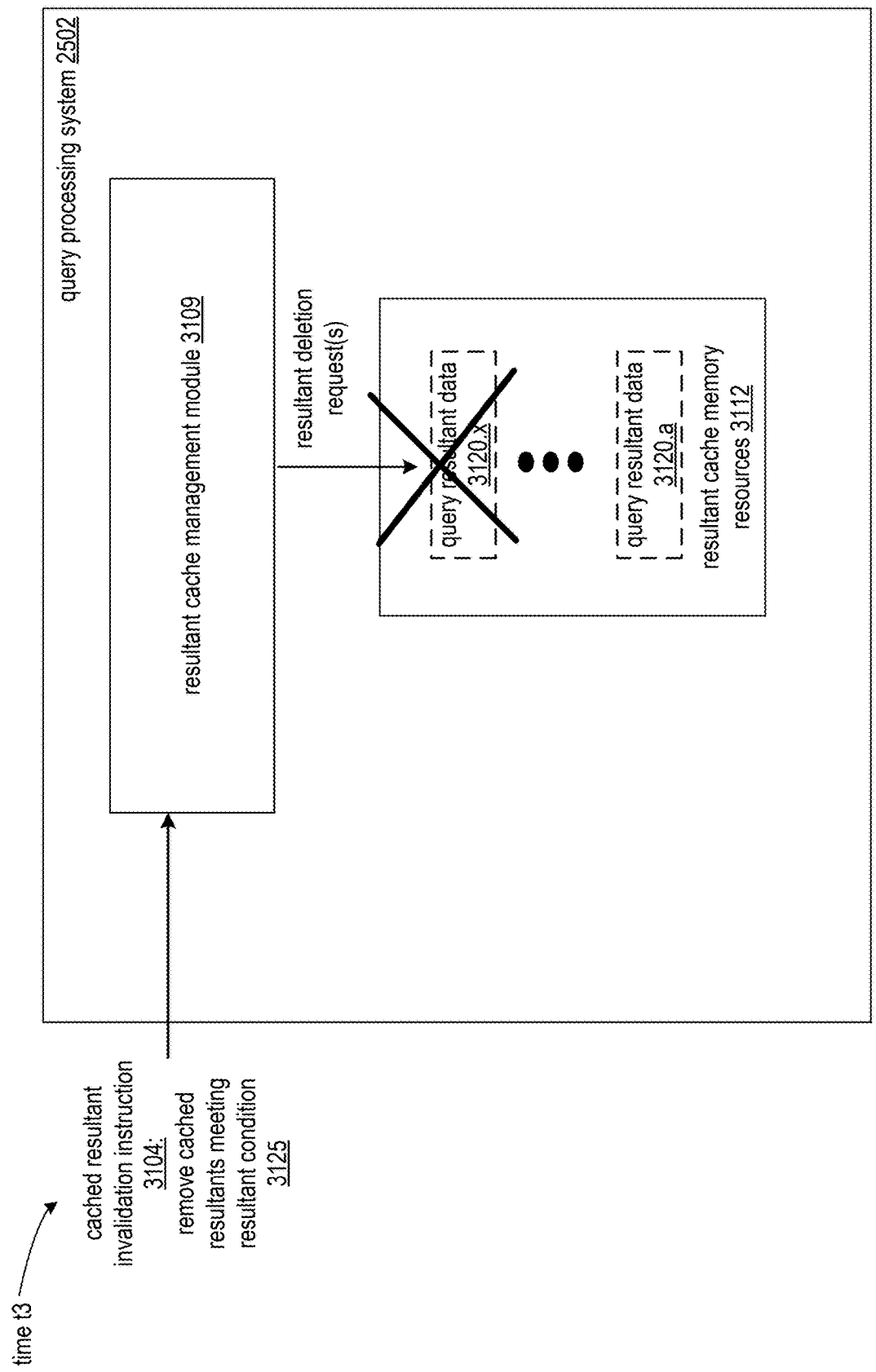
FIG. 25E is a schematic block diagram of a query processing system that implements a resultant cache management module to remove cached resultant data based on processing a cached resultant invalidation instruction in accordance with various embodiments.

As illustrated in FIG. 25E, query processing system 2502 (and/or other processing resources of database system 10) can receive and process a cached resultant invalidation instruction 3104 at a time t3, for example, that is after times t1 and t2 of FIGS. 25A-25C. The cached resultant invalidation instruction 3104 can be processed by implementing a resultant cache management module 3109 to remove one or more cached resultants accordingly (e.g. via resultant deletion requests sent to/processed by resultant cache memory resources 3112). This can include processing a resultant condition 3125 indicated in the cached resultant invalidation instructions 3104, and removing all query resultant data 3120, and only query resultant data 3120 meeting the resultant condition 3125. In this example, query resultant data 3120.x is removed based on meeting the resultant condition 3125, while resultant data 3120.a is not removed based on not meeting the resultant condition 3125. The resultant cache management module 3109 can be implemented via any processing and/or memory resources of database system 10.

In particular, the resultant condition 3125 can indicate a condition that applies to multiple query resultant data 3120, where multiple query resultant data 3120 are removed accordingly via processing this single instruction 3104. For example, despite each query resultant data 3120 being cached via multiple different instructions (e.g. based on an instruction 3103 included in each corresponding query request 2915), a single instruction 3104 indicates removal of all of these separately generated resultants from the cache based on all meeting resultant condition 3125.

The cached resultant invalidation instruction 3104 can be generated by and/or received by a same or different requesting entity that sent query requests 2915 that rendered generation of and/or access of the cached resultants (e.g. same or different external requesting entity 2912 or same or different processing entity of database system 10 that generated and/or sent the query requests 2915 processed to generate the corresponding query resultant data that is cached, for example, based on including the corresponding instruction 3103, and/or the same or different external requesting entity 2912 or same or different processing entity of database system 10 that further generated and/or sent subsequent query requests 2915 that are processed via accessing the corresponding query resultant data that was previously cached). The resultant condition 3125 can be configured in the cached resultant invalidation instruction 3104 by the requesting entity in conjunction with generating and/or sending the cached resultant invalidation instruction 3104, for example, via user input and/or an automated selection of resultant condition 3125.

In some embodiments, the cached resultant invalidation instruction 3104 is implemented based on an explicit Data Definition Language (DDL) statement invalidating all cache entries resultant condition 3125. In other embodiments, the cached resultant invalidation instruction 3104 is implemented via any language and/or syntax.

In some embodiments, the resultant condition 3125 indicates a particular database table and/or particular database (e.g. SQL database that includes a plurality of corresponding tables), for example, via a corresponding table identifier or database identifier, respectively, where all resultant entries associated with the corresponding table or corresponding database (e.g. generated based on access to/based on rows included in a corresponding table or corresponding database) are thus removed in processing the cached resultant invalidation instruction 3104. In other embodiments, the resultant condition 3125 indicates another condition utilized to identify which resultant data be removed.

Such invalidation of cached resultants via cached resultant invalidation instruction 3104 can improve the technology of database systems, for example, by enabling more granular configuration of caching of resultants for use in subsequent query execution. For example, by making these invalidation commands explicit (rather than, say, automatically invalidating cache entries when any update is made to a table) a corresponding user and/or corresponding automated system can incorporate this function into the appropriate phase of their workflows.

Figure 25F:
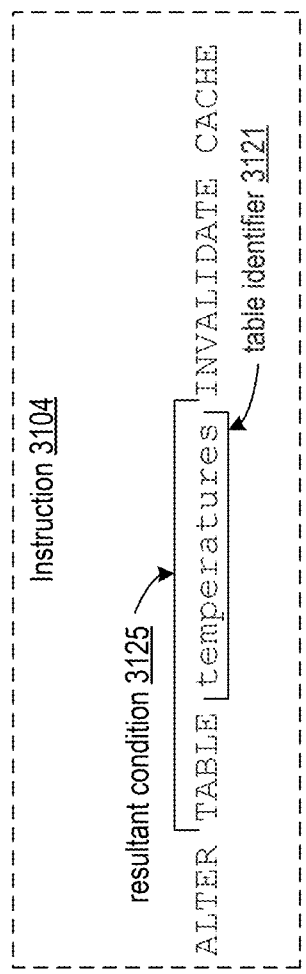
FIGS. 25F-25G illustrates example embodiments of a cached resultant invalidation instruction in accordance with various embodiments.
Figure 25G:
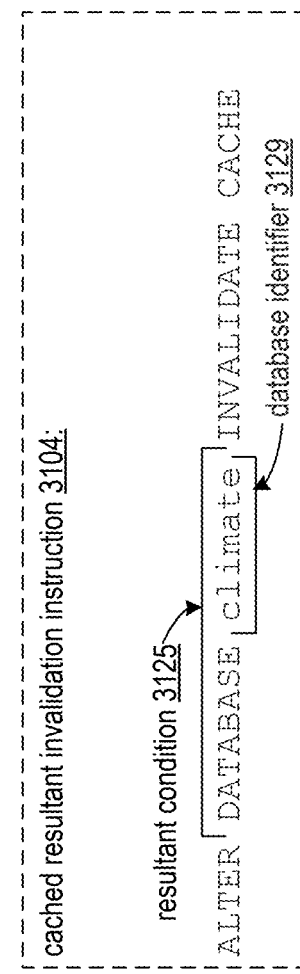

FIGS. 25F-25G illustrates example embodiments of cached resultant invalidation instruction 3104. Some or all features and/or functionality of the cached resultant invalidation instruction 3104 of FIGS. 25F and/or 25G can implement the cached resultant invalidation instruction 3104 of FIG. 25E and/or any embodiment of the cached resultant invalidation instruction 3104 described herein.

FIG. 25F illustrates a particular example embodiment of a cached resultant invalidation instruction 3104 that indicates removal of query resultant data associated with a table (e.g. relational database table such as a SQL table) denoted via a corresponding table identifier 3121 (in this case a "temperatures" table, such as the example temperatures table discussed in conjunction with the example of FIG. 25C). The cached resultant invalidation instruction 3104 can be indicated to invalidate caches meeting the specified resultant condition 3125 based on a keyword such as INVALIDATE CACHE, for example, in a corresponding ALTER TABLE instruction. In this example, processing the cached resultant invalidation instruction 3104 renders invalidation of all cached resultant data 3120 generated from table "temperatures" (e.g. based on "temperatures" being indicated in a FROM clause of a SELECT statement of the corresponding query expression 3105, for example, where a cached resultant generated via execution of the example query expression 3105 of FIG. 25D is removed via processing this cached resultant invalidation instruction 3104, in addition to other cached resultants generated via access to the "temperatures" table, but not other cached resultants generated via access to other tables of a corresponding climate database (e.g. a "climate" database) and/or not other tables of other databases.

FIG. 25G illustrates a similar particular example embodiment of a cached resultant invalidation instruction 3104 that indicates removal of query resultant data associated with a database (e.g. relational database such as a SQL database that optionally includes multiple tables) denoted via a corresponding database identifier 3129 (in this case a "climate" database, such as a database that includes the example temperatures table discussed in conjunction with the example of FIG. 25C and/or one or more corresponding tables). The cached resultant invalidation instruction 3104 can be indicated to invalidate caches meeting the specified resultant condition 3125 based on a keyword such as INVALIDATE CACHE, for example, in a corresponding ALTER DATABASE instruction. In this example, processing the cached resultant invalidation instruction 3104 renders invalidation of all cached resultant data 3120 generated from dataset "climate" (e.g. including queries executed for query expressions indicating the database "climate" and/or any of the tables of the climate database, such as "temperatures", being indicated in a FROM clause of a SELECT statement of the corresponding query expression 3105, for example, where a cached resultant generated via execution of the example query expression 3105 of FIG. 25D is removed via processing this cached resultant invalidation instruction 3104, in addition to other cached resultants generated via access to the "temperatures" table and/or other tables of the climate database, but not other cached resultants generated via access to other tables of a other corresponding databases.

The example of FIGS. 25F and/or 25G illustrates the cached resultant invalidation instruction 3104 in accordance with a DDL statement, for example, via corresponding DDL syntax and keywords. Other embodiments of cached resultant invalidation instruction 3104 can indicate resultant condition 3125 and/or the instruction to invalidate corresponding cached resultants accordingly in accordance with a DDL statement similarly, or can indicate cached resultant invalidation instruction 3104 in accordance with any other structuring, for example, that employ logically equivalent/similar structuring and/or can indicate same or similar types information (e.g. indicate a table identifier 3121 and/or database identifier 3129 accordingly).

Figure 25H:
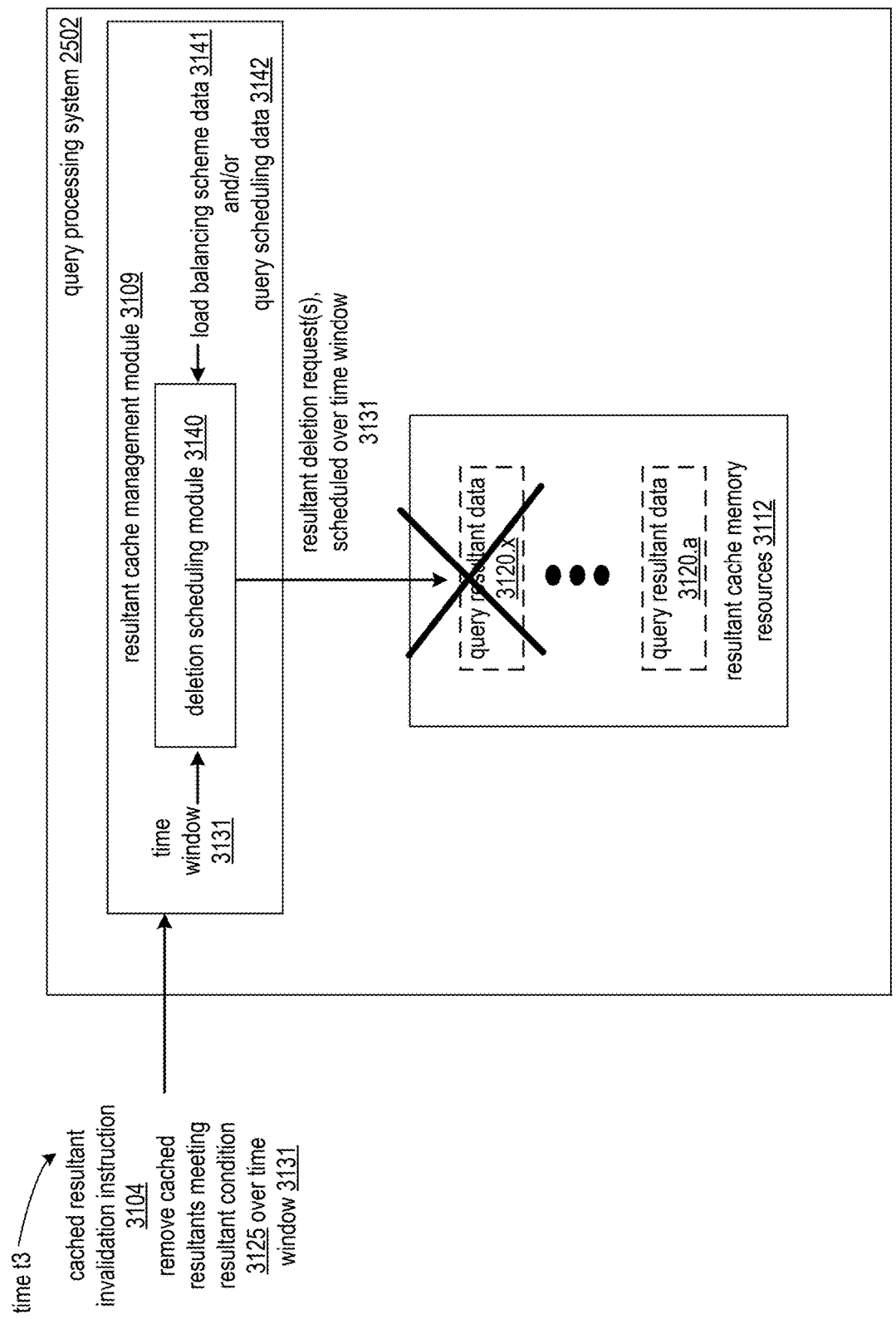
FIG. 25H is a schematic block diagram of a query processing system that implements a deletion scheduling module of a resultant cache management module to remove cached resultant data over a time window indicated by a corresponding cached resultant invalidation instruction in accordance with various embodiments.

FIG. 25H illustrates an example of a resultant cache management module 3109 of database system 10 processing a cached resultant invalidation instruction 3104 based on implementing a deletion scheduling module 3140 to issue corresponding deletion requests (or other flagging/invalidation of corresponding cached resultants) based on scheduling the deletion requests over a time period dictated by a time window 3131. In particular, the time window 3131 can be included in/indicated by the corresponding indicated by the cached resultant invalidation instruction 3104. Such processing of time window 3131 in conjunction with processing cached resultant invalidation instruction 3104 can implement the processing of cached resultant invalidation instruction 3104 of FIG. 25E, for example, based on the cached resultant invalidation instruction 3104 of FIG. 25E indicating the time window 3131.

The deletion scheduling module 3140 can schedule invalidation of cached resultants meeting the resultant condition 3125 in conjunction with applying load balancing scheme data 3141 and/or in conjunction with processing query scheduling data 3142.

The load balancing scheme data 3141 can indicate an algorithm and/or conditions by which cache entries are deleted from the cache over the time window 3131, for example, to best balance resources involved in the deletions and also involved in query execution. The query scheduling data 3142 can indicate queries currently being executed and/or scheduled for upcoming execution (e.g. scheduled to start or complete within the time window 3131), which can be applied in determining how to best balance processing and/or memory load, considering the impact of how re-execution of many currently executing queries/soon-to-execute queries across one or more tables being removed could impact system performance.

In particular, is if all queries associated with a given table (e.g. temperatures) are invalidated at the same time, the system will then have to re-execute a large number of potentially expensive queries at the same time, which can result in a load spike on the system. By employing load balancing scheme data 3141 to process the cached resultant invalidation instruction 3104 over the course of time window 3131, the load can be balanced appropriately over time, allowing some or all queries to finish performing and reduce this load spike, for example, based on applying the query scheduling data 3142 in scheduling the removal of cached resultants. For example, the cached entries are instead gradually invalidated over the time window of time, which can cause the execution of the expensive, cached, queries to occur within this time of time, spreading the load over a longer time period.

Figure 25I:
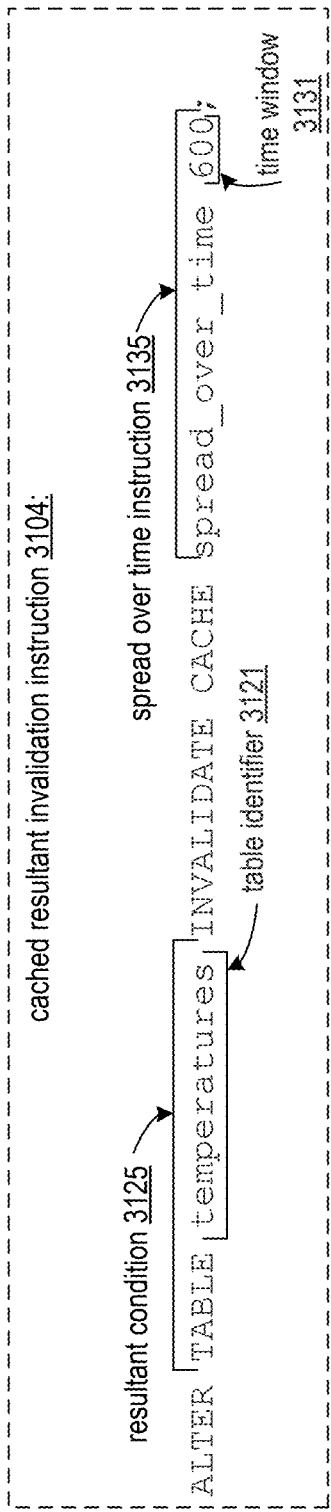
FIGS. 25I-25J illustrates example embodiments of a cached resultant invalidation instruction that indicates a time window in accordance with various embodiments.
Figure 25J:
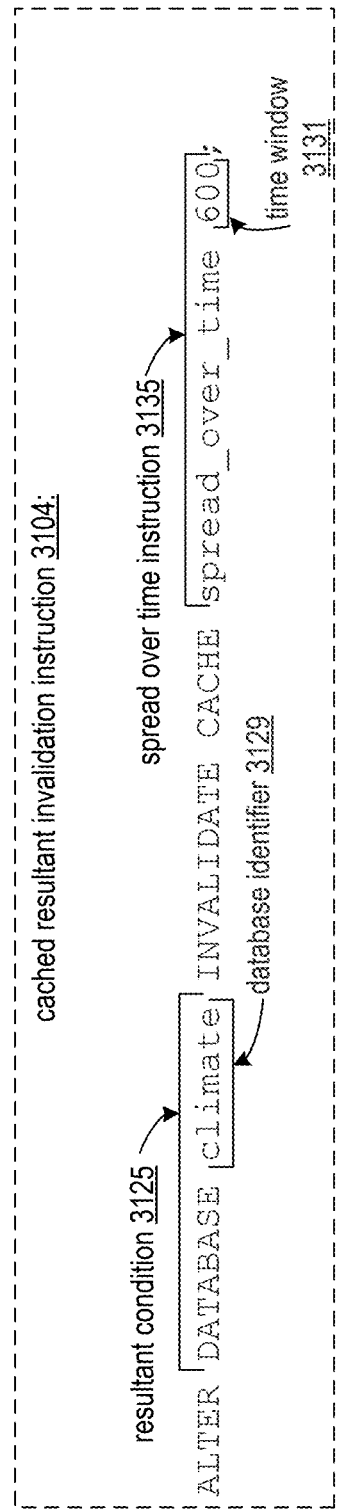

FIGS. 25I-25J illustrates example embodiments of cached resultant invalidation instruction 3104. Some or all features and/or functionality of the cached resultant invalidation instruction 3104 of FIGS. 25F and/or 25G can implement the cached resultant invalidation instruction 3104 of FIG. 25H, of FIG. 25E and/or any embodiment of the cached resultant invalidation instruction 3104 described herein.

FIG. 25I illustrates a particular example embodiment of a cached resultant invalidation instruction 3104 that indicates removal of query resultant data associated with a table (e.g. relational database table such as a SQL table) denoted via a corresponding table identifier 3121 (in this case the example "temperatures" table), in a same or similar fashion as illustrated in the example of FIG. 25F. The cached resultant invalidation instruction 3104 can further indicate time window 3131, for example, based on a keyword such as "spread_over_time", for example, in a corresponding ALTER TABLE instruction. In this example, the corresponding time window indicates a value of 600, for example, denoting 600 seconds (i.e. 10 minutes). Processing of this example cached resultant invalidation instruction 3104 renders gradual invalidation of all cached resultant data 3120 generated from table "temperatures" over a 10 minute time period (e.g. starting from the time the instruction 3104 is received), for example, based on applying load balancing scheme data 3141 and/or query scheduling data 3142 to optimize how processing/memory load be balanced over the 10 minute period.

FIG. 25J illustrates a particular example embodiment of a cached resultant invalidation instruction 3104 that indicates removal of query resultant data associated with a dataset (e.g. relational database such as a SQL database) denoted via a corresponding database identifier 3129 (in this case the example "climate" database), in a same or similar fashion as illustrated in the example of FIG. 25G. The cached resultant invalidation instruction 3104 can further indicate time window 3131, for example, based on a keyword such as "spread_over_time", for example, in a corresponding ALTER DATABASE instruction. In this example, the corresponding time window indicates a value of 600, for example, denoting 600 seconds (i.e. 10 minutes). Processing of this example cached resultant invalidation instruction 3104 renders gradual invalidation of all cached resultant data 3120 generated from tables of database "climate" over a 10 minute time period (e.g. starting from the time the instruction 3104 is received), for example, based on applying load balancing scheme data 3141 and/or query scheduling data 3142 to optimize how processing/memory load be balanced over the 10 minute period.

The example of FIGS. 25I and/or 25J illustrates the cached resultant invalidation instruction 3104 in accordance with a DDL statement, for example, via corresponding DDL syntax and keywords. Other embodiments of cached resultant invalidation instruction 3104 can indicate resultant condition 3125 and/or the instruction to invalidate corresponding cached resultants accordingly in accordance with a DDL statement similarly, or can indicate cached resultant invalidation instruction 3104 in accordance with any other structuring, for example, that employ logically equivalent/similar structuring and/or can indicate same or similar types information (e.g. indicate a table identifier 3121, database identifier 3129, and/or time window 3131 accordingly).

In some embodiments, a default, non-zero amount of time is applied as time window 3131 in the case where the instruction 3104 does not indicate a configured time window. In other embodiments, in the case where the instruction 3104 does not indicate a configured time window, the corresponding resultant is optimized for load balancing with respect to scheduled queries over an automatically determined time period (e.g. determined by deletion scheduling module 3140 due to not being specified in the instruction to best balance load).

In other embodiments, the default for maximum time window 3122 is a value of zero in the case where the instruction 3103 does not indicate a configured time window. For example, processing a cached resultant invalidation instruction 3104 not indicating time window 3131 renders immediate/substantially-immediate removal of the corresponding cached resultants, without regard for load balancing or currently executing/soon-to-be-executed queries. In some embodiments, no cached resultant invalidation instruction 3104 indicate time window 3131, and/or the time window 3131 is not processed as illustrated in FIG. 31H.

Figure 25K:
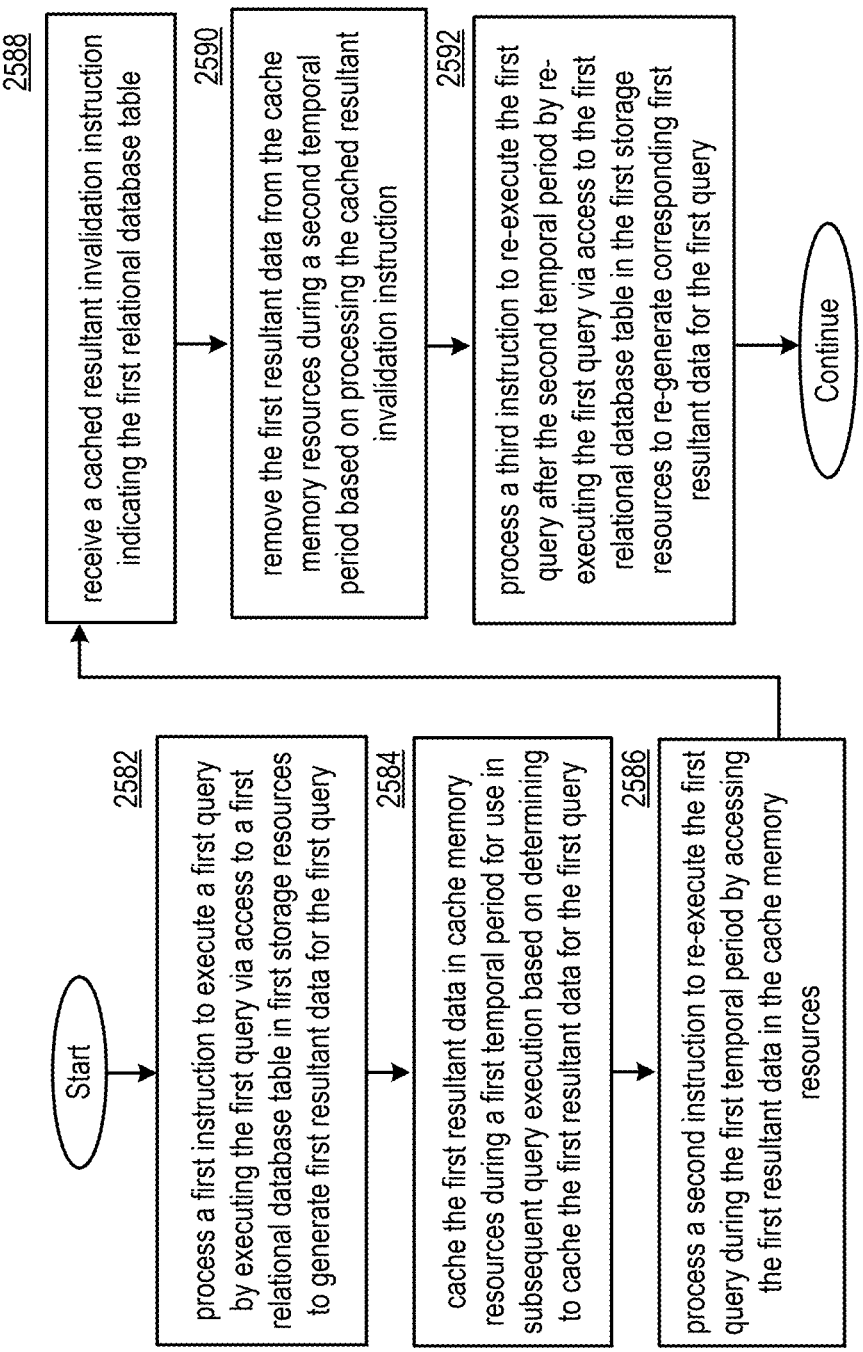
FIG. 25K is a logic diagram illustrating a method for execution in accordance with various embodiments.

FIG. 25K illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 25K. For example, a node 37 can participate in some or all steps of FIG. 25K based on participating in consensus protocols to mediate consensus data with other nodes 37. Some or all of the method of FIG. 25K can be performed by nodes executing a query in conjunction with a query execution, for example, via one or more nodes 37 implemented as nodes of a query execution module 2504 implementing a query execution plan 2405. Some or all of the steps of FIG. 25K can optionally be performed by any other processing module of the database system 10. Some or all of the steps of FIG. 25K can be performed to implement some or all of the functionality of the database system 10 as described in conjunction with FIGS. 25A-25J, for example, by caching query resultants generated via query execution and/or by implementing resultant cache management module 3109 to process cached resultant invalidation instructions 3104 and/or executing an updated operator execution flow 2817 via a query execution module 2504. Some or all steps of FIG. 25K can be performed by database system 10 in accordance with other embodiments of the database system 10 and/or nodes 37 discussed herein.

Step 2582 includes processing a first instruction to execute a first query by executing the first query via access to a first relational database table in first storage resources to generate first resultant data for the first query. Step 2584 includes caching the first resultant data in cache memory resources during a first temporal period for use in subsequent query execution based on determining to cache the first resultant data for the first query. Step 2586 includes processing a second instruction to re-execute the first query during the first temporal period by accessing the first resultant data in the cache memory resources. Step 2588 includes receiving a cache invalidation instruction indicating the first relational database table. Step 2590 includes removing the first resultant data from the cache memory resources during a second temporal period based on processing the cache invalidation instruction. Step 2592 includes processing a third instruction to re-execute the first query after the second temporal period by re-executing the first query via access to the first relational database table in the first storage resources to re-generate corresponding first resultant data for the first query.

In various examples, the method further includes receiving the first instruction from a requesting entity; sending the first resultant data to the requesting entity in response to the first instruction based on generating the first resultant data; receiving the second instruction from the requesting entity; sending the first resultant data to the requesting entity in response to the second instruction based on accessing the first resultant data in the cache memory resources; receiving the third instruction from the requesting entity; and/or sending the corresponding first resultant data to the requesting entity in response to the first instruction based on re-generating the corresponding first resultant data.

In various examples, the second temporal period is strictly after the first temporal period. In various example, the first temporal period ends based on the second temporal period starting.

In various examples, the corresponding first resultant data generated via re-executing the first query after the second temporal period is equivalent with the first resultant data generated via execution of the first query prior to the first temporal period.

In various examples, the corresponding first resultant data generated via re-executing the first query after the second temporal period is different from the first resultant data generated via execution of the first query prior to the first temporal period based on at least one of: at least one new relational database row being added to first relational database table between the execution of the first query and the re-execution of the first query, or at least one new relational database row being removed from to the first relational database table between the execution of the first query and the re-execution of the first query.

In various examples, determining to cache the first resultant data for the first query is based on receiving a resultant caching instruction indicting that the first resultant data generated via the execution of the first query be stored via the cache memory resources.

In various examples, the first instruction to execute the first query includes; a corresponding query expression indicating the first query for execution; and/or the resultant caching instruction for the first query. In various examples, the resultant caching instruction is received based on receiving the first instruction.

In various examples, the resultant caching instruction further indicates a maximum time window for storing the first resultant data via the cache memory resources. In various examples, the cache invalidation instruction is received before the maximum time window elapses In various examples, the first temporal period corresponds to an amount of time shorter to the maximum time window elapses based on processing the cache invalidation instruction prior to elapsing of the maximum time window.

In various examples, the resultant caching instruction further indicates a maximum resultant size requirement for the first resultant data to be stored via the cache memory resources. In various examples, determining to cache the first resultant data for the first query is further based on determining, based on generating the first resultant data for the first query, that a size of the first resultant data meets the maximum resultant size requirement.

In various examples, the method further includes, prior to processing the cache invalidation instruction, processing a first plurality of instructions to execute a first plurality of queries by executing each of the first plurality of instructions via access to the first relational database table in the first storage resources to generate a first plurality of resultant data for the first plurality of queries, wherein the first plurality of instructions includes the first instruction, wherein the first plurality of queries includes the first query, and wherein the first plurality of resultant data includes the first resultant data. In various examples, the method further includes, prior to processing the cache invalidation instruction, caching the first plurality of resultant data in the cache memory resources based on determining to cache corresponding resultant data for each of the first plurality of queries. In various examples, the method further includes, based on processing the cache invalidation instruction, removing all resultant data generated via access to the first database table from the cache memory resources during the second temporal period based on the cache invalidation instruction indicating the first relational database table. In various examples, none of the first plurality of resultant data remain stored in the cache memory resources after processing the cache invalidation instruction.

In various examples, determining to cache corresponding resultant data for each of the first plurality of queries is based on processing a plurality of resultant caching instructions that includes a corresponding resultant caching instruction for each of the first plurality of queries.

In various examples, prior to processing the cache invalidation instruction, the cache memory resources stores a set of resultant data that includes the first plurality of resultant data. In various examples, a set difference between the set of resultant data and the first plurality of resultant data is non-null. In various examples, at least one of the set of resultant data remains stored in the cache memory resources after processing the cache invalidation instruction based on the at least one of the set of resultant data not being removed via processing of the cache invalidation instruction based on not being generated via access to the first relational database table.

In various examples, the method further includes, prior to processing the cache invalidation instruction, further processing a second plurality of instructions. In various examples, the first plurality of queries are executed by accessing the first relational database table based on each of the first plurality of instructions indicating the first relational database table. In various examples, processing the second plurality of instructions is includes executing a second plurality of queries by accessing a second relational database table based on each of second first plurality of instructions indicating the second relational database table. In various examples, each of a second plurality of resultant data is generated based on executing a corresponding one of the second plurality of queries.

In various examples, the method further includes, prior to processing the cache invalidation instruction, caching the second plurality of resultant data in the cache memory resources based on determining to cache corresponding resultant data for each of the second plurality of queries. In various examples, the at least one of the set of resultant data remaining stored in the cache memory resources after processing the cache invalidation instruction includes at least one of the second plurality of resultant data based on the at least one of the second plurality of resultant data being generated via access to the second relational database table and not the first relational database table.

In various examples, a set intersection between the first plurality of instructions and the second plurality of instructions is non-null based on including at least one instruction indicating a corresponding query for execution via access to both the first relational database table and the second relational database table. In various examples, at least one corresponding query resultant generated based on executing the at least one instruction. In various examples, the least one corresponding query resultant is removed from the cache memory resources during the second temporal period based on being generated via access to the first relational database table.

In various examples, the cache invalidation instruction indicates the first relational database table based on indicating a first relational database that includes the first relational database table. In various examples, the method further includes, based on processing the cache invalidation instruction, removing all resultant data generated via access to all database tables of the first relational database from the cache memory resources during the second temporal period based on the cache invalidation instruction indicating the first relational database table. In various examples, removing the all resultant data generated via access to the first database table from the cache memory resources during the second temporal period is based on the cache invalidation instruction indicating the first relational database.

In various examples, the first relational database further includes a second relational database table. In various examples, the method further includes, prior to processing the cache invalidation instruction, further processing a second plurality of instructions. In various examples, the first plurality of queries are executed by accessing the first relational database table based on each of the first plurality of instructions indicating the first relational database table. In various examples, processing the second plurality of instructions includes executing a second plurality of queries by accessing the second relational database table based on each of second first plurality of instructions indicating the second relational database table, and wherein each of a second plurality of resultant data is generated based on executing a corresponding one of the second plurality of queries.

In various examples, the method further includes, prior to processing the cache invalidation instruction, caching the second plurality of resultant data in the cache memory resources based on determining to cache corresponding resultant data for each of the second plurality of queries. In various examples, none of the second plurality of resultant data remain in the cache memory resources after processing the cache invalidation instruction based on the at least one of the second plurality of resultant data being generated via access to the second relational database table of the first relational database.

In various examples, the cache invalidation instruction indicates the first relational database table based on including a table name identifying the first relational database table, and/or based on including a database name identifying a relational database that includes the first relational database table.

In various examples, the cache invalidation instruction is indicated in a corresponding Data Definition Language (DDL) expression. In various examples, the cache invalidation instruction is configured via user input. In various examples, the cache invalidation instruction is configured via an automated process.

In various examples, the cache invalidation instruction is received in response to the cache invalidation instruction being generated based on at least one of: the first relational database table being modified, or a first relational database that includes the first relational database table being modified.

In various examples, the cache invalidation instruction indicates a removal condition that indicates the first database table. In various examples, processing the cache invalidation instruction includes: identifying a subset of resultant data of a plurality of resultant data stored by the cache memory resources based on identifying ones of the plurality of resultant data meeting the removal condition; and/or removing all resultant data of the subset of resultant data from the cache memory resources.

In various examples, the subset of resultant data is a proper subset of the plurality of resultant data based on at least one of the plurality of resultant data not meeting the removal condition.

In various examples, the cache invalidation instruction further indicates a removal time window for removing resultant data meeting the removal condition from the cache memory resources, wherein the second temporal period falls within the removal time window.

In various examples, the removal time window is indicated by an integer value indicating a corresponding length of time of the removal time window.

In various examples, the removal time window is a configurable variable associated with a function call to a cache invalidation function. In various examples, a value defining the removal time window is configured via user input. In various examples, a value defining the removal time window is configured via an automated process.

In various examples, processing the cache invalidation instruction further includes scheduling removal of the subset of resultant over the removal time window based on applying a load balancing scheme.

In various examples, processing the cache invalidation instruction further includes determining query scheduling data indicating at least one of: a plurality of queries scheduled for execution, or at least one query currently being executed. In various examples, scheduling the removal of the subset of resultant over the removal time window is further based on the query scheduling data.

In various embodiments, any one of more of the various examples listed above are implemented in conjunction with performing some or all steps of FIG. 25K. In various embodiments, any set of the various examples listed above can be implemented in tandem, for example, in conjunction with performing some or all steps of FIG. 25K, some or all steps of FIG. 30E, and/or any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 25K described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 25K, for example, in conjunction with further implementing any one or more of the various examples described above.

In various embodiments, the operational instructions, when executed by the at least one processor, cause the database system to: process a first instruction to execute a first query by executing the first query via access to a first relational database table in first storage resources to generate first resultant data for the first query; cache the first resultant data in cache memory resources during a first temporal period for use in subsequent query execution based on determining to cache the first resultant data for the first query; process a second instruction to re-execute the first query during the first temporal period by accessing the first resultant data in the cache memory resources; receive a cached resultant invalidation instruction indicating the first relational database table; remove the first resultant data from the cache memory resources during a second temporal period based on processing the cached resultant invalidation instruction; and/or process a third instruction to re-execute the first query after the second temporal period by re-executing the first query via access to the first relational database table in the first storage resources to re-generate corresponding first resultant data for the first query.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining-A matches-B or not (A) matches not (B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by at least one processor of a database system, comprising:
   processing a first instruction to execute a first query by executing the first query via access to a first relational database table in first storage resources to generate first resultant data for the first query;
   caching the first resultant data in cache memory resources during a first temporal period for use in subsequent query execution based on determining to cache the first resultant data for the first query;
   processing a second instruction to re-execute the first query during the first temporal period by accessing the first resultant data in the cache memory resources;
   receiving a cached resultant invalidation instruction indicating the first relational database table;
   removing the first resultant data from the cache memory resources during a second temporal period based on processing the cached resultant invalidation instruction; and
   processing a third instruction to re-execute the first query after the second temporal period by re-executing the first query via access to the first relational database table in the first storage resources to re-generate corresponding first resultant data for the first query.

2. The method of claim 1, further comprising:
   receiving the first instruction from a requesting entity;
   sending the first resultant data to the requesting entity in response to the first instruction based on generating the first resultant data;
   receiving the second instruction from the requesting entity;
   sending the first resultant data to the requesting entity in response to the second instruction based on accessing the first resultant data in the cache memory resources;
   receiving the third instruction from the requesting entity; and
   sending the corresponding first resultant data to the requesting entity in response to the first instruction based on re-generating the corresponding first resultant data.

3. The method of claim 1, wherein the corresponding first resultant data generated via re-execute the first query after the second temporal period is different from the first resultant data generated via execution of the first query prior to the first temporal period based on at least one of: at least one new relational database row being added to first relational database table between the execution of the first query and the re-execution of the first query, or at least one new relational database row being removed from to the first relational database table between the execution of the first query and the re-execution of the first query.

4. The method of claim 1, wherein determining to cache the first resultant data for the first query is based on receiving a resultant caching instruction indicting that the first resultant data generated via the execution of the first query be stored via the cache memory resources.

5. The method of claim 4, wherein the first instruction to execute the first query includes;
a corresponding query expression indicating the first query for execution; and
the resultant caching instruction for the first query, wherein the resultant caching instruction is received based on receiving the first instruction.

6. The method of claim 4, wherein the resultant caching instruction further indicates a maximum time window for storing the first resultant data via the cache memory resources, wherein the cached resultant invalidation instruction is received before the maximum time window elapses, and wherein the first temporal period corresponds to an amount of time shorter to the maximum time window elapses based on processing the cached resultant invalidation instruction prior to elapsing of the maximum time window.

7. The method of claim 4, wherein the resultant caching instruction further indicates a maximum resultant size requirement for the first resultant data to be stored via the cache memory resources, and wherein determining to cache the first resultant data for the first query is further based on determining, based on generating the first resultant data for the first query, that a size of the first resultant data meets the maximum resultant size requirement.

8. The method of claim 1, further comprising:
prior to processing the cached resultant invalidation instruction, processing a first plurality of instructions to execute a first plurality of queries by executing each of the first plurality of instructions via access to the first relational database table in the first storage resources to generate a first plurality of resultant data for the first plurality of queries, wherein the first plurality of instructions includes the first instruction, wherein the first plurality of queries includes the first query, and wherein the first plurality of resultant data includes the first resultant data;
prior to processing the cached resultant invalidation instruction, caching the first plurality of resultant data in the cache memory resources based on determining to cache corresponding resultant data for each of the first plurality of queries; and
based on processing the cached resultant invalidation instruction, removing all resultant data generated via access to the first relational database table from the cache memory resources during the second temporal period based on the cached resultant invalidation instruction indicating the first relational database table, wherein none of the first plurality of resultant data remain stored in the cache memory resources after processing the cached resultant invalidation instruction.

9. The method of claim 8, wherein determining to cache corresponding resultant data for each of the first plurality of queries is based on processing a plurality of resultant caching instructions that includes a corresponding resultant caching instruction for each of the first plurality of queries.

10. The method of claim 8, wherein prior to processing the cached resultant invalidation instruction, the cache memory resources stores a set of resultant data that includes the first plurality of resultant data, wherein a set difference between the set of resultant data and the first plurality of resultant data is non-null;
wherein at least one of the set of resultant data remains stored in the cache memory resources after processing the cached resultant invalidation instruction based on the at least one of the set of resultant data not being removed via processing of the cached resultant invalidation instruction based on not being generated via access to the first relational database table.

11. The method of claim 8, wherein the cached resultant invalidation instruction indicates the first relational database table based on indicating a first relational database that includes the first relational database table, further comprising:
based on processing the cached resultant invalidation instruction, removing all resultant data generated via access to all database tables of the first relational database from the cache memory resources during the second temporal period based on the cached resultant invalidation instruction indicating the first relational database table, wherein removing the all resultant data generated via access to the first database table from the cache memory resources during the second temporal period is based on the cached resultant invalidation instruction indicating the first relational database.

12. The method of claim 1, wherein the cached resultant invalidation instruction indicates the first relational database table based on one of: including a table name identifying the first relational database table, or including a database name identifying a relational database that includes the first relational database table.

13. The method of claim 1, wherein the cached resultant invalidation instruction is indicated in a corresponding Data Definition Language (DDL) expression.

14. The method of claim 1, wherein the cached resultant invalidation instruction is received in response to the cached resultant invalidation instruction being generated based on at least one of:
the first relational database table being modified, or a first relational database that includes the first relational database table being modified.

15. The method of claim 1, wherein the cached resultant invalidation instruction indicates a removal condition that indicates the first database table, wherein processing the cached resultant invalidation instruction includes:
identifying a subset of resultant data of a plurality of resultant data stored by the cache memory resources based on identifying ones of the plurality of resultant data meeting the removal condition; and
removing all resultant data of the subset of resultant data from the cache memory resources.

16. The method of claim 15, wherein the cached resultant invalidation instruction further indicates a removal time window for removing resultant data meeting the removal condition from the cache memory resources, wherein the second temporal period falls within the removal time window.

17. The method of claim 16, wherein processing the cached resultant invalidation instruction further includes: scheduling removal of the subset of resultant over the removal time window based on applying a load balancing scheme.

18. The method of claim 17, wherein processing the cached resultant invalidation instruction further includes:
determining query scheduling data indicating at least one of: a plurality of queries scheduled for execution, or at least one query currently being executed;
wherein scheduling the removal of the subset of resultant over the removal time window is further based on the query scheduling data.

19. A database system comprising:
at least one processor; and
at least one memory storing executable instructions that, when executed by the at least one processor, cause the database system to:
  process a first instruction to execute a first query by executing the first query via access to a first relational database table in first storage resources to generate first resultant data for the first query;
  cache the first resultant data in cache memory resources during a first temporal period for use in subsequent query execution based on determining to cache the first resultant data for the first query;
  process a second instruction to re-execute the first query during the first temporal period by accessing the first resultant data in the cache memory resources;
  receive a cached resultant invalidation instruction indicating the first relational database table;
  remove the first resultant data from the cache memory resources during a second temporal period based on processing the cached resultant invalidation instruction; and
  process a third instruction to re-execute the first query after the second temporal period by re-executing the first query via access to the first relational database table in the first storage resources to re-generate corresponding first resultant data for the first query.

20. A non-transitory computer readable storage medium comprises:
at least one memory section that stores operational instructions that, when executed by at least one processing module that includes a processor and a memory, causes the at least one processing module to:
  process a first instruction to execute a first query by executing the first query via access to a first relational database table in first storage resources to generate first resultant data for the first query;
  cache the first resultant data in cache memory resources during a first temporal period for use in subsequent query execution based on determining to cache the first resultant data for the first query;
  process a second instruction to re-execute the first query during the first temporal period by accessing the first resultant data in the cache memory resources;
  receive a cached resultant invalidation instruction indicating the first relational database table;
  remove the first resultant data from the cache memory resources during a second temporal period based on processing the cached resultant invalidation instruction; and
  process a third instruction to re-execute the first query after the second temporal period by re-executing the first query via access to the first relational database table in the first storage resources to re-generate corresponding first resultant data for the first query.

* * * * *